Figure 7:
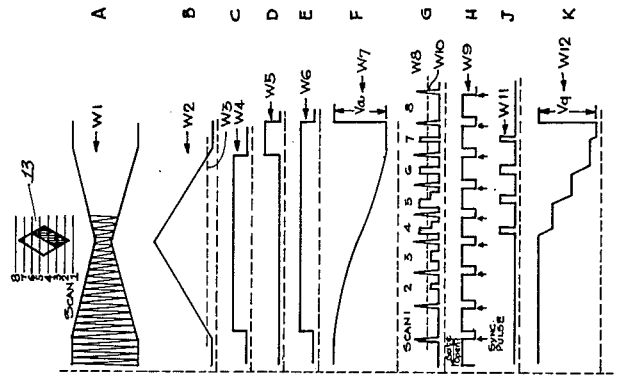

July 16, 1963 — J. F. HUTTER ETAL — 3,097,744
QUANTITATIVE PHOTOMETRIC MATERIALS SORTER
Filed Feb. 27, 1961 — 15 Sheets-Sheet 1
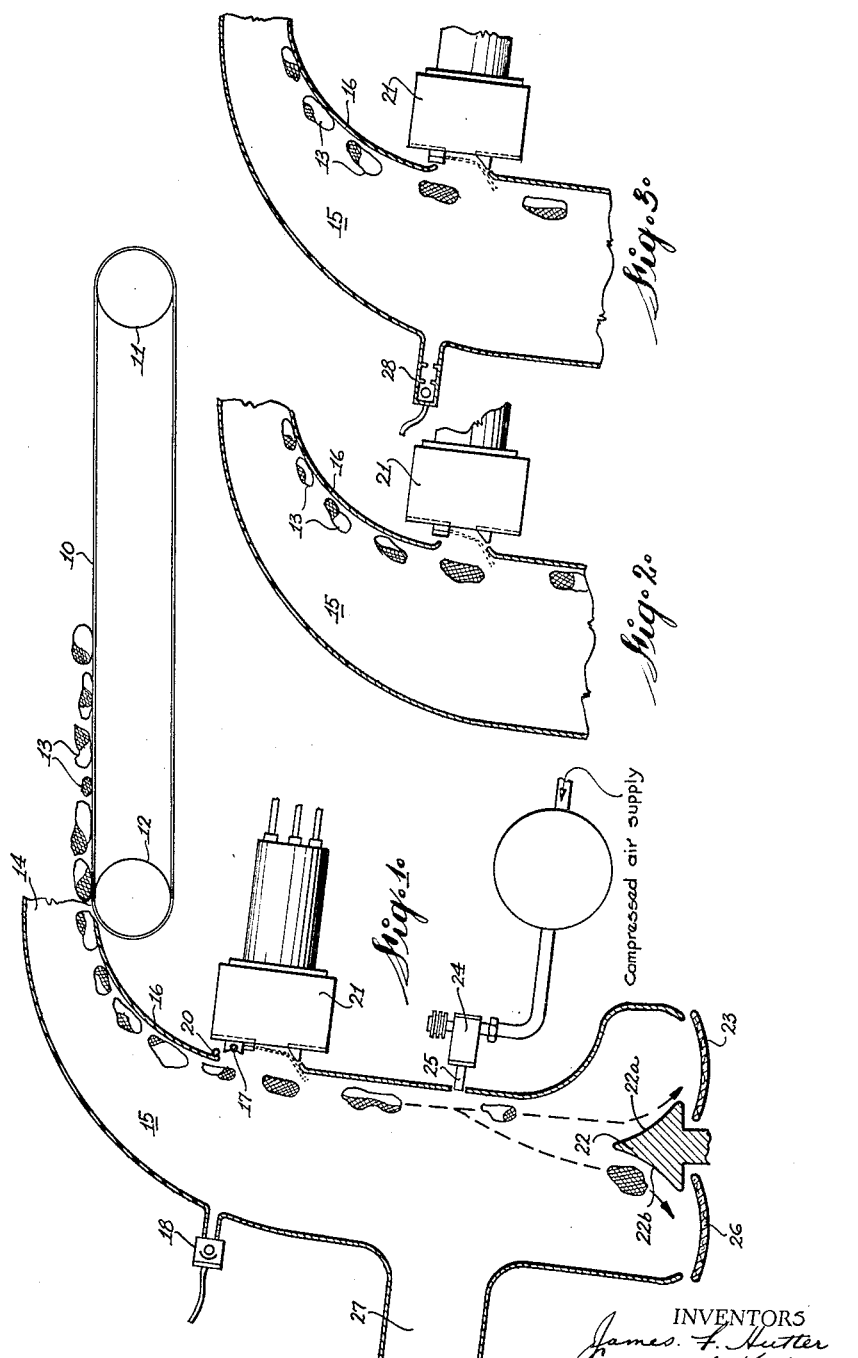
INVENTORS
James F. Hutter
Leonard Kelly
George F. Maunce
Eric W. Leaver
BY Harold A. Weir
PATENT AGENT

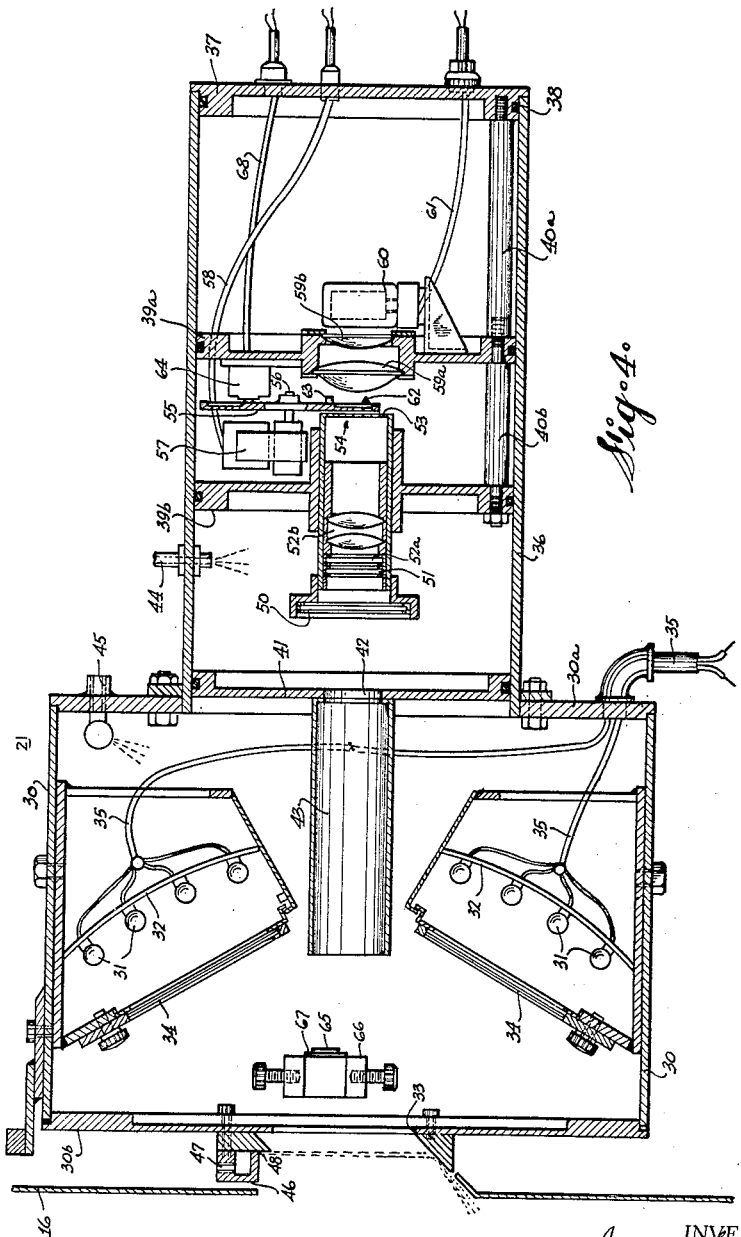

July 16, 1963 J. F. HUTTER ETAL 3,097,744
QUANTITATIVE PHOTOMETRIC MATERIALS SORTER
Filed Feb. 27, 1961 15 Sheets-Sheet 3
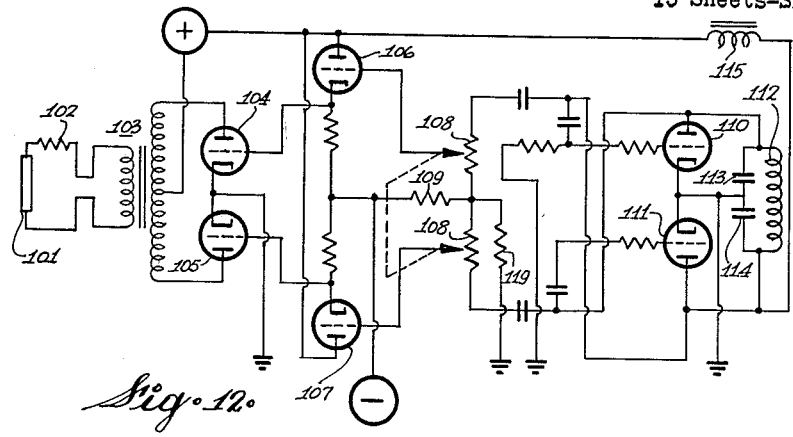
Fig. 12.
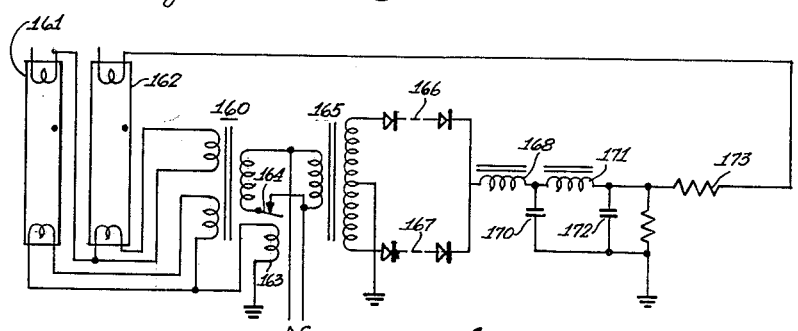
Fig. 14.
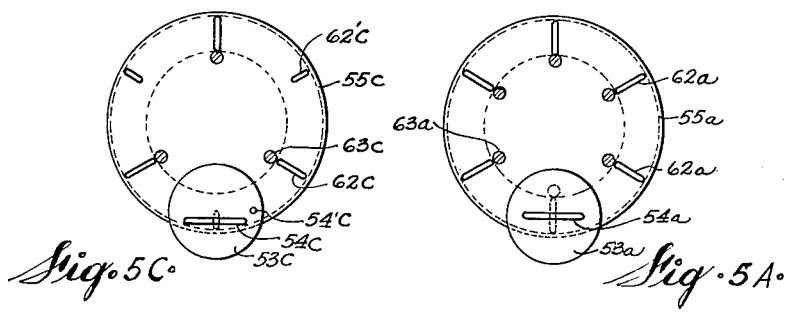
Fig. 5C. Fig. 5A.
Fig. 5B.
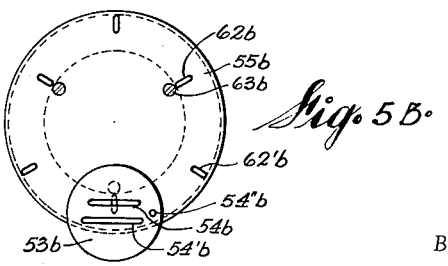
INVENTORS
James F. Hutter
Leonard Kelly
George K. Maunce
Eric W. Leaver
BY
Harold A. Weir
PATENT AGENT July 16, 1963     J. F. HUTTER ETAL     3,097,744
QUANTITATIVE PHOTOMETRIC MATERIALS SORTER
Filed Feb. 27, 1961     15 Sheets-Sheet 4

INVENTORS
James F. Hutter
Leonard Kelly
George K. Maurice
Eric W. Leaver

BY Harold G. Weir
PATENT AGENT

July 16, 1963  J. F. HUTTER ETAL  3,097,744
QUANTITATIVE PHOTOMETRIC MATERIALS SORTER
Filed Feb. 27, 1961  15 Sheets-Sheet 5

INVENTORS
James F. Hutter
Leonard Kelly
George K. MacInnes
Eric W. Leaver
BY Harold A. Wein
PATENT AGENT

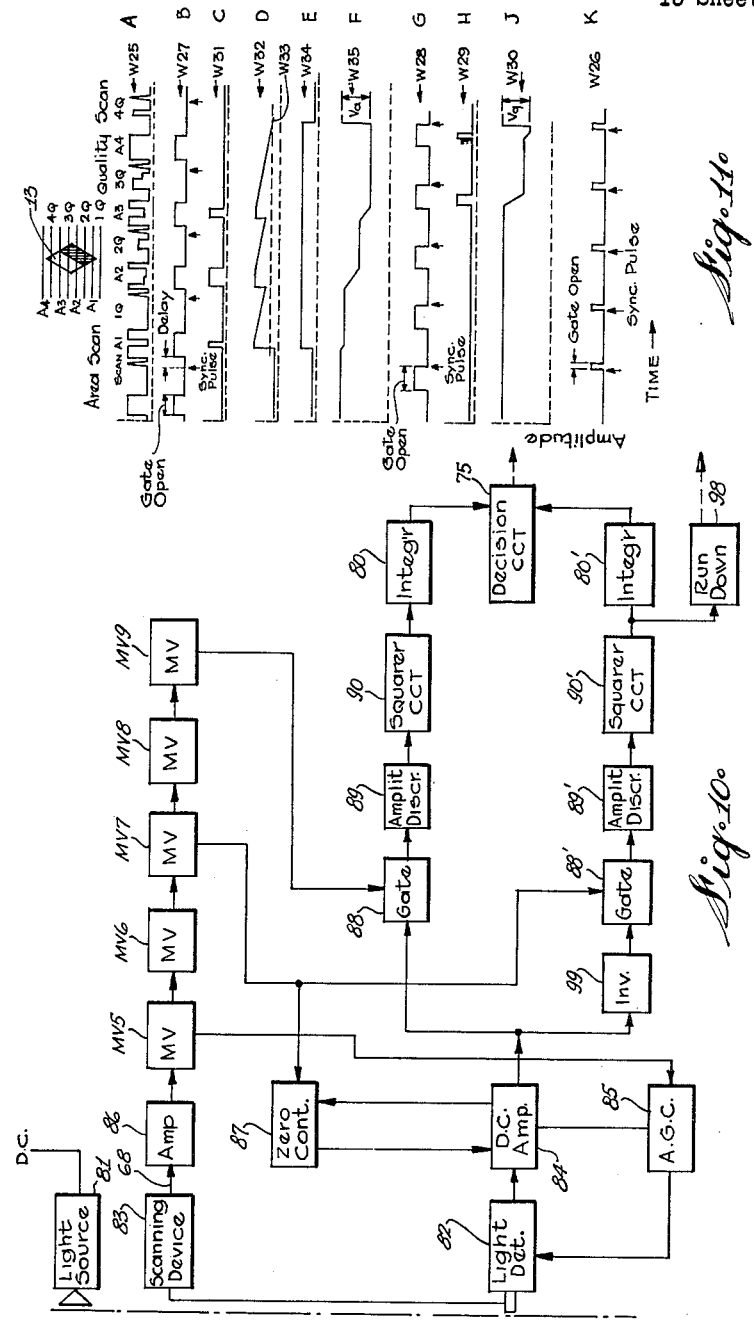

July 16, 1963     J. F. HUTTER ETAL     3,097,744
QUANTITATIVE PHOTOMETRIC MATERIALS SORTER
Filed Feb. 27, 1961     15 Sheets-Sheet 7
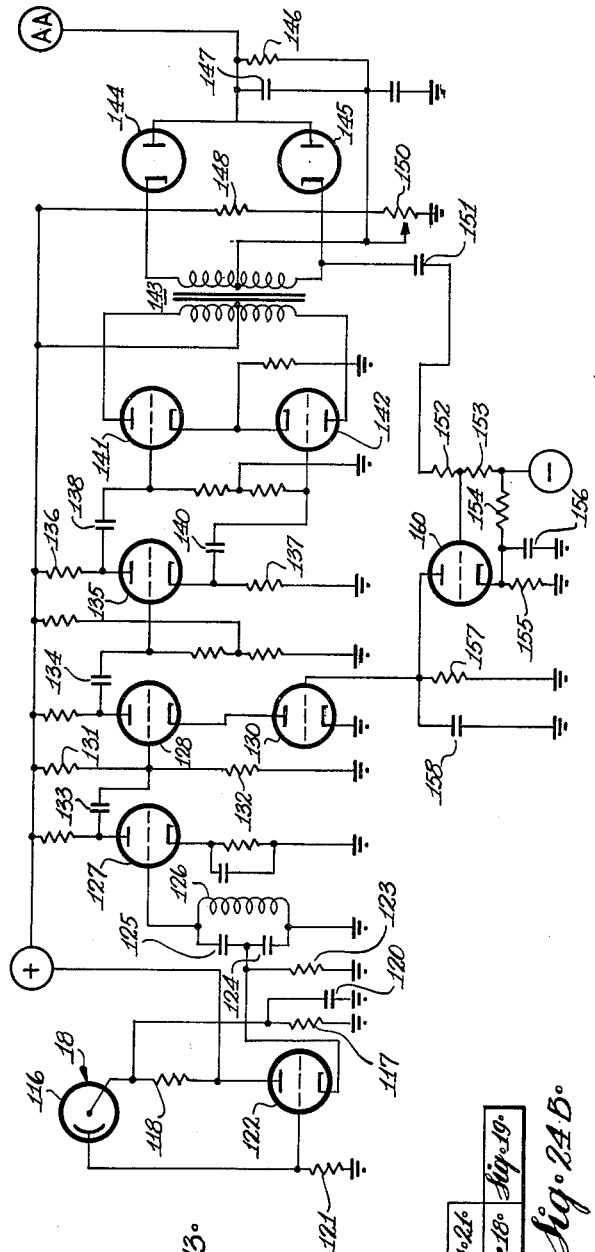
INVENTORS
James F. Hutter
Leonard Kelly
George K. Norince
Eric W. Leaver
BY Harold G. Weir
PATENT AGENT

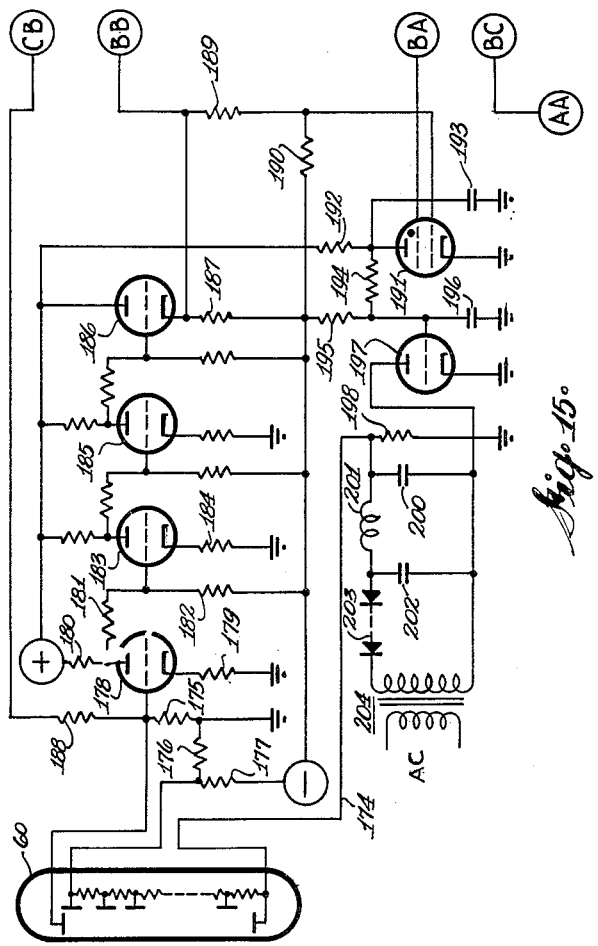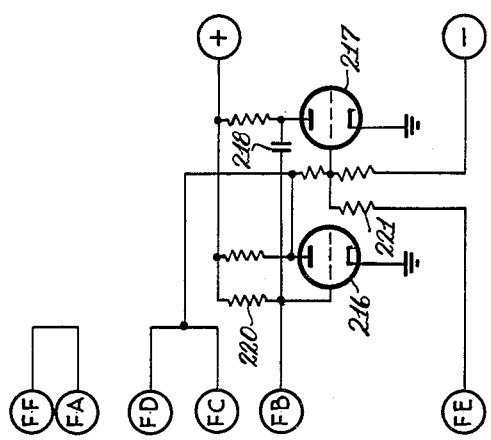

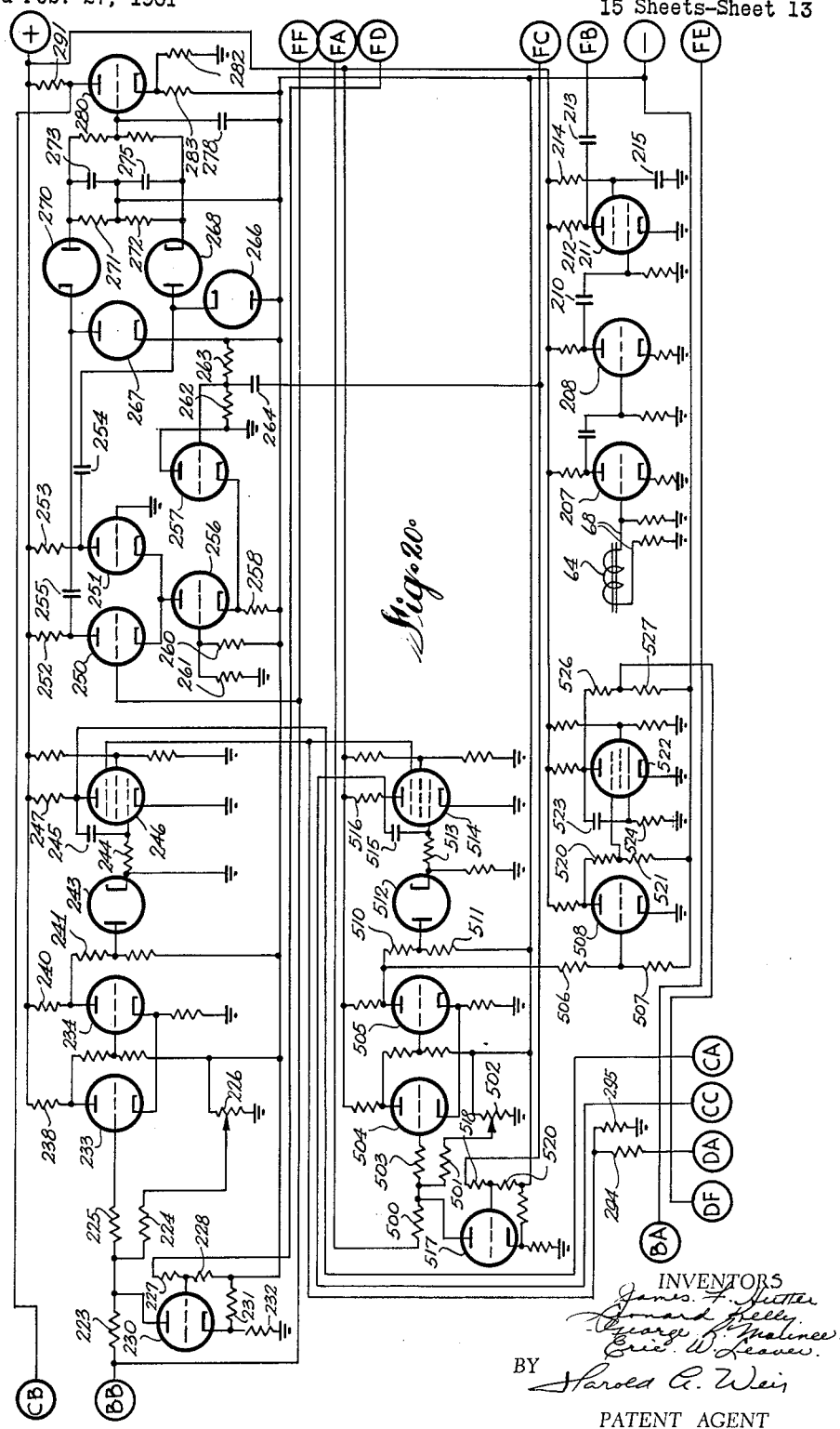

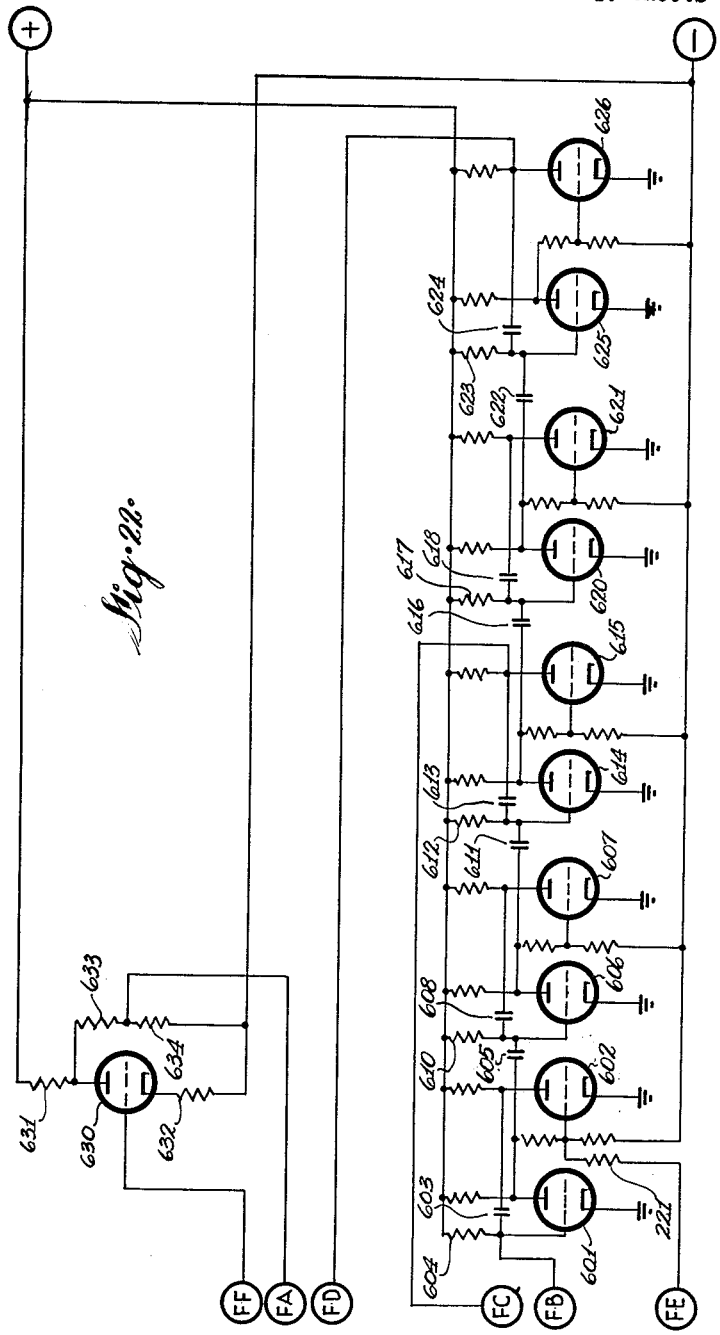

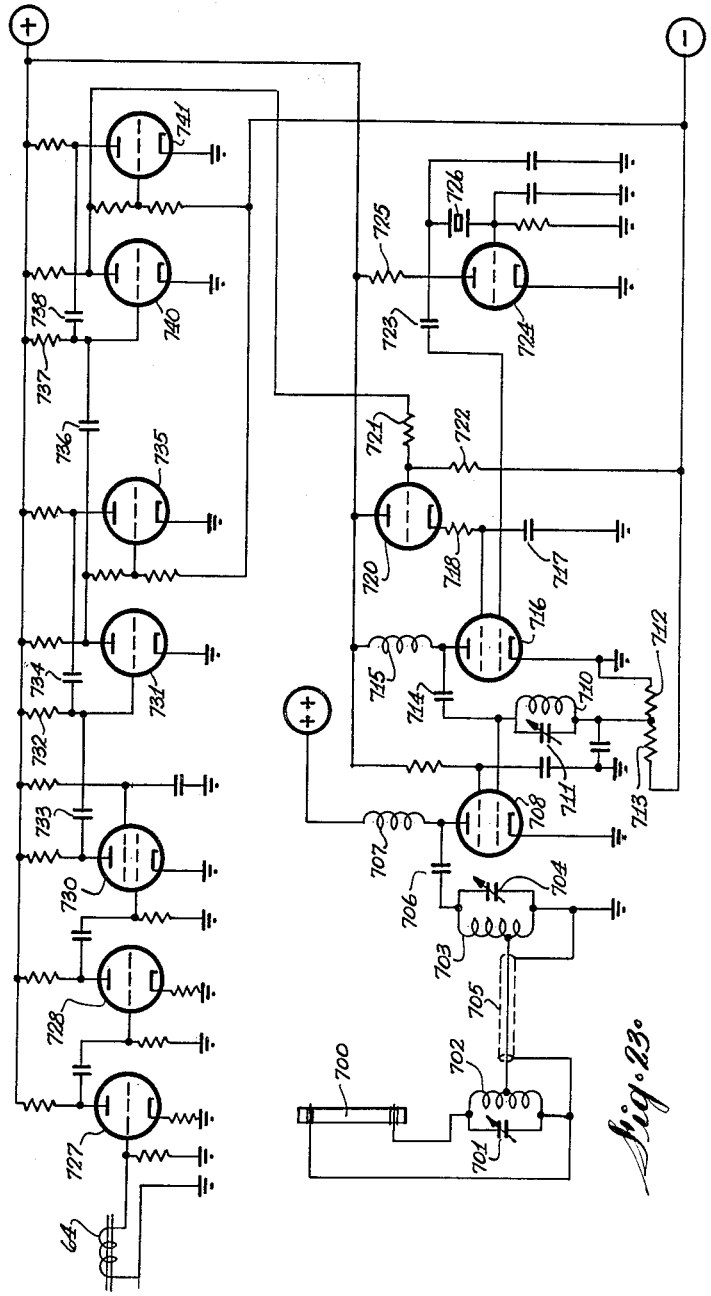

United States Patent Office 3,097,744
Patented July 16, 1963

3,097,744
QUANTITATIVE PHOTOMETRIC MATERIALS SORTER
James F. Hutter and Leonard Kelly, Bancroft, Ontario, and George R. Mounce and Eric W. Leaver, Toronto, Ontario, Canada, assignors to K & H Equipment Limited, Toronto, Ontario, Canada
Filed Feb. 27, 1961, Ser. No. 91,801
36 Claims. (Cl. 209—111.5)

This invention relates to improvements in apparatus for automatically sorting units of irregularly shaped materials, and in particular it relates to improvements in apparatus using photometric means for sorting irregularly shaped units of material according to their reflectance characteristics.

Various types of devices have been used in the past to sort articles or bodies according to the reflectivity or reflectance of the surface of the article. These devices, in general, have been designed to detect and remove a defective article from a series of similar articles moving along a conveyor belt. The articles normally pass through a lighted zone where a light detector is positioned to receive light reflected by a surface of each article in succession. The light dectector sums the light reflected by each article, and if it is below a certain value the article is rejected. An article may be considered defective because of a flaw in its surface or because a discolouration in its surface alters the reflectance value of the reflecting surface. The articles sorted by this type of device are normally substantially uniform in size and consequently the total amount of light reflected from successive acceptable articles is substantially constant. Deviation from this constant value causes the article to be rejected.

Such devices are not adaptable for sorting objects or units of material of different sizes and shapes. Irregularly shaped objects having surfaces of the same reflectance value per unit area would reflect different total amounts of light. Unless a size or area factor were present no precise sorting of objects according to their reflectance characteristics could be achieved.

Prior art devices which sort articles according to reflected light usually make no distinction in the type of reflected light used as a basis for sorting. For the purposes of this description reflected light may be termed specular or diffuse where specular light is light reflected from relatively small, highly polished, reflecting surfaces and diffuse light is light reflected generally from other surfaces. The level of specular light reflected from a unit area would be many times the value of diffuse light reflected from the same area. Consequently, if the surface of a material reflects both specular and diffuse light, it is quite possible that the amount of specular reflected light will be large enough to hide or swamp any indication of the amount of diffuse reflected light. It is the diffuse light that gives a more precise indication of the reflectance characteristics that are of interest, such as, for example, changes of reflectance due to different colours on the surface. Consequently, when sorting according to reflectance, it is frequently important to have a light detector that can distinguish between these types of light. This is of particular importance in the sorting of rock fragments by their reflectance characteristics. Rock fragments are irregular in size and shape and the specular light reflected may readily be high enough to mask the variations in reflectance measured by diffuse reflected light. Prior art devices have not made a distinction between the two types of light.

The present invention has particualr application and utility in the field of mining and it will be discussed in this connection throughout the description. It is not the intention to limit the invention to the sorting of rock fragments or ore fragments. The invention may be applied to the automatic sorting of any irregularly shaped bodies or units of material having varying reflectance characteristics. Where the invention is described for convenience with reference to its use in mining operations, it is intended that it may be applied generally to all sorting operations involving irregular bodies with varying reflectance characteristics.

As mentioned, the present invention is particularly useful in mining operations where it is often necessary to sort rock fragments having various quantities of gangue mixed with ore and ore itself distributed throughout the rock fragments. Because the rock fragments to be sorted will have waste rock of one colour and ore of another colour, the fragments lend themselves to sorting by means of reflectance where the reflectance is a function of the colour for at least certain wavelengths of light. In the past, and at the present time in some countries where labour costs are low, much of the mined ore was handsorted. As labour costs increased mechanical sorting became more economical than hand-sorting. The decision to use mechanical sorting rather than hand-sorting is a decision based on economics and it involves the relative productivity, relative equipment costs and labour costs. High productivity per sorting unit is therefore a basic requirement of any sorting system. An ore sorting machine, besides being rugged, cheap and easy to maintain, should accept rock fragments at a high rate of speed with a minimum space between fragments, make a rapid sorting decision for each fragment, and have a positive, rapid-acting rejection mechanism. The rejection mechanism should be precisely timed to the passage of an ore fragment so that the beginning and end of its operation coincide with the passage of the beginning and end of the fragment past the rejection point.

Machines for sorting ore fragments quickly and efficiently, according to the reflectance characteristics of the ore, are very desirable for economic mining operations. In spite of the need for a machine of this type, a need which has existed for some years, none are believed to have been available up to this time. Prior art detectors used to measure reflectance did not provide for the separation of diffuse light from specular light or they did not have an adequately stable reference. These detectors were not readily adapted to measuring reflectance of irregularly shaped units of material with surfaces reflecting various amounts of specular and diffuse light. Prior art machines for sorting irregular materials such as ore fragments according to reflectance were not available.

The copending U.S. application of James F. Hutter et al. Serial No. 837,402 dated September 1, 1959, and assigned to the same assignee as the present invention, describes an apparatus which sorts irregularly shaped materials according to their radio-activity. Rock fragments are caused to move in a stream sequentially through a sorting zone which includes a detector for measuring radio-activity. The apparatus also provides optical means for measuring the cross-section of each fragment. A signal proportional to radio-activity and a signal proportional to cross-section are compared, and means are provided to initiate an air blast in response to the comparison exceeding a predetermined value. The air blast is used to alter the path of a particular fragment and thereby cause the fragment to be accepted or rejected. The present invention may use the rejection means described in this copending application Serial No. 837,402.

The present invention seeks to overcome the disadvantages of prior art devices and provide an apparatus which will sort irregularly shaped and sized units of material in accordance with the reflectance characteristics of the unit surface in an improved and efficient manner. In a preferred embodiment, the present invention provides an apparatus which scans the surface of passing units of irregular size and sums the amount of diffuse light reflected from the scanned surface. A signal is generated which is proportional to the sum of the reflected diffuse light and that is indicative of the reflectance characteristic of the scanned surface. This signal may be termed the quality signal. In this preferred embodiment, the apparatus also provides a means for determining the size of each passing unit. The determination of size is preferably made without additional handling of the units, and it may be achieved by integrating the occulting effect due to the moving unit as it passes between a stationary light detector and a line source of illumination. Alternatively, a detector and a source of radiant energy to which the detector is sensitive may be arranged in any suitable manner for joint movement relative to a single unit to derive a signal representing the integral of the strip shadow area with time. The signal related to the reflectance characteristic of the scanned surface, i.e. the quality signal, and the signal related to the cross-section or size may then be compared, and an output signal derived which represents the variation from a predetermined standard of the compared quality and size signals. The output signal can be used to control a means for deflecting a unit into an accept or reject path.

It is accordingly an object of the invention to provide a sorting apparatus which sorts rapidly and accurately according to the reflectance characteristics of a series of irregularly shaped objects.

It is another object of this invention to provide equipment for scanning the surface of passing units of irregularly shaped material to sum the amount of reflected light and obtain a measure of the reflectance characteristics of the surface of each unit.

It is another object of this invention to determine optically the sizes of individual units of material moving in succession through a sorting zone, and to determine the reflectance characteristics over at least a portion of the surface of each individual unit, for the purpose of estimating the value of each unit.

It is also an object of this invention to provide equipment for deflecting a succession of individual, moving fragments of ore bearing rock and the like towards either of two alternative destinations, in accordance with a comparison of two measured quantities respectively representing the reflection characteristics of the surface of the fragment, and its cross-sectional area.

It is a further object of this invention to provide means for the determination of concentration of a constituent per unit volume of a fragment of irregular outline where the constituent concentration is related to surface reflectance, by scanning the surface of the fragment and establishing a measure of the amount of constituent present, by estimating the volume of the fragment, and by comparing the ratio of the measure of the amount to the estimated volume with a predetermined reference ratio.

Figure 6:
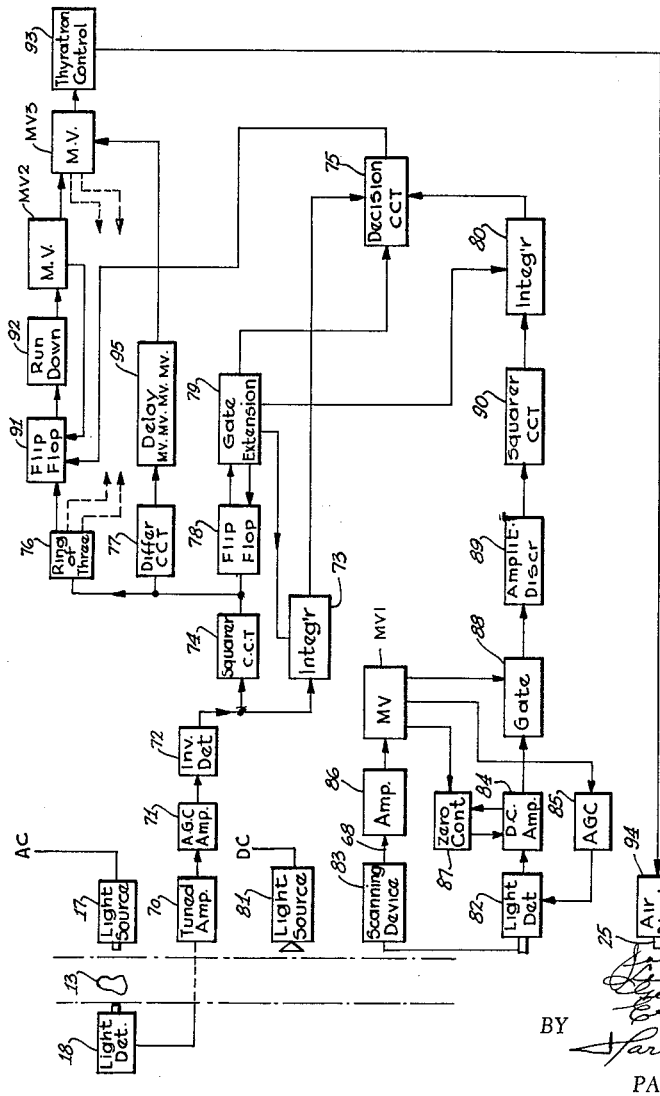
Figure 9:
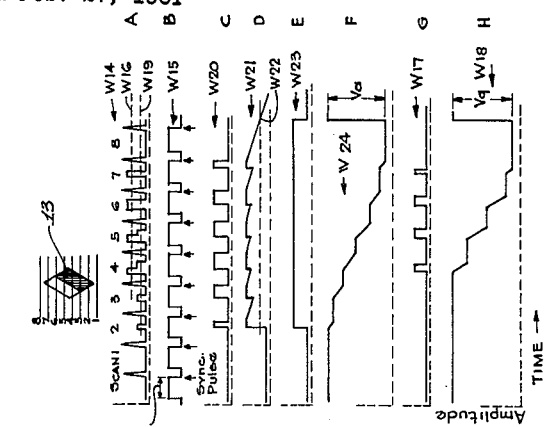
Figure 8:
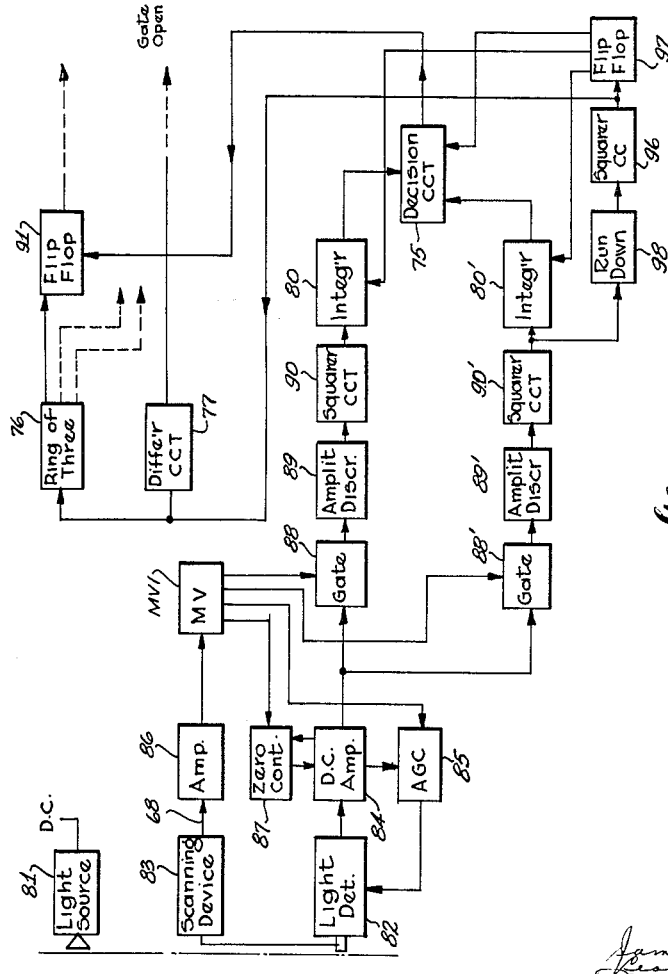

Further objects and advantages of the invention will appear from the following description taken in conjunction with the drawings in which:

FIGURE 1 is a diagrammatic representation of the arrangement of apparatus used in one embodiment of the invention as it applies to an ore sorting station, FIGURES 2 and 3 are similar diagrammatic representations of other embodiments of the invention, FIGURE 4 is a cross-sectional view of the photometric monitor apparatus used in the invention, FIGURES 5A, 5B and 5C are illustrative of scanning disc and mask assemblies used in various embodiments of the invention, FIGURE 6 is a simplified block diagram of the circuits and apparatus used in one embodiment of the invention, FIGURE 7 shows a series of waveforms that occur in the circuitry of FIGURE 6, FIGURES 8 and 10 are simplified block diagrams of portions of the circuits and apparatus used in other embodiments of the invention, FIGURES 9 and 11 show waveforms that are associated with the circuitry of FIGURES 8 and 10 respectively, FIGURES 12 through 23 are schematic circuit diagrams of portions of circuitry that may be used in various embodiments of the invention and whose association in these embodiments may be understood by referring to the layout diagram of FIGURE 24, and FIGURES 24A, 24B, 24C and 24D are layout diagrams showing for different embodiments of the invention the arrangement of the circuit diagrams of FIGURES 12 through 23.

The invention will be described briefly in terms of the general layout of the apparatus in various embodiments with reference to FIGURES 1, 2 and 3, and then a description of the invention in more detail will follow.

Referring to FIGURE 1, there is shown an ore sorting station having a conveyor system including a belt 10, supported at least in part by rolls 11 and 12, carrying ore fragments 13 in single row alignment to a sorting zone. The fragments are carried past light shield 14 into a passageway indicated generally as 15 where they begin a free fall. The light shield 14 is not necessarily a completely light-proof shield, but it is desirable to have a form of light shield to exclude high levels of illumination from passageway 15 which may be considered the sorting zone. The trajectory plate 16 follows approximately the path of fall of the fragments so that the fragments travel just clear of the plate 16. While an occasional rock may graze plate 16 it is not intended that the fragments should be in direct contact.

As the rocks pass into free fall they accelerate, and, as each rock fragment is accelerating with respect to the following rock, the spacing between individual fragments increases. The fragments fall, one at a time, between an alternating light source 17 and a photometric light detector 18. The light source 17 comprises a narrow horizontal slit that directs a thin flat beam of light towards the detector 18. Thus, the light detector 18 receives light from source 17 as a thin beam which crosses the path of the falling fragments. Each fragment occults a portion of the light source 17 as viewed by detector 18, and a summation of the amount of the occulted light for each fragment will give a representation of the cross-sectional area of the fragment. It will be obvious that a signal could be obtained from the light detector that represents not only cross-sectional area, but also length or width of each fragment, and the time taken for the fragment to pass the narrow light source. The purpose of the combination of light source 17 and detector 18 in the FIGURE 1 embodiment is to provide a signal representing size and time of passage past the beam for each fragment.

Although it has been found that cross-sectional area is an adequate measure of size for ore sorting, it will be apparent that a more accurate measure of size could be achieved by using an additional similar narrow slit light source and a detector opposite one another and positioned so that the fragment presents a cross-sectional area to the additional detector which is at right angles to the cross sectional area presented to the detector 18. The signals from both detectors could be combined to provide a more accurate measure of size where this was necessary.

Because each rock fragment may have some fines adhering, the atmosphere in the sorting chamber 15 may be wet and dirty. Consequently it is usually desirable to have some means for keeping light source 17 clean. This can be accomplished by having a perforated tube 20 located right above light source 17 which directs a curtain of moist air over the length of the slotted opening of source 17. The water content and rate of flow of the moist air can be regulated so that it effectively cleans the source and prevents dirt collecting on it. It has been found that the recessing of detector 18 is usually sufficient to keep it free from dust and dirt, however, if conditions were very severe a similar curtain of moist air could be used to keep detector 18 clean.

As the rock fragments 13 pass the light source 17 they come into the vicinity of the monitor 21. The monitor 21 directs diffuse light into the sorting zone and has a photometric device which "scans" the surface of each passing fragment to obtain a measure of the amount of diffuse light that is reflected by the scanned surface of the fragment. The use of the term "photometric" is intended to convey that a measuring of the light occurs, that is, that the response is quantitative rather than just qualitative.

Throughout this description, when reference is made to light, it is the intention that this should include not only visible light radiation but also radiation in the infra-red and ultra-violet regions. The type of light radiation or simply "light" that is most suitable for each sorting operation is readily determined. For example, in a rock sorting application it might be desired to sort fluorite from reddish-brown waste rock. A reflectance spectrometer might show the greatest reflectance from the fluorite at a wavelength of, say, 0.425 micron and the waste rock of, say, 0.650 micron. In this particular case, a light source in the visible range would be suitable and the light detector in the monitor 21 should be sensitive in the region of 0.425 micron. It might be desirable, in this particular example, to attenuate the response of the light detector in the region of wavelengths of 0.650 by using a light filter such as for example, one of the kind known as a Wratten No. 39 light filter. For each sorting application it is desirable to select suitable light sources, light detectors and filters for the materials being sorted. Such a selection is easily made and presents no difficulties.

The operation of the monitor 21 is described in greater detail hereinafter and it serves to provide a signal that is representative of the quality of each fragment, that is, it presents a signal representative of the amount of reflected diffuse light in excess of a certain threshold value. By proper selection of light source, detector, and filters, as previously explained, the diffuse reflected light received is made to provide a good indication of the amount of a desired material in the fragment to be sorted.

The apparatus compares a signal from the detector 18, which represents size, with a signal from the monitor 21, which represents quality, and reaches a decision for each fragment as will be described in more detail hereinafter. If the particular fragment is considered of value it continues on its path of free fall, strikes the splitter plate 22 on side 22a and falls on conveyor belt 23 to be carried away for precessing. If on, the other hand, the apparatus reaches a decision that the fragment is not of sufficient value, the air blast valve 24 is opened as the fragment reaches a position in front of nozzle 25 and the fragment is deflected from its path of free fall. The deflected fragment strikes side 22b of splitter plate 22 and falls on conveyor belt 26 to be carried away as waste.

The air blast from nozzle 25 is timed to begin operation as soon as the lowest part of a fragment reaches a point in front of the nozzle and terminate operation just as the fragment completely passes this point. A timing signal to operate the valve 24 may be obtained from the signal output of detector 18 as described hereinafter. The precise timing of the air blast for the rejection of a fragment is important. The blast duration should be for that period of time when a fragment is in front of the nozzle. If the time or duration of the blast is reduced the efficiency of the blast decreases, and if the blast lasts for too long a time productivity decreases because increased spacing would have to be provided to avoid the blast affecting the adjacent fragments.

It will be obvious that a mechanical rejection system could also be used in the sorting apparatus of this invention. However mechanical rejection systems, where plates or the like are moved to deflect rejected pieces, are relatively slow acting and the rate of sorting would not be as high if a mechanical system were used.

It will be apparent that a system of multi-channel delays must be incorporated if the sorting apparatus is to accommodate varying sized pieces and is to operate at maximum speed. The decision whether to accept or reject must wait until the tail-end or last part of each piece or fragment has passed the monitoring zone. When the tail-end of a fragment is just leaving the monitoring zone the front-end will be a certain distance below depending on the size of the fragment. The rejection mechanism (in the embodiment shown, nozzle 25 and valve 24) must be located at least this distance below the monitoring zone. That is, the largest fragment to be sorted will determine the distance from the monitoring zone to the rejection point.

This physical separation of monitoring and rejection stages introduces a condition wherein two or more smaller pieces may be en route between these two stages at the same time. If a maximum rate of sorting is to be maintained, multi-channel delays must retain information regarding the several pieces that may be in transit between the monitoring stage and the rejection stage. These delays or memories may be in any of the well known forms such as memory drums, delay circuits of various types, etc. These memory circuits and delay circuits, will be discussed in more detail later in the description.

Referring still to FIGURE 1, an exhaust 27 is provided roughly opposite the air blast nozzle 25. It has been found that the efficiency of the air blast is reduced if an unrestricted exhaust is not provided. The exhaust 27 also provides a strong draft which helps to remove dust, chips of wood, and other light particles from the sorting zone.

A variation of the embodiment of FIGURE 1, does not require the use of light source 17. In this embodiment the detector 18 is positioned a little farther down the sorting zone 15 so that the detector 18 receives light from the light source inside monitor 21. The light path between the monitor 21 light and the detector 18 is restricted so that the detector receives a narrow horizontal beam of light as before.

FIGURES 2 and 3 show other embodiments of the invention where the arrangement of the apparatus is different from FIGURE 1. The embodiments of the invention as shown in FIGURES 1, 2 and 3 will all be discussed in detail later regarding operation and equipment, and it is the purpose of FIGURES 1, 2 and 3 to show only the arrangement of apparatus which will make the ensuing description clearer. In the FIGURE 2 embodiment like parts bear like designation numbers as they do throughout the description wherever possible. The FIGURE 2 embodiment does not have a light source and a detector such as 17 and 18, respectively, in FIGURE 1. The monitor 21, in FIGURE 2, directs diffuse light into the zone and has a photometric detector which scans the passing fragments as explained before. However, in the FIGURE 2 embodiment, the monitor derives information from the scanning of the reflected diffuse light from the fragments as received by its photometric light detector, and uses that information to provide not only the quality signal but also the size and timing signals. Thus, the monitor 21 in the FIGURE 2 embodiment provides all the signals necessary for the apparatus to make a decision whether to accept or reject each fragment and to time the rejection mechanism.

FIGURE 3 represents diagrammatically an arrangement that may be used in two other other embodiments of the invention. A light source 28 is positioned opposite monitor 21. This light source 28 has a narrow slotted opening which provides a thin beam of light in a horizontal plane across the sorting zone 15. The falling fragments passing between the photometric detector in monitor 21 and source 28 will occult the light to provide a measure of size and to provide timing as before. The monitor 21, in this case, uses the directly transmitted light from source 28 to provide the timing/size signal and the reflected diffuse light to provide the quality signal. As the one photometric light detector in the monitor 21 receives both the directly transmitted light and the diffuse light, provision is made for the detector to distinguish between them. In one embodiment the light from source 28 is a steady polarized light and there is a double scan used in the monitor for the purpose of distinguishing between the light sources. In the other embodiment the light source 28 is pulsed in such a manner that the detector output can be resolved into the required components. These embodiments will be described in more detail hereinafter.

It will, of course, be obvious that the physical arrangement of the apparatus may differ from that shown in FIGURES 1, 2 and 3. The air blast may be used to direct a fragment to the accept path or ore conveyor while the waste fragments follow an uninterrupted path of free fall to the waste conveyor. This arrangement has the disadvantages that a failure of the sorting apparatus will permit all the fragments to go to the waste conveyor. In other variations, the air blast nozzle may be positioned on the opposite side of the sorting zone as may the monitor or other components as long as the correct positioning of one to the other is maintained.

FIGURE 4 is a cross-sectional view of monitor 21. With only a few minor changes in the scanning arrangements, the monitor 21 of FIGURE 4 can be used in any of the previously mentioned embodiments of this invention. A front frame portion or front housing portion, is shown having top and bottom walls 30, rear wall 30a and front wall 30b. These walls form the housing for the light source which comprises lamps 31. These lamps are preferably tubular for ease of mounting and handling and they may be of the fluorescent or filament type. The front wall 30b has an opening 33. The lamps 31 are arranged in a cylindrical pattern with reflectors 32 to provide illumination through opening 33 over as large an angular distance as practicable to ensure that the ratio of specular to diffuse light is kept to a minimum. Polarizing filters 34 are used to polarize the light from lamps 31 in a given direction to further reduce specular reflection as explained hereinafter. The lamps 31 are connected to a regulated direct current supply by cables 35 which pass through a sealed connector in the rear wall 30a of the front housing portion.

For satisfactory operation of the sorting apparatus, it is desirable that the light output from lamps 31 should remain constant or that some means should be provided for adjusting the apparatus in accordance with changes in the light output. Because of the possibility that the light output may not remain constant due, perhaps, to poor regulation of the power supply for lamps 31, failure of one or more of the lamps, or moisture condensing on the lamps, an automatic compensating control is incorporated. This control makes use of a reference reflector 65 in the path of light from lamps 31. The reflector may be of any material that reflects a fairly high portion of diffuse light, such as, for example, porcelain. The reflector 65 is fixed to a polaroid mask 67 which is a little larger than the reflector 65. The plane of polarization of mask 67 is at right angles to that of filters 34 so that the mask appears black. The standard reflector is thereby surrounded by a "black" border. The reflector 65 and mask 67 are held in an adjustable holder 66, and the assembly is placed so that it is in line with the scan (as will be discussed later) and preferably towards one side of opening 33. The holder 66 is provided with some means for adjusting its position with respect to the line of scan. A series of adjusting screws, of which two are shown, is a convenient manner of doing this. The light reflected from the standard reflector 65 and received by the photometric light detector in the monitor is used to compensate for changes in the level of light output from lamps 31. The manner in which the control works is described further on.

A rear frame portion or rear housing portion may be made from a tubular section 36 and an end cover 37 sealed together in dustproof manner by sealing ring 38. This forms the housing for the photometric detector and scanning components which are shown mounted by means of members 39a and 39b. The members 39a and 39b may be positioned by some means such as spacer bars 40a and 40b.

The rear housing portion has a front wall 41, also sealed to tubular section 36, with an opening 42 having fixed therein a collimator 43. The front and rear housing portions are fastened together so that collimator 43 projects into the front portion through an opening in the rear wall 30a of the front portion. Compressed air is introduced to the rear housing portion through pipe 44 to pressurize it and establish a flow of clean air out through collimator 43. Similarly, compressed air is introduced to the front housing portion through pipe 45 to create a small positive pressure in the front housing and establish airflow outwards through opening 33. This outward flow helps to prevent the entrance of moisture and dirt to the inside of the monitor. In addition to this a "pneumatic window" is created across opening 33 by means of a hollow longitudinal member 46 which is fastened to wall 30b just above opening 33. The member 46 extends the length of the opening 33 and receives compressed air through opening 47. A very thin orifice 48 in the underside of member 46 directs a thin curtain of air across opening 33. The orifice may extend the full length of the opening 33 and be in the order of 0.001 inch wide, although the width may vary depending on the air pressure and the conditions of operation. The combination of the pneumatic window and the outward flow of air from the monitor has been found adequate to prevent moisture and dirt entering the monitor.

The member 39b holds a filter and lens assembly and a scanning device. A colour filter 50 is used to attenuate undesired wavelengths of light which pass through collimator 43. As was previously explained, it is frequently desirable to make the light detector less sensitive to certain bands of wavelength of the light rays received. A proper selection of light detector and colour filters will give a light detector relatively insensitive to the undesirable light wavelengths.

A polarizing filter 51 may be positioned between the colour filter 50 and the lens system. This polarizing filter 51 is desirable to reduce the amount of specular light passing to the photometric detector of the monitor. If the plane of polarization of filter 34 and the plane of polarization of filter 51 are at right angles to one another, the amount of the specular reflected light from the fragments passing filter 51 will be kept to a minimum as will the amount of specular light reflected from reference reflector 65. The polarizing filter 51 may be located as shown in the embodiments of the invention shown generally in FIGURES 1 and 2 and in one of the embodiments mentioned in connection with FIGURE 3. However, in the other FIGURE 3 embodiment, where light source 28 has a polarizing filter in front of it and where a double scan is used, it may be more advantageous to omit filter 51 and use a polarizing filter in one of the scans only. This will be discussed in more detail in the description of the scanning system.

A lens system is shown having lenses 52a and 52b and it serves to direct the collimated diffuse light on a mask 53 at the apertures indicated as 54. The number of apertures 54 will vary depending on the operation of a particular embodiment as will be discussed in connection with FIGURE 5.

It will be seen that any lens system suitable for directing the light from collimator 43 onto the apertures 54 can be used, and it is not necessary that the number of lenses be two or that they be positioned as indicated in FIGURE 4.

A scanning disc 55 having apertures in it indicated generally as 62, is positioned so that it can rotate with its apertures 62 just behind the apertures 54 in mask 53. The scanning disc is supported on shaft 56 of electric motor 57. The motor 57 receives power by means of cable 58 entering through a sealed plug in end cover 37.

The member 39a supports another lens system and a photometric detector. The lens system is shown as having lenses 59a and 59b which serve to project the light from the apertures 54 evenly over the cathode surface of a photomultiplier tube 60. As before, any suitable known lens system may be used. The photomultiplier tube is connected to external circuitry by means of cable 61 which passes through a sealed plug in end cover 37.

The scanning disc 55 has a series of iron slugs 63 on it spaced around the disc. A magnetic pick-up 64 is mounted on member 39a so that the iron slugs pass in fairly close proximity. The magnetic pick up 64 generates a short pulse each time one of the slugs 63 passes by it. These pulses are carried to external circuitry by means of cable 68 which passes through a sealed connector in end cover 37. Depending on the positioning of the slugs 63 and apertures 62, the pulses from the magnetic pick up can give an indication of the rate of rotation of the scanning disc and thus of the rate of scan. This pulse signal or synchronization signal is useful in separating different components from the output signal of the photomultiplier tube 60. A series of pulses used for synchronization are frequently referred to in the art as sync pulses and the pulses from the magnetic pick-up 64 will therefore be referred to in this manner.

Referring now to FIGURE 5 which shows different arrangements of apertures 54 in mask 53 and apertures 62 in scanning disk 55, it will be seen that the scanning system shown is of a well known type wherein the combination of rotating disc and stationary mask provide a succession of horizontal sweeps or scans. This mechanical type of scanner is well known in the television, facsimile and analogous arts. In its application to this invention the scan need only be in one dimension as the motion of the falling fragments will provide vertical movement so that there will be coverage of the fragment surface by a succession of horizontal sweeps or scans.

In FIGURE 5A there is shown a mask and disc combination that will provide a series of horizontal scanning operations. This particular combination of mask 53a and scanning disc 55a is suitable for use in both the FIGURE 1 and FIGURE 2 embodiments of the invention. The mask 53a has a single aperture 54a in the form of a horizontal slot. The scanning disc 55a has a series of spaced apertures 62a which are radial slots. As the disc 55a rotates with respect to the mask 53a, the apertures 62a line up one at a time with aperture 54a to provide a small light opening which moves horizontally across aperture 54a. The sweeping or movement of the common light opening is referred to as a scanning movement, and if a light detector were positioned behind the light opening it could be said to scan any object placed in the field of view on the other side of the common opening. Thus, when the apparatus is operating with mask 53a and disk 55a, the light received by the photomultiplier tube 60 will be that from a series of scans through opening 33 across the sorting zone. The area of diffuse illumination projected on the cathode of the photomultiplier tube 60 will remain constant but will vary in intensity in accordance with the reflectance characteristics of the scanned fragments passing opening 33.

An additional aperture may be provided in mask 53a such that the photomultiplier tube 60 scans the standard reference reflector 65 just before or just after the main scanning sweep depending on which side of opening 33 the reference reflector is located. Of course, a portion of the aperture 54a may be used to scan the reflector 65.

The iron slugs 63a on disc 55a are spaced to provide a pulse from the magnetic pick-up 64 for each scan. These sync pulses are used to time some of the functions of the electronic apparatus used in the invention.

The scanning combination of mask and disc shown in FIGURE 5A gives a single scan across the sorting zone. Only a single scan is necessary in the embodiments described in connection with both FIGURES 1 and 2. In FIGURE 1 the light source 17 and light detector 18 provide the information from which is obtained a signal giving the time or duration of fall past a point and a signal giving size, separately from monitor 21. The monitor using only its own light source provides the qaulity signal by summing the results of the scan across the sorting zone for each fragment. There is no need for the monitor to distinguish between two light sources. In FIGURE 2 there is only one light source—that of the monitor. This source is the original source of the light received by the photomultiplier tube 60, and the output from the photomultiplier tube 60 contains timing, size and quality information which is later separated electronically. There is again only the need for a single scan. In the case of the two embodiments discussed in connection with FIGURE 3, there are two light sources 28 and 31, and the photomultiplier tube 60 receives light from both these sources. Different arrangements of apertures in mask 53 and in disc 55 are required. These are shown in FIGURES 5B and 5C.

FIGURE 5B shows a combination of mask and scanning disc suitable for use with the embodiment of FIGURE 3 where light source 28 provides polarized light. A polarizing filter placed in front of light source 28 would achieve this purpose. The source 28 therefore provides a steady, polarized, thin beam of light. In FIGURE 5B the mask 53b has two vertically separated horizontal apertures 54b and 54'b. The scanning disk 55b has two alternate sets of apertures 62b and 62'b. As the disk 55b rotates an aperture 62b passes across an aperture 54b to provide a scan across the upper horizontal slot 54b and then aperture 62'b passes across aperture 54'b to provide a scan across the lower horizontal slot 54'b. These two scans alternate, one providing light to the photomultiplier 60 from the source 28 for a time and size signal, and the other providing light to the photomultiplier 60 for the quality signal. It will be obvious, however, that if conditions are such that alternate scans are not satisfactory they may be intermixed in another manner. That is, for example, two quality scans might be required for each time/size scan, or vice versa.

In this embodiment, as was previously mentioned, it is preferable to omit polarizing filter 51 (FIGURE 4) and instead use a polarizing filter in the aperture 54b which is associated with the quality signal. If the polarizing filter 34 (FIGURE 4) is polarized in a first direction, and the polarizing filter in front of source 28 is polarized in the same first direction, then a polarizing filter in aperture 54b would be polarized in a second direction at right angles to the first direction. It will be recalled that in order to keep the specular reflected light to a minimum in the quality scan, it is desirable to polarize the light from lamps 31 (filter 34) in a first direction and use a filter polarized in a plane at right angles in the light path for the quality scan. This is done in this embodiment. However, in addition, the polarizing filter in aperture 54b is polarized at right angles to the polarization of the filter in front of light source 28. This keeps to a minimum the amount of light from source 28 entering the light path for the quality scan. The vertical separation of the two scans also aids in keeping interference to a minimum.

In FIGURE 5B there is an iron slug 63b on scanning disc 55b for each of the apertures 62b which provide the quality scan. These slugs passing magnetic pick up 64 (FIGURE 4) cause a short pulse in the output from the pick up which recur at the same frequency as the quality scan frequency. These sync pulses are used to time certain functions in the electronic apparatus used in the invention.

The aperture 54"b in FIGURE 5B is to provide for a scan of the standard reflector 65 (FIGURE 4) as was previously discussed.

Referring now to FIGURE 5C, there is again only a single slotted horizontal aperture 54c in mask 53c. In the embodiment of FIGURE 3 using this mask and disc combination, the light source 28 is pulsed at a frequency dependent on the speed of rotation of the scanning disc 55c. The iron slugs 63c on disc 55c, by means of magnetic pick up 64 and some electronic circuitry to be described later, provide synchronization for the pulsing of light source 28 as well as other timing signals. Because the light source 28 is pulsed there is no need to use vertically displaced scans and polarizing filters to keep the two light paths separated. The scanning disc 55c has two sets of alternately spaced apertures 62c and 62'c which provide respectively a scan of the sorting zone for the quality signal and a scan of source 28 for the time and size signals. The source 28 is only giving light for the duration of passage of apertures 62'c past the aperture 54'c. The aperture 54'c provides for a scan of the standard reference reflector 65 (FIGURE 4).

It will, of course be obvious to those skilled in the art that certain electronic scanning devices well known in the electronic art could be used in the place of the mechanical scanning system described. These electronic scanning devices are more complex and more expensive and are therefore not believed as desirable.

To summarize very briefly thus far, the sorting apparatus provides means for moving a series of units of material, such as rock fragments, in single row alignment to the upper part of a sorting zone for free fall therethrough. Means are provided to light the zone and derive the following information:

(1) Information as to the time of transit of the beginning and end of each fragment past a certain point (time).
(2) Information as to the plan area or cross section of each fragment (size).
(3) Information as to the area of the scanned surface of each fragment having a reflectance greater than a predetermined level (quality).

The above information is required for the apparatus to make a decision on whether to accept or reject each fragment and to time the rejection system. This is the information which concerns each individual fragment. In addition the monitor provides:

(4) Information concerning a standard reference reflectance to be used to compensate for light changes.
(5) Information concerning the rate of scan for certain timing or synchronization functions.

To continue with a description of the various circuitry and apparatus used in the various embodiments of the invention, reference is directed to FIGURE 6 which is a simplified block diagram of the circuitry and apparatus used in the embodiment of the invention described briefly in connection with FIGURE 1, and FIGURE 7 which shows waveforms occurring in the circuitry depicted in FIGURE 6. A rock fragment 13 is shown as it is passing between light source 17 and light detector 18 in the sorting zone. The light source 17 is energized with power from an alternating source and, as the fragment 13 passes between source 17 and detector 18 it will occult a varying portion of the thin beam pulsing light. The light detector will therefore give as an output an alternating voltage that is amplitude modulated in accordance with the amount of occulted light. This output waveform is shown as W1 in FIGURE 7A.

The signal from light detector 18 is connected to a tuned amplifier 70 and then to an amplifier 71 with an automatic gain control function. The signal is amplified and compensation for undesired fluctuations in the signal is provided by these units. The signal is then inverted and detected by the inverter-detector 72. The output from the inverter-detector is in the form shown as W2 in FIGURE 7B. The signal from the inverter-detector is applied to an intgrator 73 and a squarer circuit 74. The integrator sums the instantaneous width values and provides an output as shown in W7 whose amplitude Va is a function of the cross-sectional area of the fragment. This signal contains the size information and is applied to a decision circuit 75. The squarer circuit 74 provides an output in the form of a rectangular wave shown as W4 which begins and ends at the times when waveform W2 crosses a threshold W3. This rectangular signal is then applied to a ring of three circuit 76, a differentiating circuit 77 and a flip flop 78. The flip-flop 78 and a gate extension 79 provide the main gating signal. The extension to the rectangular waveform W4 is necessary because the scanning means in the monitor is located a distance below the source 17 and detector 18 which produce the time and size signals. An additional length of time must be allowed for the fragment to pass the monitor so that the scanning for the quality signal may be completed. Thus, the main gating signal, shown as W6, produced by the gate extension 79 and flip-flop 78 takes the form of the sum of waveforms W4 (output of 74) and W5 (the extension). This main gating signal is used to gate integrator 73, integrator 80, and decision circuit 75 for the passing of each fragment.

The light source 81 comprises the direct current supplied lamps 31 with their reflectors 32 and polarizing filters 34 of FIGURE 4. The light detector 82 comprises the lens systems, filters where used, and the photomultiplier tube 60. The scanning device 83 comprises the combination of mask 53a and scanning disc 55a of FIGURE 5A, and the driving motor 57 and magnetic pick up 64 shown in FIGURE 4. The output signal from light detector 82 is applied to a direct-coupled ampliver 84 whose output is indicated in FIGURE 7G as W8. Reference to the numbers of the scans on waveform W8 and to the scans marked on the example fragment 13 in FIGURE 7, will show how the reflectance affects the waveform signal. The shaded portion of fragment 13 represents an area of a low reflectance while the unshaded area represents a higher reflectance area which gives the higher output signal appearing in the scans 4-7.

It will be recognized that D.-C. amplifiers frequently tend to drift and some form of stabilization is required to overcome this, and that compensation should be made for variations in the light in the sorting zone. Two control systems are used to stabilize the output from amplifier 84. The first of these systems uses an automatic gain control circuit 85. This agc circuit 85 is gated with a signal from a multivibrator MV1 which in turn is controlled by pulses from scanning device 83 amplified by amplifier 86. The signal from the scanning device is, of course, the series of sharp sync pulses from magnetic pick up 64 (FIGURE 4). These sync pulses are shown in the waveform of FIGURE 7H. The age-circuit 85 is gated on for that portion of the scanning cycle when the light detector 82 is looking at the standard reference reflector 65 (FIGURE 4). The agc circuit 85 uses the signal corresponding to the reflected light from the reference to control the power supply for the light detector 82 and thereby control its gain, that is, as the reflected light level decreases, the gain is increased. This would stabilize the output from the D.-C. amplifier 84 as far as gain is concerned. It is also desirable to ensure that the zero level does not drift. A zero control 87 provides for this by ensuring that when there is a no-signal condition at the output of amplifier 84, the output is zero. The multivibrator MV1 is used to gate the zero control 87. This circuit will be described in detail hereinafter when the different circuits are discussed.

The output signal from D.-C. amplifier 84 is applied to a gate circuit 88 which in effect has a gate open time as indicated by W9 in FIGURE 7H and which eliminates the standard reference pulse from the signal. Amplitude discriminator 89 is preferably set at a level as indicated at W10 in FIGURE 7G so that it will discriminate between signals representing areas of high reflectance and signals representing areas of lower reflectance. After the signal passes discriminator 89 and is squared in squarer circuit 90 it will have a waveform as shown by W11 in FIGURE 7J. The length of each pulse in W11 represents that portion of the scan where the reflectance value exceeded a certain predetermined level as set by the amplitude discriminator 89.

The integrator 80 which is gated by the main gate from gate extension circuit 79 then sums the output signal from the squarer 90 as shown in FIGURE 7K and applies signal $V_q$ to the decision circuit 75. Thus, the decision circuit has the two information signals applied to it—$V_a$ representing size and $V_q$ representing quality. The decision circuit then compares the two signals, and if one is greater than the other by a given amount a signal to accept or reject is passed on to flip-flops 91 at the end of the main gating signal. In the embodiment being described an acceptable fragment results in the deflecting air blast being prevented and a non-acceptable or reject fragment results in an air blast which deflects the fragment to waste.

The flip-flop 91 is part of the memory system which, it will be recalled, is necessary when several fragments may be in transit at one time. The memory system begins with a ring of three 76 which is switched by the flip-flop 78. The ring of three is simply three electronic circuits, containing tubes or semiconductors, which are switched to a given state one after the other in succession. Only one circuit may be in a particular control state at any one time. That is, if circuit I were in a given state such as with a tube conducting, then circuits II and III would be non-conducting. When a switching pulse is received from flip-flop 78, circuit II, for example, may become conducting and circuits I and III non-conducting. Similarly, on successive signals, III becomes conducting and then circuit I to begin the cycle once more.

There are three outputs from the ring of three 76, only one of which is shown in full. Each of the outputs would drive a flip-flop similar to 91. Therefore the flip-flops 91 in the three circuits would be switched in succession by the associated output from the ring of three 76.

If it is the turn of the flip-flop 91 and the following associated circuitry as shown to control, then it is triggered to the open condition by the ring of three 76. Suppose that a reject decision is then received by the flip-flop 91 from decision circuit 75, this reject signal does not affect the condition of flip-flop 91. When the flip-flop 91 was triggered to its open condition by ring of three 76, it started a timing circuit such as a Miller run down circuit 92. When the run down circuit reaches a certain level the single shot multivibrator MV2 is triggered to its other state. When MV2 resets, its output triggers single shot multivibrator MV3 to its other state. The resetting of multivibrator MV2 also resets flip-flop 91. It will be seen that there are three inputs to multivibrator MV3, one from each of three similar circuits controlled by the ring of three 76. Each circuit can trigger MV3 to its other state. It is obvious that this number can be increased depending on the number of fragments that may be in transit at the same time.

The single shot multivibrator MV3, when triggered, will fire the thyratron control 93 which opens the air blast valve 94 and directs a deflecting air blast on the passing fragment to reject it. The reset time of multivibrator MV3 is made so that it is long enough for the largest fragment to pass the air blast. In other words, when the multivibrator MV3 is triggered by one of its inputs it turns on the air blast just as the fragment to be rejected enters the area in front of nozzle 25 (FIGURE 1), and when MV3 resets it will turn off the air blast. The period of time the air blast is on would be sufficient to permit the largest fragment being sorted to pass the nozzle 25. As previously mentioned, this is not an efficient rejection mechanism because the air blast would be too long for smaller fragments, and provision is made to turn off the air blast as soon as the fragment has passed the nozzle.

For this purpose a differentiating circuit 77 differentiates the output signal from the squarer circuit 74 and uses the pulse representing the trailing edge of the squarer 74 output to trigger a delay circuit 95. The trailing edge of the output wave pulse from squarer 74 (waveform W4) represents the passing of the trailing edge a tail end of the fragment past light detector 18.

The delay circuit 95 may be any type of delay circuit that will provide sufficient delay for the tail end of the fragment to fall from light detector 18 to the nozzle 25 whereupon an output from the delay circuit 95 resets multivibrator MV3 prematurely and turns off the air blast. By this means the air blast is on just for that period of time that a fragment to be rejected is in front of the nozzle 25. A failure of the delay circuit 95 will, however, not permit the air blast to remain on continuously as the multivibrator MV3 will reset itself and turn off the air blast as explained previously.

The delay circuit 95 may comprise a series of single short multivibrators in order that more than one fragment may be tracked or followed between the area detecting portion, comprising light source 17 and light detector 18, and the air blast nozzle 25. If four single shot multivibrators are used in delay circuit 95, then three fragments can be in transit at one time. When the first multivibrator in the series has been triggered and reset it can be triggered again by another fragment which has passed detector 18.

The FIGURE 6 embodiment has been considered as it operates to reject a fragment. If a fragment is to be accepted, then the flip-flop 91 receives a signal from decision circuit 75 just after it is triggered by the ring of three 76. This signal resets the flip-flop 91 which in turn resets the run down circuit 92 before it triggers multivibrator MV2. As multivibrator MV2 is not triggered to its other state it does not trigger multivibrator MV3 and there is no air blast. There is no input signal from the other inputs to multivibrator MV3 as the ring of three 76 has not switched the other circuits to their operating condition.

The operation of the FIGURE 6 embodiment would be the same for each condition of the ring of three 76 except that a different path would be used between flip-flop 91 and multivibrator MV3.

A variation to the embodiment of FIGURES 1 and 6 was mentioned previously. It will be recalled that in the variation the light detector 18 was positioned and arranged so that it received light from the monitor light source 81 as a thin strip. Thus, in both cases detector 18 and a light source define a plane through which the fragments pass. However, light source 17 is an alternating light source and light source 81 is a source of steady light. In the variation, a mechanical chopper is arranged in the path of the light received by detector 18. This chopper interrupts the light at a predetermined frequency and the output from detector 18, as before, is a modulated alternating output such as the one shown at W1 in FIGURE 7. While this variation requires the addition of a chopper, it dispenses with light source 17 and its alternating power supply, and it eliminates the need for gate extension circuit 79. It will be apparent that, in this variation, the scanning plane of detector 82 and the plane of operation of detector 18 may be at the same level or positioned to intersect at the path of fall of the fragments and consequently there is no need for an extension to the main gate to allow for a fragment to fall from the timing/size plane to the quality scanning plane. With the exceptions just mentioned, the variation uses the same circuitry, that is, the FIGURE 6 circuitry, and the operating waveforms of FIGURE 7 apply.

Referring now to FIGURES 8 and 9, there is shown, respectively, a partial simplified block diagram of the circuitry and apparatus used in the embodiment of the invention described briefly in connection with FIGURE 2, and the waveforms occurring in portions of this circuitry. It will be recalled that, in this embodiment, the signal representing area or size and the signal representing quality are both derived from the output signal of light detector 82.

As before the scanning device 83 provides an output of sync pulses by means of iron slugs 63a (FIGURE 5A) which is amplified and controls the multivibrator MV1. The multivibrator MV1 serves several timing or synchronizing functions, one of which is to gate the zero control 87 and another of which is to gate the automatic gain control circuit 85. The operation of this portion of the circuitry is the same as has previously been given in connection with FIGURE 6. The output from the D.-C. amplifier 84 has a waveform as indicated in W14 of FIGURE 9A. Each section of the waveform W14 representing one scan bears a number corresponding to the scan across the fragment 13 as shown in FIGURE 9. The gates 88 and 88' both serve to remove the reference pulse from the signal and are timed as shown in W15 of FIGURE 9B. The timing of multivibrator MV1 with reference to the sync pulses is also indicated in FIGURE 9B. The signal as applied to the amplitude discriminators 89 and 89' is substantially the same, that is, it contains the results of the scanning with the standard reference portion gated out.

The amplitude discriminator 89 serves the same function as previously described and is set at a level indicated by W16 in FIGURE 9A. That is, discriminator 89 is set at a level to discriminate between signals resulting from areas of high reflectance and areas of lower reflectance on each fragment. The output from discriminator 89 is squared by squarer circuit 90 whereupon it has a waveform shown by W17 in FIGURE 9G. The signal is then integrated as indicated in W18 and an output signal $V_q$ representing quality is applied to decision circuit 75. The action is just the same as the action of the circuitry in FIGURE 6 to derive the quality signal.

After passing gate 88' the signal is applied to an amplitude discriminator 89' which is set at a level indicated by W19 in FIGURE 9A. This level is set slightly above the no signal level so that a signal is passed whenever an object is being scanned that reflects even a low amount of light. A squarer 90' squares the signal so that it is in the form shown by W20 in FIGURE 9C. The signal of the form W20 is applied to both an integrator 80' and a run down circuit 98. The run down circuit 98 is a type of timing circuit and may be of the type known as a Miller run down. As soon as a pulse is received, denoting an object entering the scanning area, the run down 98 is set and the squarer circuit 96 is triggered. As long as a pulse is applied to run down 98 for some portion of each scan, the circuit is reset and the run down continues. When the scan does not encounter an object and no pulse is applied to reset the run down circuit 98, the run down reaches a cut-off point where the squarer circuit is triggered to its former state. The waveform W21 in FIGURE 9D shows the action of a run-down circuit with the received pulses. When no pulse is received by the rundown circuit in scan 8 the critical point is reached at W22 and the squarer circuit is switched back.

The output of the squarer circuit 96 is used to gate or control the memory circuitry as before and is applied to the ring of three 76 and differentiating circuit 77. The output from squarer 96 also drives the flip-flop 97 which provides the main gate. This main gate is of the form shown at W23 in FIGURE 9E. It should be noted that a gate extension is not necessary in this embodiment as the area and scanning signals are derived from the same detector 82 and there is no vertical separation between area and quality detectors. The flip-flop 97 is used to gate integrator 80, integrator 80' and the decision circuit 75.

The integrator 80' sums the signal output from squarer circuit 90' as shown at W24 in FIGURE 9F and provides an output signal $V_a$ which is representative of area or size. The decision circuit, as before, receives the information signals $V_a$ and $V_q$ and makes a decision whether to accept or reject each fragment depending on the relative amplitudes of the two signals.

Certain portions of the circuitry of the embodiment of FIGURE 2 are not shown in FIGURE 8. These portions that are omitted are identical to those shown in the block diagram of FIGURE 6. The location is indicated by the dashed arrow extending from flip-flop 91 and differentiating circuit 77.

Referring now to FIGURES 10 and 11 which show, respectively, a partial block schematic of the circuitry and apparatus used in the two embodiments described briefly in connection with FIGURE 3, and the waveforms occurring in parts of the circuitry. As was previously described, the two embodiments differ only in the type of light that is provided by light source 28 and the scanning system which separates the area scan and the quality scan. Both embodiments use a double scan which alternately scans the light source 28 for an area evaluation and the light reflected from the falling fragment for a quality evaluation. Thus, the output from the D.-C. amplifier 84 would be the same in both embodiments and would be of the form shown as W25 in FIGURE 11A for the sample fragment 13 of FIGURE 11. The waveform W25 has the various area scans and quality scans indicated on it as A1 . . . A4 and 1Q . . . 4Q respectively, for the sample fragment shown in FIGURE 11. Because the area signal represents the light occulted in a direct scan of the steady light source 28, and the quality signal represents the reflected light, the two signals are in the opposite sense.

The operation of the zero control 87, which is gated from a different point, and the automatic gain control circuit 85, are the same as described in connection with FIGURE 6. The scanning device provides an output in the form of timing or sync pulse as before, but the repetition frequency is not the same. In these embodiments the iron slugs 63 are placed, one for each pair of scans, so that the multivibrator MV5 is triggered just in advance of the pulse from the amplifier 84 due to the standard reflecting surface. The timing is indicated in FIGURE 11B.

The multivibrator MV5 is the first of a series of five single shot multivibrators MV5 through MV9. When each of the multivibrators MV5–MV8 resets, it triggers the following multivibrator. When an amplified sync pulse is received from amplifier 86 it triggers MV5 which subsequently resets triggering MV6 which subsequently resets triggering MV7 and so on. These multivibrators provide timing functions.

The multivibrator MV5 is used to gate the automatic gain control circuit 85 on for the pulse caused by the standard reflector. This is indicated by waveform W26 in FIGURE 11K.

The multivibrator MV7 serves to trigger gate 88' (the area signal gate) to the open position for a period of time sufficient for the scanning of the strip light source 28. The gate 88' is closed for the rest of the cycle. The timing can be seen in waveform W27 of FIGURE 11B. The multivibrator MV7 is also used to time the zero control 87.

The multivibrator MV9 triggers gate 88 (the quality signal gate) to the open position for a period of time sufficient for the scan of the sorting zone for reflected light. The timing of gate 88 is shown at W28 in FIGURE 11G. The quality channel is only sensitive during the time that MV9 is triggered over.

The operation of the quality channel is generally the same as for the embodiment of FIGURE 8. The output from the D.-C. amplifier 84 is gated by gate 88 and is applied to amplitude discriminator 89 which discriminates between lower and higher levels of signal representing lower and higher reflectance characteristics in fragment 13. The higher level signal is passed, squared by squarer circuit 90 where it has the waveform shown as W29 in FIGURE 11H. Integrator 80 sums these pulses in waveform W29 as shown in W30 (FIGURE 11J) and provides an output quality signal $V_q$ for decision circuit 75.

The operation of the area channel is very similar to that of FIGURE 8 except that the signal is inverted by inverter 99 before being applied to gate 88'. The signal passes the amplitude discriminator 89' and the squarer circuit 90' whereupon it has a waveform indicated by W31 in FIGURE 11C. As in the previous description the signal is then applied to an integrator 80' and a run down circuit 98. The rundown circuit 98 operates as before, and the operation is indicated by W32 in FIGURE 11D. The critical run down level at W33 terminates the run down as shown in FIGURE 11E as waveform W34. The integrator 80' sums the area pulses of waveform W31 as indicated in W35 of FIGURE 11F and provides an output area signal $V_a$ for decision circuit 75.

The remaining portions of the circuitry and apparatus of the two embodiments are not shown as they are the same as in FIGURE 6. Repetition is believed to be unnecessary.

It is believed that the description thus far adequately discloses this invention, however a description of the actual circuitry used will now be given by way of example. It will be understood that in many cases there are circuits equivalent to those given which will operate satisfactorily. Such equivalent circuits are well known in the art.

Reference to FIGURE 24 will indicate the layout of the schematic circuit diagrams of FIGURES 12–23 as they form various embodiments of the invention. The layout of FIGURE 24A is for the embodiment described briefly in connection with FIGURE 1 and in more detail in connection with FIGURES 6 and 7. Similarly the layout of FIGURE 24B is associated with FIGURES 2, 8 and 9, FIGURE 24C with one embodiment of FIGURES 3, 10 and 11, and FIGURE 24D with the other embodiment of FIGURES 3, 10 and 11.

Discussing first the FIGURE 12 which is a schematic diagram of the light source 17 of FIGURE 6, a sealed tube 101 containing at a low pressure an inert gas, such as neon for example, has electrodes at both ends. An alternating voltage sufficient to break down the gas is applied to the electrodes from the secondary winding of transformer 103 through resistor 102. The resistor 102 limits the peak current through the tube 101. The primary winding of transformer 103 is connected in push pull fashion to the plate electrodes of a stage of power amplifier tubes 104 and 105. The tubes 104 and 105 may be operated as class B amplifiers to increase the efficiency. The amplifier tubes 104 and 105 are driven by tubes 106 and 107 which are operated as cathode followers. It will be noted that the cathode load resistors of tubes 106 and 107 are returned to the negative supply. A bias voltage is also applied to the grids of cathode followers 106 and 107 by a bias network comprised of resistors 109 and 119 connected between the negative supply and ground—the bias voltage being taken from the junction point of the two resistors 109 and 119. The potential of the cathodes of tubes 106 and 107 is sufficiently negative that tubes 104 and 105 are cut off except during the positive voltage swing of the signals on cathodes of tubes 106 and 107. The amplitude of the alternating signal applied to the grids of cathode follower tubes 106 and 107 is adjusted by means of dual potentiometer 108. A push pull oscillator comprising tubes 110 and 111 supplies an alternating voltage for the tubes 106, 107. The frequency of oscillation is determined primarily by the inductance of inductor 112 and the capacitance of capacitors 113 and 114. The plate voltage for the oscillator is obtained through an inductance 115 which is made sufficiently high that it does not interefere with oscillator operation. The oscillator circuit is well known and it is believed that no further description is necessary. The oscillator supplies an alternating signal that is amplified and applied across the electrodes of the tube 101 causing a discharge at twice the frequency of the oscillation. Adjustment of the oscillator frequency will provide the desired frequency of pulsating light from tube 101. This is the area light source, that is, the source that supplies the thin beam of light that is viewed by light detector 18.

The light detector 18 or area detector comprises the photocell 116 and some associated circuitry and may include a cathode follower to permit the detector 18 to be positioned away from the following circuitry. This is shown in FIGURE 13 where a voltage divider comprising resistances 117 and 118 is connected between a source of positive voltage (+) and ground. The voltage for the anode of photocell 116 is supplied with positive voltage from the junction of resistances 117 and 118. The anode of photocell 116 is bypassed to ground by capacitor 120. The photocell 116 is in the light path from the tube 101 and this light produces a pulsating current in load resistor 121. The voltage produced across resistor 121 is applied to the grid of cathode follower tube 122. The cathode follower output is applied to a common connection of capacitors 124 and 125. The capacitors 124 and 125 are in series and form a parallel resonant circuit with inductance 26. The capacitor 124 is made considerably larger than 125 so that the resonant circuit acts as a step-up device to produce a greater voltage at the top of inductance 126 than is applied to the junction of capacitors 124 and 125. The tuned circuit is tuned to resonate at the frequency of the pulsing light from source 17 and hence acts as a bandpass filter.

The alternating signal across inductance 126 is amplified by amplifier tube 127 and the output is coupled to the grid of tube 128 through capacitor 133. The grid of tube 128 is established at an average positive potential by means of a divider network comprising resistors 131 and 132 connected between the positive supply and ground. The cathode of tube 128 is connected to the plate of tube 130 which acts as the cathode load of tube 128. In other words, tube 128 is a conventional amplifier with tube 130 used as the cathode impedance. The gain of tube 128 is a function of the cathode impedance, which is the dynamic plate resisance of tube 130, and the dynamic plate resistance of tube 130 is a function of its applied grid voltage. Thus the gain of tube 128 can be controlled by varying the D.-C. voltage on the grid of tube 130. This is part of the automatic gain control amplifier shown in FIGURE 6 as 71.

The output from amplifier tube 128 is applied through capacitor 134 to the grid of a phase splitter tube 135. This is a conventional phase splitter with balanced load resistances 136 and 137 in the plate and cathode circuits. One output is taken from the plate of tube 135 and applied through capacitor 138 to the grid of amplifier tube 141. Similarly the other output is taken from the cathode of tube 135 and applied through capacitor 140 to the grid of amplifier tube 142. Amplifier tubes 141 and 142 form a push pull driver stage whose output is applied to the primary of transformer 143.

The transformer 143 has a centertapped secondary winding. One end of the winding is connected to the cathode of diode 144 and the other end is connected to the cathode of diode 145. Thus equal and opposite voltage are applied to the cathodes of the diodes 144 and 145 so that the diodes act as a full wave rectifier producing a load current through resistance 146. The direction of current through resistance 146 is such that the top end of the resistance is negative with respect of the bottom. A capacitor 147 is across the resistance 146 to produce the ripple voltage which occurs at the frequency of the pulsing light source 101. The tubes 144 and 145 and their associated circuitry constitute the detector portion of the inverter-detector 72 of FIGURE 6. The voltage between the top of resistance 146 and ground is the area detector output designated AA for the purpose of showing the point at which it connects to the circuitry of FIGURE 15.

Where portions of a circuit extend from one figure to another figure designation terminals have been included on the circuits where two figures join. These terminals are to assist in following the circuitry.

Returning to the detector portion of FIGURE 13, a resistance 148 and a potentiometer 150 are connected in series between the positive supply and ground to form a voltage divider with a variable positive voltage obtainable between the tap on the potentiometer 150 and ground. The voltage between the tap of potentiometer 15 and ground is in series with the voltage drop across resistance 146, and therefore the voltage at the top end of resistance 146 may be adjusted by means of potentiometer 150. The potential at the top end of resistance 146 is normally adjusted so that it is zero with respect to ground when there is no obstruction between the light source 101 and photocell 116. A decrease in the light received by cell 116 because of a passing fragment will then create a positive signal at the top end of resistance 146 with respect to ground. This is the inverter action of the inverter-detector 72 in FIGURE 6.

The output voltage from one half of the secondary of transformer 143 is applied through a capacitor 151 to the top end of a voltage divider comprising resistors 152 and 153, and a portion of the voltage from one half of the secondary winding is therefore applied to the grid of tube 160. The average potential on the grid of tube 160 is equal to the value of the negative power supply (designated with a minus sign) to which the lower end of resistor 153 is connected. Resistors 154 and 155 series connected between the negative supply and ground also form a voltage divider. The cathode of tube 160 is connected to the junction of these resistors 154 and 155. The values of resistors 152, 153, 154 and 155 are such that the cathode is more positive than the grid, and in the absence of an alternating signal the tube 160 is cut off. If an alternating signal having a positive swing sufficient to overcome the bias is applied to the grid of tube 160, the tube will conduct. The plate load of tube 160 comprises relatively large resistance 157 and capacitor 158. When tube 160 conducts it produces its plate current is sufficiently high to produce a voltage across capacitor 158 in a relatively short time. However, after the tube is cut off again the voltage across capacitor 168 discharges through resistance 157 at a relatively slow rate. In other words the potential on the plate of tube 160 can decrease rapidly but increases toward ground potential very slowly. The plate of tube 160 is directly connected to the grid of tube 130. This completes an automatic gain control loop. The amplifier and automatic gain control circuit are indicated in FIGURE 6 as AGC amplifier 71.

The action of the automatic gain control circuit is straight forward. If the output voltage across one half the secondary of transformer 143 increases to a value that overcome the bias on tube 160, the tube 160 conducts producing a negative voltage at its plate and consequently at the grid of tube 130. The dynamic plate resistance of tube 130 is increased whereby the gain of amplifier tube 128 is decreased with a resulting decrease in the gain of the amplifier channel. This of course reduces the voltage on the secondary of transformer 143. The tendency is therefore to stabilize the gain at a fixed value. It is undesirable, however, to maintain the output voltage from transformer 143 at a constant level, for if this were done, the changes in light falling on photocell 116 would not result in an output signal at AA. It is desirable to maintain the output voltage of transformer 143 constant during the time when there is no obstruction between light source 101 and photocell 116. As previously noted, when the output voltage from transformer 143 falls, the tube 160 ceases to conduct and capacitor 158 discharges slowly through resistance 157. As a result, a relatively long time is required for the gain of the amplifier channel to be increased. On the other hand, when tube 160 conducts it can produce a voltage across capacitor 158 relatively quickly. In fact, the action can be fast enough that the voltage established across capacitor 158 depends primarily on the value of light falling on photocell 116 when there is no obstruction between the cell 116 and the tube 101 (light source 17).

Thus a stabilized output representing the amount of light occulted by each fragment is available at the point indicated as AA on FIGURE 13. As previously explained this area signal output will have a waveform of the type indicated at W2 in FIGURE 7B.

Reference is now directed to FIGURE 14 which is a schematic circuit diagram of a steady light source, that is of a light source with a direct current supply. This is the type of light source that is used in monitor 21. The tubes indicated as 161 and 162 in FIGURE 14 are used to represent a group of tubular lamps shown as 31 in FIGURE 4. As previously explained these lamps 161 and 162 are preferably of tubular form for convenience and, while they may be any type of lamp, the conventional fluorescent lamp is suitable for most purposes. The lamp connections and direct current supply are conventional and well known. Alternating power is applied through the contacts of normally closed relay 164 to the primary of transformer 160. The secondaries of transformer 160 supply power to the lamp filaments at one end of each of the two lamps 161 and 162. The lamps are connected to present a series direct current path from a supply through relay coil 163 of relay 164 to ground. The direct current voltage supply is sufficiently high to produce a conduction over this path. The alternating power to the filaments is to initiate conduction through the lamps. Once conduction starts the direct current through relay coil 163 opens the relay contacts and removes the power from the filaments. The direct current power supply may comprise a transformer 165 to step up the voltage and a full wave rectifier system using a series of rectifiers 166 and 167. The output is filtered by chokes 168 and 171 in conjunction with capacitors 170 and 172. The load resistance 173 is to limit the current through the lamps. This same supply can be used for supplying light source 28 (FIGURE 3) when a steady rather than a pulsed supply is required. This will be mentioned later.

The lamps 161, 162 etc. supply the light from monitor 21 (FIGURE 4) to the sorting zone. Fragments of rock falling through the sorting zone reflect light which is scanned and directed to the photomultiplier tube 60 in the monitor 21 (FIGURE 4). The details of the sample circuitry associated with the light detector 60 are shown in FIGURE 15. The circuitry of FIGURE 15 roughly coersponds to the light detector 82, D.-C. amplifier 84 and automatic gain control circuit 85 of FIGURE 6.

Referring now to FIGURE 15, the photomultiplier tube 60 has a cathode on which light impinges. The anode of tube 60 is connected through resistance 175 to ground. This resistance 175 is the anode load. The last dynode in the photomultiplier tube 60 is supplied with a negative potential obtained from the junction of divider resistors 176 and 177 which are connected in series between the negative supply and ground. The remaining dynodes in photomultiplier tube 60 are supplied over lead 174 with negative potential produced by a power supply of variable voltage. Since the gain of a photomultiplier is dependent to a large extent on the potential between dynodes, the adjustment of this potential affords an excellent means of and the negative pulse applied to the grid of tube 257 cuts it off. When the plate current in tube 257 stops there is no voltage drop across resistor 258 and tube 256 is permitted to conduct. The tube 257 is cut off for a short period primarily determined by the resistances 262 and 263 and the capacitor 264. Thus tube 256 is gated to conduct for a short period immediately following the scanning of the standard reflector. When tube 256 is permitted to conduct either tube 250 or tube 251 will also conduct. Suppose for the moment that the potential on the grid of tube 250 is positive with respect to ground, i.e. the output BB is positive. Current will flow through tube 250 and produce a positive potential on the cathode of tube 251 cutting it off. On the other hand, if the voltage applied to the grid of tube 250 is negative at the time it is permitted to conduct, it will not conduct, but tube 251 will conduct as its grid is grounded and has no negative voltage on it. Under the conditions where the voltage on the grids of tubes 250 and 251 are equal, that is at ground potential, when they are permitted to conduct, both tubes 250 and 251 will conduct.

It will be seen that when the voltage on the grid of tube 250 is positive and it is permitted to conduct, a negative pulse will appear across load resistance 252, but if a negative voltage is on the grid of tube 250 at this time, a negative output pulse will appear across load resistance 253. When the input signal on the grid of tube 250 is zero, at this time, negative pulses will appear across both resistances 252 and 253.

The output from tube 250 is coupled by capacitor 255 to the cathode of diode 270 and the plate of diode 267, and the output from tube 251 is coupled by capacitor 254 to the plate of diode 268 and the cathode of diode 266. When tube 250 produces a negative going pulse, the diode 270 conducts producing a current through load resistance 271 and charging capacitor 273. At the same time the capacitor 255 assumes a difference potential because of the current through diode 270. At the end of the pulse, the plate of tube 250 again assumes the potential of the supply voltage and capacitor 255 is restored to its normal state by a current through diode 267. A similar action takes place when a negative output pulse is produced by tube 251. The diodes 266 and 268 are, in this case connected in the reverse manner. The negative pulse causes a current flow through diode 266, and after the pulse, the charge on capacitor 254 is restored by a current through diode 268.

If the tube 250 is conducting and producing output pulses, capacitor 273 will be charged negatively and capacitor 274 will not be charged. If tube 251 is conducting and producing output pulses the capacitor 274 is charged positively. A voltage divider network comprising resistances 275 and 276 is connected across the two capacitors 273 and 274. The junction of resistances 275 and 276 therefore provides a negative output when tube 250 conducts and a positive output when tube 251 conducts. When both tubes 250 and 251 conduct there is no output at the junction of resistances 275 and 276. This output has an integrating capacitance 278 connected to it. The output is applied to a conventional D.-C. amplifier tube 280. The cathode of tube 280 is established at a negative potential by a divider comprising resistors 283 and 282 connected between the negative supply and ground. The resistors 282 and 283 are proportioned so that when there is no voltage across capacitance 278, there is approximately zero output volts on the plate of tube 280 with respect to ground. This output at the plate of tube 280 goes by means of terminal CB to the grid electrode of tube 178 (FIGURE 15).

The action of this zero control circuit is described as follows. After the scanner completes a scan of the reference reflector 65 (FIGURE 4), the scanner completely cuts off the light to the photomultiplier tube 60 for a short period of time. While the light is prevented from reaching the photomultiplier tube 60, the zero control circuit is gated on. This is shown in the block diagram of FIGURE 6 and has just been described in connection with FIGURE 16. During this time the output from the photomultiplier tube 60 is zero and the output at BB from the D.-C. amplifier channel should also be zero. If it is not zero but is for example positive, tube 250 will conduct and produce a negative signal on the grid of tube 280 as just explained. This will decrease the plate current through tube 280 and cause its plate voltage to go more positive. This positive going voltage change is applied through resistance 188 to the grid of tube 178, the first tube in the D.-C. amplifier channel. Since the D.-C. amplifier produces a positive output voltage for a negative input signal, the positive change applied to the grid of tube 178 will adjust the D.-C. amplifier output at BB in a negative direction. The inverse action takes place if the output at BB is negative during that same period of time when light is cut off from the photomultiplier tube 60. It should be noted that due to the action of integrating capacitance 278, a large number of pulses from either tube 250 or tube 251 are required to adjust the D.-C. amplifier by an appreciable amount. The use of a short time constant would tend to cause the control voltage on CB to vary between the pulses from either tube 250 or tube 251.

Figure 16:
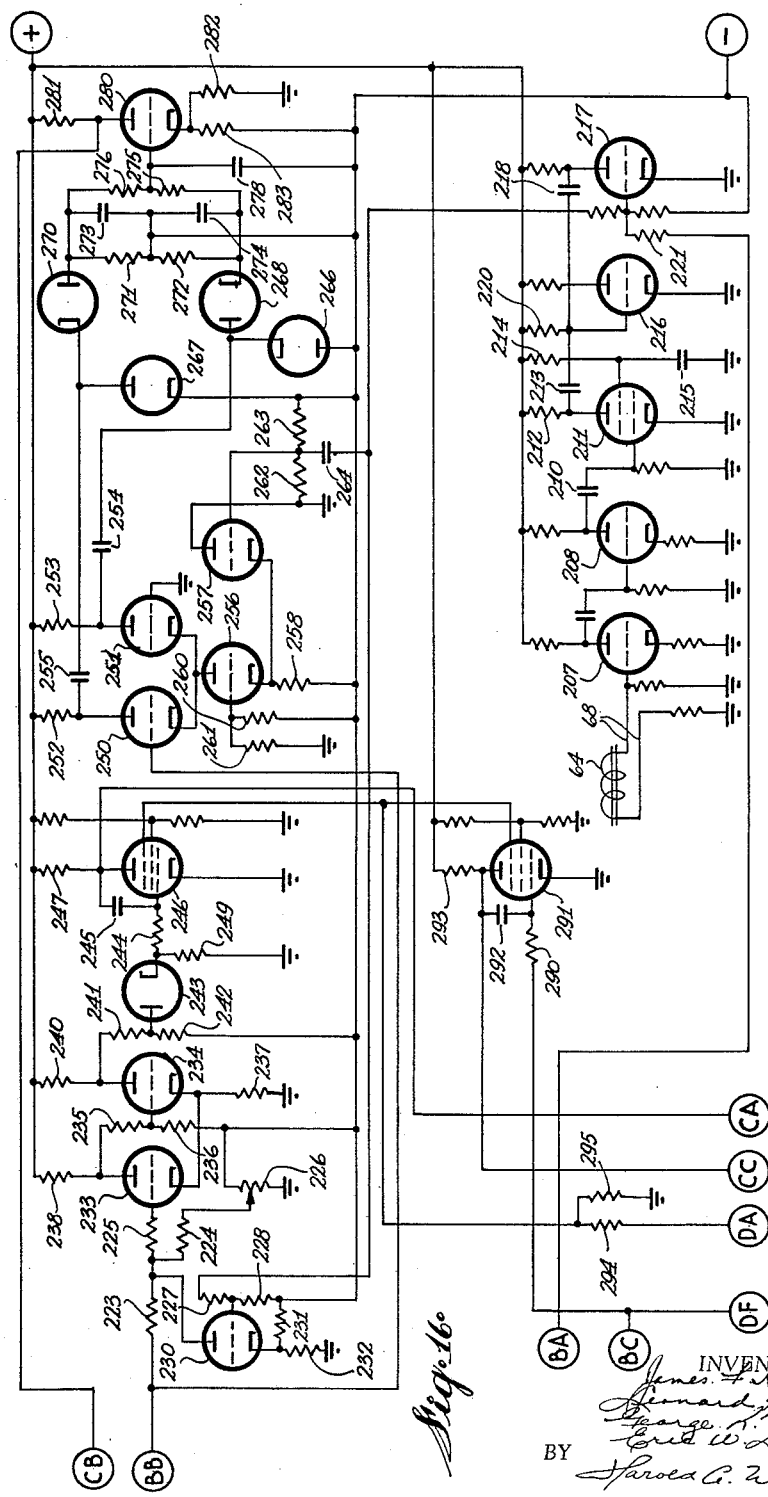

Still referring to FIGURE 16, the output from the area detector (inverter detector 72 of FIGURE 6) is applied from terminal designated BC through resistance 290 to the first grid of tube 291. The tube 291 and its associated circuitry comprise an integrator circuit of the type known as a Miller rundown integrator circuit. This is the integrator 73 of FIGURE 6. The suppressor grid of tube 291 is supplied with a gating voltage from DA by means of resistance 294. It will be recalled that the voltage from DA was also used as a gating voltage on the suppressor grid of tube 256 and that it is such that the suppressor grid is negative until a fragment or other object enters the sorting area whereupon it rises to near zero level and remains there until the ore fragment leaves the sorting area. When a fragment enters the sorting area not only does the suppressor grid voltage rise to permit plate current flow through tube 291 but a positive voltage from BC is applied to the grid of tube 291. The plate current of tube 291 thereby increases at a rate determined by capacitance 292, resistor 290 and the amplitude of the positive signal applied to the first grid. When the fragment leaves the sorting area the voltage drop $V_a$ across the load resistance 293 is a measure of the cross sectional area of the fragment. The action of the circuitry and tube 291 can be seen by referring to waveform W7 of FIGURE 7F. The area signal or size signal will appear at terminal CC.

Figure 17:
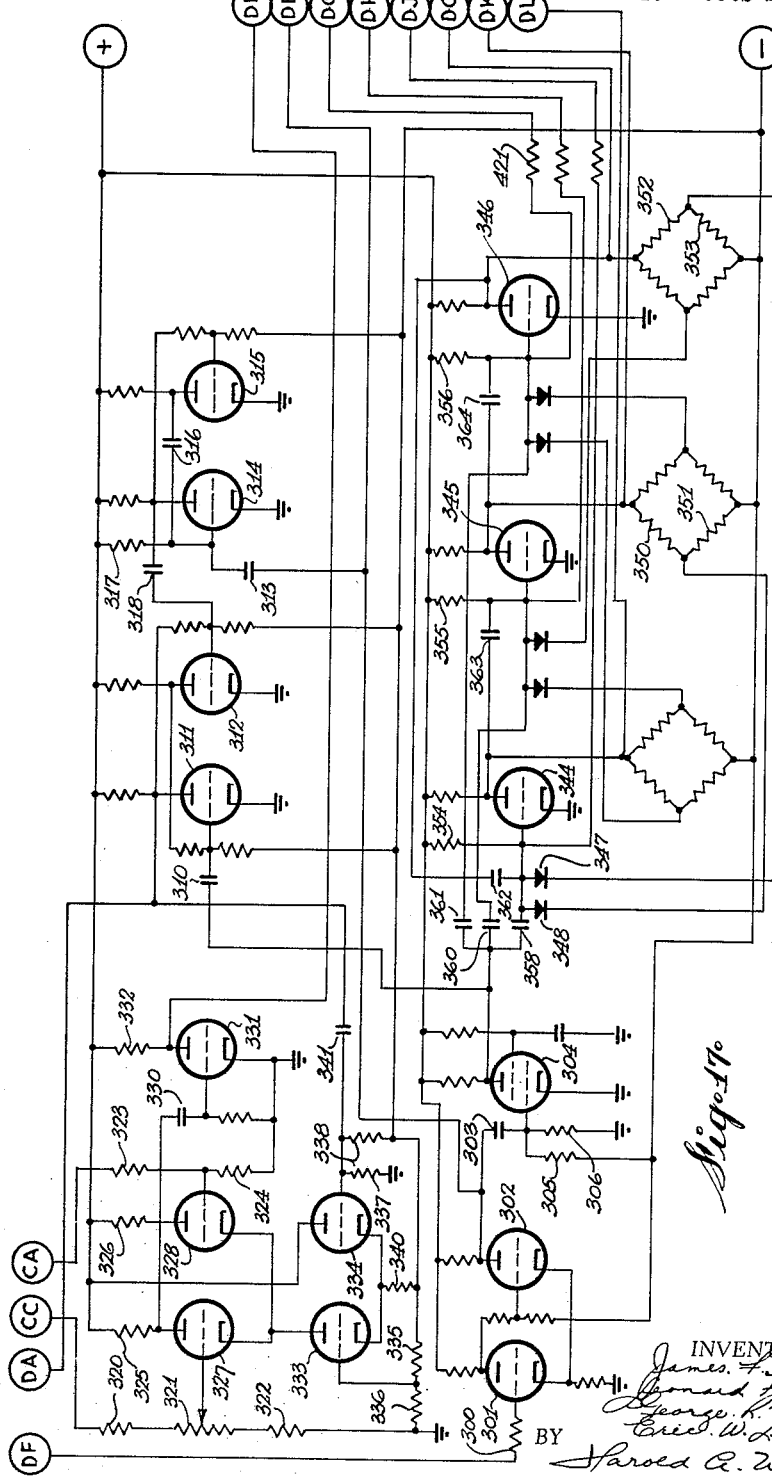

Referring now to FIGURE 17, the terminal designated DF has on it the output signal from the area detector (inverter detector 72 of FIGURE 6), and this signal would be of the type shown by sample waveform W2 for the fragment shown in FIGURE 7. The signal is applied through a current limiting resistance 300 to the grid of tube 301. The tubes 301 and 302 are connected as a squaring circuit (squarer circuit 74 of FIGURE 6). The action of this squaring circuit is similar to that of squaring circuit comprising tubes 233 and 234 which was previously described. The squaring circuit would provide an output of the type shown by W4 for the fragment of FIGURE 7. This output is used in several circuits, one of which contains tube 304. The output is differentiated by capacitor 303 and fed to the grid of tube 304. The tube 304 is normally cut off because of the negative bias on the grid from the divider comprising resistances 305 and 306. The differentiated positive pulse produced when the squarer circuit switches from tube 302 to tube 301 is applied to the grid of tube 304 resulting in a short pulse of plate current. This produces a negative going voltage pulse on the plate of tube 304 which is substantially coincident with the entry of a fragment into the beam between the light source 17 and the light detector 18 of FIGURE 6. The negative pulse is applied through capacitor 310 to the grid of tube 311. Tubes 311 and 312 comprise a flip-flop. Such circuits are well known. The action of a flip-flop is such that only one tube may conduct at one time and that conduction may be switched from one tube to the other by a trigger pulse. The negative pulse applied to the grid of tube 311 switches the conduction of the flip-flop from tube 311 to tube 312.

Once a fragment has passed the area light detector (detector 18 of FIGURE 6 or photocell 116 of FIGURE 13) the squarer circuit comprising tubes 301 and 302 will switch so that tube 302 is conducting once more and the voltage on plate of tube 302 goes in a negative direction. This negative signal is differentiated and applied through capacitor 313 to the grid of tube 314. Tubes 314 and 315 comprise a single shot multivibrator whose normal state is with tube 314 conducting. A positive pulse applied to the grid of tube 314 would have no effect as the tube is already conducting, however, a negative pulse will transfer conduction to tube 315. Tube 315 continues to conduct for a time depending on the time constant of the circuit including capacitor 316 and resistor 317. When the period of conduction of tube 315 is over, conduction is transferred to tube 314 and a negative going voltage is produced at the plate of tube 314. This negative signal is coupled through capacitor 318 to the grid of tube 312. It will be recalled that tubes 311 and 312 comprise a flip-flop and that conduction was transferred to tube 312 when a fragment or other object entered the sorting zone. The signal from the plate of tube 314 restores the conduction in the flip-flop to tube 311. Thus, the flip-flop comprising tubes 311, 312 is switched at the time an object enters the sorting zone by crossing the thin beam between lamp 101 and photocell 116 (source 17 and detector 18 of FIGURE 6) and it is restored to its original state a predetermined time after the fragment has passed the thin beam. This predetermined time is the reset time of the single shot multivibrator comprising tubes 314 and 315, and it is designed to be just long enough so that the tail end of fragment leaving the thin beam at the area detector will have time to be completely scanned by the monitor. In other words the flip-flop and multivibrator comprising tubes 311, 312 and 314, 315 respectively, provide the main gating signals, the multivibrator creating the extension of gate extension 79 (FIGURE 6). The main gating waveform is shown as W6 in FIGURE 7E. This main gating waveform is available at the plate of tube 311 and is coupled via DA to FIGURE 16 to a divider comprised of resistances 294 and 295. The suppressor grids of the area integrator tube 291 and the quality integrator tube 246 are gated from this point as was previously explained. The resistances 294 and 295 are so chosen that when tube 311 is conducting, the voltage on the suppressor grids of the two integrator tubes is negative, cutting off the plate current in these tubes. When tube 311 is nonconducting the voltage at the junction of resistances 294 and 295 is near ground potential to permit conduction through tubes 291 and 246.

The area or size signal is at CC of FIGURE 17, and the quality signal is at CA. These signals go to a decision circuit (block 75 in FIGURE 6). The area signal is applied to one end of a voltage divider comprising resistor 320, potentiometer 321 and resistor 322. The other end of the divider network is grounded. The variable tap on potentiometer 321 is connected to the grid of tube 327. The voltage at the grid of tube 327 is therefore of the form shown as W7 in FIGURE 7F except that the amplitude has been reduced by the division factor of the input divider. The quality signal is applied from CA to one end of resistor 323. The other end of resistor 323 is connected to resistor 324, the other end of which is grounded. Resistors 323 and 324 comprise a fixed voltage divider. The junction of resistors 323 and 324 is connected to the grid of tube 328. The voltage on the grid of tube 328 will be that of W12 in FIGURE 7K except that the amplitude has been reduced by the factor of the divider network. Therefore, it is evident that at the end of the gating period the grids of tubes 327 and 328 are at a potential determined by the integrated area and integrated quality signals.

Tubes 327 and 328 comprise a long tail pair with a common cathode impedance composed of tube 333 in series with a cathode resistor 340. The grid of tube 333 is connected to a source of a constant negative potential produced by a divider network of resistances 335 and 336 connected in series between the negative supply and ground. A similar divider network comprising resistances 337 and 338 is connected in series between the negative supply and ground. The grid of tube 334 is connected to the junction of resistances 337 and 338. The divider networks are designed so that the grid of tube 334 is positive with respect to the grid of tube 333. The plate of tube 334 is connected directly to the positive supply. Plate current passing through tube 334 and through common cathode resistor 340 produces a positive potential on the cathode of tube 333 which will bias it to a cut off condition. When tube 333 is cut off no current can flow through either tube 327 or 328. A differentiating capacitor 341 couples the grid of tube 334 to the plate of tube 311.

It will be recalled that the plate of tube 311 has a waveform on it that is used as the main gate (W6 of FIGURE 7E). At the end of the gating cycle the potential on the plate of tube 311 suddenly decreases. This negative going signal is differentiated by capacitor 341 and fed to the grid of tube 334 turning off the plate current in the tube. This permits the tube 333 to conduct. If, at the instant tube 333 is allowed to conduct, the potential on the grid of tube 327 is more positive than the potential on the grid of tube 328, then tube 327 will conduct. This will produce a cathode potential on the cathode of tube 328 that is greater than the grid potential on tube 328 and the tube 328 will not conduct. The converse is true if the potential on the grid of tube 328 is more positive than the potential on the grid of tube 327 at the instant tube 333 is permitted to conduct. Therefore, at the end of a gating period when tube 333 is permitted to conduct, if the grid potential of tube 327 is more positive than the grid potential of tube 328, a negative going signal is produced across plate load resistance 325.

The negative going signal on the plate of tube 327 is coupled through capacitor 330 to the grid of tube 331. The tube 331 is normally conducting fully and a negative signal from tube 327 will produce a positive going signal at the plate of tube 331. This positive signal is in the form of a pulse and is used in subsequent circuits to inhibit the rejection mechanism and thereby cause a fragment to be accepted. This positive output pulse from the decision circuit is available at terminal $DB$.

The tubes 344, 345, and 346 comprise a ring of three circuit (ring of three block 76 in FIGURE 6). This is a known type of circuit in which only one tube of three is permitted to conduct at a given time. To produce this effect, the grid of any one tube is connected through diodes to dividers in the plate circuits of the other two tubes. For example, resistors 352 and 353 form a voltage divider with one end connected to the plate of tube 346 and the other end connected to the negative supply. Similarly, resistors 350 and 351 form a voltage divider with one end connected to the plate of tube 345 and the other end connected to the negative supply. A diode 347 connects the grid of tube 344 to the junction of resistors 352 and 353, and a diode 348 connects the grid of tube 344 to the junction of resistors 350 and 351. The resistance dividers in the plate circuits are so proportioned that when a tube is conducting the voltage at the junction of the resistors will be negative, and when a tube is non-conducting the controlling the gain of the sensing system to maintain a predetermined standard.

The output from the photomultiplier tube 60 appears across resistance 175 and is directly applied to the grid of tube 178. The tube 178 is connected as a D.-C. amplifier with a bias resistance 179 and a load resistance 180. The output from the plate of tube 178 is applied to one end of a voltage divider network comprising resistors 181 and 182 in series between the plate of tube 178 and the negative supply. The junction point of the two resistors 181 and 182 is connected directly to the grid electrode of tube 183. Tube 183 is also a D.-C. amplifier as is tube 185. The output of tube 185 is directly coupled to the grid of tube 186, as before, but the tube 186 is connected to function as a cathode follower with its cathode resistor 187 being connected to the negative supply. It is therefore possible to have the output from the cathode of tube 186 either positive or negative with respect to ground. The tubes 178, 183, 185 and 186 comprise a D.-C. amplifier (84 in FIGURE 6). The plate and cathode resistances of these tubes, and the values of resistance in the divider networks, are chosen so that a zero input voltage on the grid of tube 178 provides a zero output voltage on the cathode of tube 186 and the tubes are all operating in the linear portion of their characteristic.

As was previously mentioned, in a D.-C. amplifier of this type drift is frequently a problem, and since it is necessary for proper operation of subsequent circuits that the output voltage from the cathode of tube 186 be zero in the absence of a signal from photomultiplier 60, a zero control circuit (87 in FIGURE 6) is provided to apply a voltage to the grid of tube 178 through resistance 188 to adjust the "no signal" voltage to zero. The terminal for this control voltage is marked CB to identify it with the corresponding terminal in the adjoining figure. The zero control circuit will be described in connection with FIGURE 16.

The output from the cathode of tube 186 appears at a terminal identified as BB and this output would have a waveform of the type indicated as W8 in FIGURE 7G for the sample fragment of FIGURE 7. This output also appears across the voltage divider comprising resistors 189 and 190 connected in series between the cathode of tube 186 and the negative supply. The divider is proportioned so that when the output from the tube 186 is near zero, the voltage at the junction of resistors 188 and 189 is negative. This junction point is connected directly to a first grid of a grid controlled gaseous rectifier tube such as a thyratron 191. The second grid of the tube 191, which is connected to a terminal designated BA for ease of tracing to adjoining sheets, is connected to a gating voltage that is the inverse of that shown as W9 in FIGURE 7H. This voltage is obtained from multivibrator MV1 of FIGURE 6, to be described subsequently in more detail in connection with FIGURE 17. The potential on the second grid of tube 191 goes to a value of approximately zero during the time that the output at BB is derived from the scan of the standard reference reflector. At other times the second grid is held sufficiently negative to prevent plate current flow through tube 191. The operation of tube 191 is such that, when the gating voltage on the second grid is near zero potential and the control grid approaches a potential sufficiently near zero, the tube conducts discharging capacitor 193. The capacitor 193 then charges slowly through anode resistance 192. Two resistors 194 and 195 are series connected between the plate of tube 191 and the negative supply to form a divider network. The resistors 194 and 195 are proportioned so that when tube 191 is not conducting the voltage at the junction of the resistors is slightly positive. This voltage is applied directly to the grid of tube 197 which is in series with a high voltage supply. The high voltage supply is a conventional one comprising a transformer 204 with its primary connected to an alternating source and its secondary connected to a half wave rectifier composed of diodes 203. The pulsating direct current is filtered by the inductance 201 in combination with capacitors 200 and 202. The output voltage from the supply is applied over line 174 to photomultiplier tube 60. This voltage appears across resistance 198 and is the voltage across capacitance 200 less the drop in tube 197. Thus, an increase in bias on the grid of tube 197 will lower the voltage across resistance 198.

The action of the automatic gain control circuit (85 in FIGURE 6) is as follows. If when the gated second grid of tube 191 is near ground potential and no signal is produced at BB sufficient to cause conduction in tube 191, the anode voltage will be near the supply voltage and the voltage on the grid of tube 197 will be slightly positive or zero. The voltage drop across tube 197 is therefore small and nearby full output voltage is applied to photomultiplier tube 60. This would mean that the output of the photomultiplier tube 60 would be high and the output at BB would be high. However, a high output signal at BB, including a high portion due to the signal from the standard reference reflector, would cause the thyratron to fire, discharging capacitor 193. The capacitor 193 then begins to charge slowly but the time constant of capacitor 193 and resistor 192 is such that it is again discharged before reaching a very high value. The average potential at the plate of tube 191 is therefort lowered with respect to the voltage when tube 191 is not conducting. As a result, the voltage applied to the grid of tube 197 becomes more negative and produces a higher voltage drop across tube 197. This decreases the voltage supplied to the photomultiplier tube 60 over conductor 174. Capacitor 196 connected between the grid of tube 197 and ground is an integrating capacitor which averages the voltage applied to the grid of tube 197 over many cycles of scan. Because of this, the voltage supplied over conductor 174 does not change rapidly, but changes slowly until a point is reached where the tube 191 fires only occasionally to maintain the output at BB constant for a constant output from the standard reference reflector scan.

Referring now to FIGURE 16, the magnetic pick up head 64 that is mounted in the monitor 21 of FIGURE 4, is shown connected by cables 68 to the input circuit of tube 207. The tubes 207 and 208 comprise a resistance-capacitance coupled amplifier of conventional design which amplifies the synchronizing pulses, or "sync" pulses, from the pickup head 64. It will be recalled that the pulses occur when the soft iron slugs 63 on the scanning disc 55 (FIGURES 4 and 5) pass the pick up head 64.

The output from amplifier tube 208 is applied through capacitor 210 to the grid of tube 211. The circuit of tube 211 is unconventional in that it has a screen resistance 214 that is very large compared to the plate load resistance 212. Even though the grid of tube 211 is at ground potential and there is no bias on the tube before a pulse from the pick up head 64 appears on the grid, the plate current is very low due to the high screen resistance. The output from the pick up head 64 has a waveform which goes negative and then quickly through zero into the positive region. The negative portion of a wave at the pick up head will cause a negative going voltage at the plate of tube 208 which cuts off the plate current and the screen current in tube 211. Screen capacitor 215 then charges positively through resistance 214 from the positive supply. When the waveform quickly changes to a positive value the potential on the plate of tube 208 will increase positively. The tube 211 will then draw a momentary pulse of plate current while screen capacitor 215 is discharging. A short sharp negative going signal is thereby produced at the plate of tube 211. This pulse is applied to a single shot multivibrator by means of capacitor 213. The single shot multivibrator comprises the tubes 216 and 217 and is the multivibrator MV1 of FIGURE 6. In this multivibrator, the at rest condition is with tube 216 conducting and the negative trigger pulse from tube 211 switches the conduction to tube 217 for a time depending on the values of capacitor 218 and resistor 220. Thus, a potential exists on the grid of tube 217 which is negative before the arrival of a pulse from the pick-up head 64 and then goes quickly to near zero where it remains until the multivibrator switches back to its normal state. This potential on the grid of tube 217 is applied through resistor 221 to terminal BA and thence to the second grid of tube 191 of FIGURE 15 where it gates the automatic gain control action as previously described. This multivibrator also supplies gating signals to other circuits as will be mentioned later.

The output from the D.-C. amplifier of FIGURE 15 (BB) is applied to the end of resistor 223. This resistor 223, along with resistor 224 and potentiometer 226 form a network which performs the amplitude discrimination function of block 89 of FIGURE 6. The potentiometer 226 is connected between the negative supply (−) and ground and a variable negative voltage is therefore available at the variable tap or arm of the potentiometer. This negative voltage is set so that when the output from the D.-C. amplifier, i.e. at BB, is zero, the voltage at the junction of resistors 223 and 224 is negative. Referring to FIGURE 7G it will be noted that a discriminator level W10 is indicated. It will be evident that the correct adjustment of the tap on potentiometer 226 will make the junction of the resistors 223 and 224 assume a potential near zero at this level W10 of the signal. This junction point is connected to the grid of tube 233 through resistor 225. Tubes 233 and 234 comprise a squaring circuit (squarer circuit 90 of FIGURE 6) which has an action as follows. With the grid of tube 233 negative the plate current is cut off and the plate voltage high. A portion of the voltage on the plate is applied to the grid of tube 234 through a divider comprising resistors 235 and 236. The lower end of the divider is connected to the negative supply and the resistance values chosen so that the grid of tube 234 is positive when tube 233 is cut off. The tube 234 therefore is conducting and has a low plate voltage. The voltage drop across resistor 237 caused by the plate current flow, is applied to the cathode of tube 233. As the grid voltage increases in a positive direction on tube 233 a point is reached where the tube 233 begins to conduct. This increases the voltage drop across resistor 237 and reduces the voltage on the plate of tube 233. The reduction in plate voltage acts through the resistance network 235, 236 to reduce the grid voltage on tube 234. The increased voltage drop across resistor 237 and the change of grid voltage in a negative direction on the grid of tube 234 tend to decrease current through tube 234. This reduces the potential across resistor 237 and encourages tube 233 to increase its conduction. The action is regenerative so that an almost immediate transfer of conduction from tube 234 to 233 occurs. The reverse action takes place when the voltage on the grid of tube 233 is taken from a positive value towards a negative one. Regardless of the input waveform on the grid of tube 233, a rectangular output wave is produced on the plate of tube 233. The output from the plate of tube 234 would be of the form W11 in FIGURE 7J if that portion of the signal representing the scanning of the standard reflector were removed. This scanning portion of the signal is removed by the tube 230 and its associated circuitry which constitutes the gate 88 of FIGURE 6.

Still referring to FIGURE 16, the plate of tube 230 is connected to the junction point of resistors 223 and 224. A divider network of resistances 231 and 232, series connected between the negative supply and ground, provide at their junction a negative potential that is applied to the cathode of tube 230. A divider network of resistances 227 and 228 is connected between the plate of tube 216 and the negative supply. The grid of tube 230 is connected to the junction of these resistances 227 and 228. When a sync pulse from the magnetic pick up head 64 triggers the single shot multivibrator comprising tubes 216, 217, the plate voltage on tube 216 goes positive and acts through the divider network 227, 228 on the grid of tube 230. Thus, a voltage having a waveform which is the inverse of waveform W9 in FIGURE 7H is applied to the grid of tube 230. Tube 230 therefore conducts during that portion of the scanning cycle when the standard reflector is being scanned. When tube 230 conducts there can be no signal from BB at the junction of resistances 223 and 224 and consequently no output from the squarer circuit of tubes 233 and 234. Any effect of the pulse from the standard reference reflector is eliminated.

Resistors 241 and 242 are connected in series between the plate of tube 234 and the negative supply. The junction of these resistors is connected to the plate electrode of diode 243. The resistors 241 and 242 are proportioned so that when tube 234 is conducting and its output voltage is low, the voltage applied to the plate of diode 243 is negative. The diode 243 does not conduct because its cathode is established at approximately ground potential by resistor 248. When a signal is obtained from the plate of tube 234, the potential on the plate of diode 243 goes positive. A positive voltage is transferred over resistance 244 to the grid of tube 246. The tube 246 with its associated circuitry comprises an integrator circuit such as the type known as a Miller rundown integrator circuit. The suppressor grid of tube 246 has a gating voltage applied to it so that the suppressor grid is negative until that time when an object enters the sorting zone. When an object is in front of the monitor in a position to be scanned, the potential on the suppressor grid of tube 246 is raised to near ground potential. If during the time the suppressor grid voltage is near ground potential, sufficiently large signals are produced from the reflected light to cause the squaring circuit to produce an output, a falling voltage will occur on the plate of tube 246 similar to that shown as W12 in FIGURE 7K. Just before the object leaves the scanning area, and just before the potential on the suppressor grid of 246 goes negative, the decrease in voltage $V_q$ on the plate of tube 246 is a measure of the area of the object that has reflectance characteristics in excess of a predetermined value. This voltage is available at CA and constitutes a measure of quality that is applied to decision circuit 75 (FIGURE 6). The manner in which the suppressor grid gating signal is obtained (terminal designation DA) will be described later.

It will be recalled that a zero control signal was applied to the D.-C. amplifier of FIGURE 15 by means of terminals CB. The manner of doing this will now be described. The output signal at BB from the D.-C. amplifier channel is applied to the grid of tube 250. The tube 250 with tube 251 form a long tail pair with tube 256 as a cathode load resistance for the pair. The cathode of tube 256 and the cathode of tube 257 are connected together and returned to the negative supply through resistor 258. Two resistors 262 and 263 are series connected between the negative supply and ground. The junction of the resistors 262 and 263 is connected to the grid of tube 257 to establish an average voltage on the grid of tube 257 that is a little positive with respect to the voltage on the grid of tube 256. Tube 257 is therefore normally conducting and the resulting drop across cathode resistor 258 is sufficient to maintain cut off conditions on tube 256. With tube 256 cut off neither tube 250 nor tube 251 can conduct. The grid of tube 257 is connected through capacitor 264 to the plate of tube 216. As was previously discussed the waveform on the plate of tube 216 is the inverse of waveform W9 in FIGURE 7H. When tube 216 is triggered by a sync pulse it cuts off and its plate goes quickly positive. A positive pulse is thereby applied to the grid of tube 257. However, tube 257 is already conducting and the positive pulse has no effect. The positive pulse would occur just prior to the scanning of the reference reflector. When, however, the multivibrator 216, 217 resets, the potential on the plate of tube 216 goes suddenly negative voltage will be positive. The diodes, such as 347 and 348 are connected to conduct when the divider side is negative with respect to the grid. The grid of each tube is connected to the positive supply through a relatively high resistance 354, 355 and 356. However, the voltage on the grids will never go appreciably positive since the cathodes are returned directly to ground and grid current will limit grid voltage.

If it is assumed that tube 344 is conducting and 345 and 346 non-conducting the voltage at the junction of resistors 350 and 351 will be positive as will the voltage at the junction of resistors 352 and 353. Neither diode 347 or 348 will conduct as the grid of tube 344 is near zero and the divider side of the diodes is positive. Thus, the diodes 347 and 348 do not affect the operation of tube 344 which remains conducting. If it is now assumed that tube 345 is caused to conduct, the junction of resistors 350 and 351 will be negative. Diode 348 will conduct under these conditions and a negative voltage will be produced on the grid of tube 344 preventing conduction in this tube. A similar action will take place if tube 346 conducts. Thus, conduction in only one tube at a given time is possible.

A differentiating capacitor connects each plate to the grid of the succeeding tube. For example, the plate of tube 344 is connected to the grid of tube 345 through capacitor 363, the plate of tube 345 is connected to the grid of tube 346 by capacitor 364, and the plate of tube 346 is connected to the grid of tube 344 through capacitor 362. In addition the pulse producing plate of tube 304 is coupled to the grid of tube 344, 345 and 346 by capacitor 358, 360 and 361, respectively.

It will be recalled that the plate of tube 304 has a negative going pulse at the beginning of the gating period. Assuming that tube 304 is conducting and tubes 345 and 346 are cut off. At the beginning of the gating period a negative pulse from the plate of tube 304 is applied to the grids of tubes 344, 345 and 346. Tubes 345 and 346 are not conducting and the pulse has no effect on them. The negative pulse, however, cuts off tube 344. This produces a large positive going signal at the plate of tube 344 that is communicated to the grid of tube 345 by capacitor 363. This positive pulse is of sufficient amplitude and duration to override the negative pulse fed to the grid of tube 345 by capacitor 360. Tube 345 therefore begins to conduct and tubes 344 and 346 are cut off. The tube 345 remains conducting through the end of the gating cycle and to the beginning of the next. At this time another negative pulse will move conduction to tube 346. After three pulses have been applied to the ring of three circuit the initial conditions are restored.

For circuit tracing purposes the plates of tubes 344, 345 and 346 are connected to terminals labelled DL, DK and DC respectively, and the grids are connected through resistances to terminals labelled DJ, DH and DG respectively.

Figure 18:
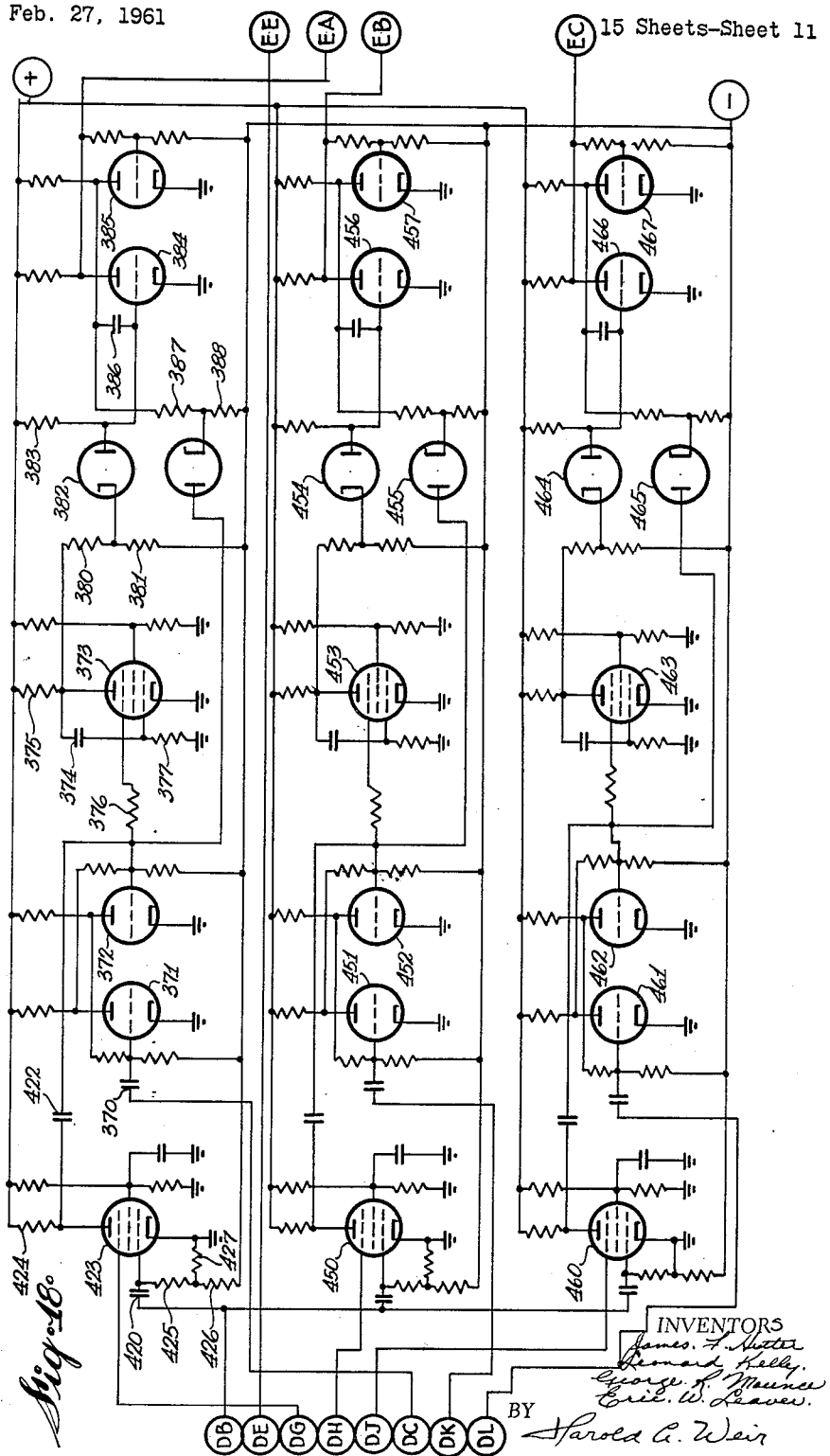

Referring to the adjoining FIGURE 18, it will be seen that three channels are shown which are similar to one another. Each channel is associated with one tube in the preceding ring of three circuit. In the upper channel the tubes 371 and 372 form a direct coupled flip-flop. A capacitor 370 couples the grid of tube 371, by means of terminal DC to the plate of tube 346 (FIGURE 17). When conduction is established in tube 346, a negative going signal is produced at the plate electrode and this is coupled to the grid of tube 371. The initial condition of flip-flop 371, 372 is with tube 371 conducting and the negative pulse transfers the conduction to tube 372. A resistor 376 connects the grid of tube 372 and the suppressor grid of tube 373. The resistance values in the flip-flop circuit are designed so that when tube 372 is non-conducting its grid voltage is negative and when it is conducting the voltage rises to around ground potential. Therefore, when tube 371 of the flip-flop is conducting, the suppressor grid of tube 373 is negative preventing conduction, and when tube 372 of the flip-flop is conducting the suppressor grid of tube 373 is near ground potential.

The tube 373 is connected in a run down timing circuit of the type known as a Miller run down. A negative voltage on its suppressor grid prevents plate current flow while a voltage near ground will permit flow. When the tube 373 is not conducting the voltage drop across resistor 375 is small, and when conduction begins this plate voltage starts to fall in typical run down fashion at a rate determined by capacitor 374 and resistor 377. Resistors 380 and 381 are series connected between the plate of tube 373 and the negative supply to form a voltage divider network. A portion of the plate voltage of tube 373 exists at the junction of resistors 380 and 381 and this is applied to the cathode of a diode 382. The resistors 380 and 381 are proportioned so that when tube 373 is not conducting the voltage on the cathode of diode 382 is positive, and, as the plate voltage of tube 373 falls with the commencing of conduction, the voltage on the cathode of diode 382 also moves in a negative direction. The plate of diode 382 is connected to the grid of tube 384 which is initially conducting fully. In its fully conducting condition the grid voltage of tube 384 is approximately zero due to current through grid resistor 383, and the plate of diode 382 is also approximately zero. The potential across the diode 382 is in a direction to prevent it conducting at the time when the tube 373 starts a run down action. However, as the plate voltage of tube 373 falls, a point will be reached where the voltage in the cathode of diode 382 goes negative with respect to its plate. The diode 382 will then conduct causing the grid of tube 384 to go negative and cut off the plate current flow. Tubes 384 and 385 comprise a single shot multivibrator whose normal state is with tube 384 conducting and tube 385 cut off. When diode 382 conducts, conduction in the multivibrator is transferred from tube 384 to tube 385. The multivibrator remains in this state for a time determined by the values of capacitor 386 and resistor 383. The plate of tube 385 has a voltage divider comprising series connected resistors 387 and 388 connected between it and the negative supply. The junction of these resistors 387 and 388 is connected to the cathode of diode 390 whose plate is connected to the grid of tube 372. Before the multivibrator comprising tubes 384, 385 switches, that is with tube 384 conducting, the cathode voltage on diode 390 is positive. The diode 390 does not conduct as its plate is around zero potential while the run down action is taking place. However, when conduction is transferred to tube 385 of the multivibrator, the plate potential of tube 385 moves in a negative direction permitting current to be drawn through diode 390. The current through diode 390 produces a negative voltage on the grid of tube 372 which resets the flip-flop composed of tubes 371 and 372 to the initial condition with tube 372 cut off. When this resetting occurs, the grid of tube 372 goes negative again and a negative voltage appears on the suppressor grid of tube 373 resetting the run down stage. When this action is completed and the single shot multivibrator comprising tubes 384 and 385 resets, the whole circuit is again in the initial state that it was in prior to receiving a trigger pulse over DC.

The plate of tube 384 is connected to a terminal designated EA. The voltage waveform on EA will be a positive going voltage when tube 384 is switched off followed by a negative going voltage when the multivibrator resets and conduction is changed from tube 385 back to 384. This will be the same for the other two channels. The ring of three circuit of FIGURE 17 will, for example, trigger the flip-flop comprising tubes 451 and 452 next by a pulse over conductor DK. The change in the state of the flip-flop will start the run down circuit comprising tube 453, and when a certain voltage is reached diode 454 will conduct to trigger multivibrator comprising tubes 456 and 457. The flip-flop comprising tubes 451 and 452 is reset through diode 455 and the multivibrator comprising tubes 456 and 457 will reset itself. A voltage will appear at EB that has a positive going pulse and then a negative going pulse. A similar voltage will appear on conductor EC in its turn caused by a similar chain of events in that channel. The output signals when they occur at EA, EB or EC are used to control the rejection mechanism to reject particular fragments.

The tube 423 in the upper channel of FIGURE 18, with its asociated circuitry, is used to inhibit the normal action of the channel and thus prevent the rejection mechanism from being activated. The tubes 450 and 460 operate in a similar manner for each of the channels with which they are associated. These tubes 423, 450 and 460 all have their control grids coupled through capacitors to terminal DB. It will be recalled that this terminal DB comes from the decision circuit and, when a fragment is to be accepted, there is a positive pulse at DB.

Considering the upper channel of FIGURE 18, the tube 423 is normally biased to cut off by means of a divider network. Resistors 426 and 427 are series connected between the negative supply and ground, and resistor 425 connects the junction of resistors 426 and 427 to the grid of tube 423. A capacitor 420 couples the terminal DB to the grid of tube 423. The suppressor grid of tube 423 is connected to terminal DG which is connected by means of resistor 421 to the grid of tube 346 (FIGURE 17). The tube 423 will be able to conduct only if its suppressor grid is at or near ground potential, and this will be the case if tube 346 is conducting. In other words, in the ring of three circuit of FIGURE 17, the tube 346 has just been triggered over to a conducting state so that its grid is near ground potential. A negative going pulse on the plate of tube 346 caused by the start of conduction has just triggered the flip-flop comprising tubes 371 and 372 via conductor DC. If, at this time, a positive pulse appears from the decision circuit on conductor DB, the tube 423 will conduct. A negative going pulse is produced across the plate load resistor 424 and this is coupled to the grid of tube 372 by capacitor 422. This restores the flip-flop comprising tubes 371 and 372 to its original condition with tube 371 conducting, that is to the condition that existed before a pulse from the plate of tube 346, via DC, triggered the flip-flop. As soon as the flip-flop is restored to its original condition, a negative voltage is applied to the suppressor grid of tube 373 and the run down action is stopped. This happens before the run down reaches the point where diode 382 conducts, and therefore the multivibrator comprising tubes 384 and 385 does not get triggered. It will be seen that the positive pulse on DB has prevented an output signal at EA. This would, of course, be the same if the middle or lower channel of FIGURE 18 were considered.

Thus, if a positive signal is on DB from the decision circuit whichever channel of FIGURE 18 would be normally going through its cycle, is inhibited from completing the cycle and no output appears from the multivibrator associated with that channel. If there is no positive pulse on DB, the channel that as triggered by the ring of three circuit will complete its cycle to produce an output at either EA, EB or EC.

Figure 19:
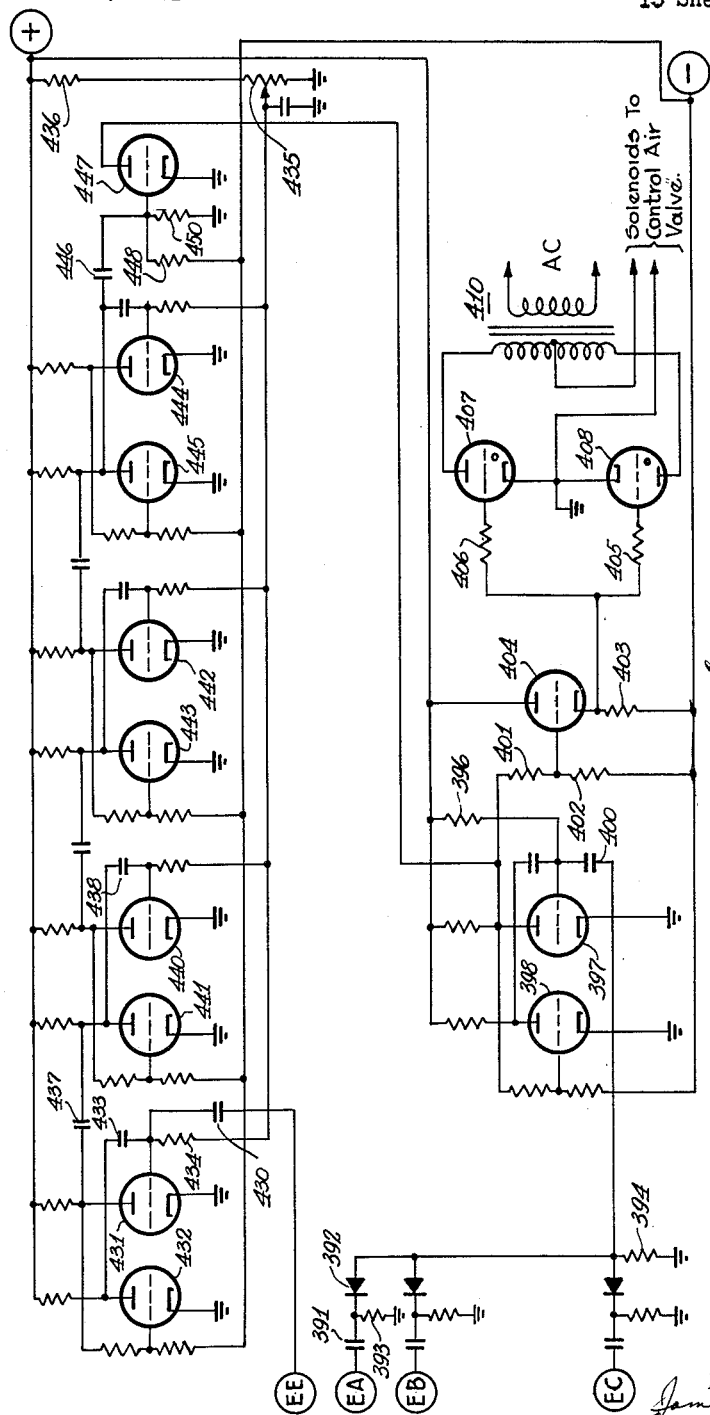

In FIGURE 19, the terminals EA, EB and EC are connected to similar differentiating networks. Considering EA, this conductor is connected to capacitor 391 which in turn is connected to one end of resistor 393 the other end of which is grounded. This resistor-capacitor combination forms a differentiating network. A diode 392 is connected between the junction of resistor and capacitor 391 and one side of load resistor 394. The other side of load resistor 394 is connected to ground. When there is a signal on EA, it consists of a positive going and a negative going pulse as previously described. This signal is differentiated, the positive going pulse is blocked by diode 392, and the negative going pulse appears across resistor 394. The resistor 394 is common to all three circuits. The negative pulse is applied to the grid of tube 397 through capacitor 400. The tubes 397 and 398 comprise a single shot multivibrator (multivibrator MV3 of FIGURE 6). The initial condition of the multivibrator is with tube 397 conducting and the negative pulse transfer conduction to tube 398. A divider comprising resistors 401 and 402 is connected between the plate of tube 397 and the negative supply. The common point between resistors 401 and 402 is directly connected to the grid of tube 404. The divider is so designed that under the initial conditions with tube 397 conducting, the voltage on the grid of tube 404 is negative, and when conduction is transferred to tube 398 the voltage on the grid of tube 404 is positive. The tube 404 is connected as a cathode follower and the voltage on its cathode is at all times slightly more positive than the voltage on its grid. The cathode of tube 404 is connected by resistors 405 and 406 to the grid electrodes of grid controlled gaseous rectifier tubes 408 and 407 respectively. The cathodes of the rectifiers 407 and 408 are connected to ground and therefore a negative voltage on their grids will prevent conduction and a positive voltage will cause conduction. Transformer 410 has a primary winding connected to a source of alternating power, and a center-tapped secondary winding connected to the plates of tubes 407 and 408 to form a full wave rectifier.

When the multivibrator comprising tubes 397 and 398 is in its normal or initial state with tube 397 conducting, a negative voltage exists on its grid of tube 404 and also on the cathode of tube 404. The grids of tubes 407 and 408 are therefore biased negatively and the tubes 407 and 408 do not conduct. When the conduction is triggered from 397 to 398, a positive voltage appears on the grids of tubes 407 and 408 and they conduct providing a direct current output to energize the solenoid valves and start an air blast directed at a fragment which is to be rejected.

It will be recalled that the multivibrator comprising tubes 397 and 398 (multivibrator MV3 of FIGURE 6) is designed to reset after a time sufficient to permit the longest fragment to completely pass the air blast nozzle 25. After this time has elapsed the multivibrator will reset and turn off the air blast. However, it was previously ponited out that it was desirable to have the air blast turned off immediately the tail end of any size fragment passed the air blast nozzle. The means for doing this was described in connection with FIGURE 6, and the circuitry for accomplishing it is shown in FIGURE 19.

Referring back to FIGURE 17 for the moment, it will be recalled that the squarer circuit comprising tubes 301 and 302 was switched to another condition as soon as a fragment started to occult the thin light beam from the area light source 17 (lamp 101 of FIGURE 12) and was switched back again as soon as the fragment passed the thin beam and ceased to occult it. The plate of tube 302 provided a positive going signal when the fragment entered the thin beam and a negative going signal when it left. This signal was available at terminal DE of FIGURE 17, and EE of FIGURES 18 and 19.

Once again referring to FIGURE 19, this signal at EE is applied to the grid of tube 431 through capacitor 430 which differentiates the signal (differentiating circuit 77 of FIGURE 6). Tubes 431 and 432 comprise a single shot multivibrator whose initial conditions are with tube 431 conducting. Since tube 431 is already conducting, the positive pulse applied to its grid will have no effect. However, the negative signal, caused by the tail end of a fragment passing the thin light beam, will switch conduction to tube 432 with tube 431 cut off. The multivibrator will reset after a time determined by the value of capacitor 433 and resistor 434 and the value of the positive voltage at the lower end of resistor 434. This voltage at the lower end of 434 is obtained from the slider or tap on potentiometer 435. The potentiometer 435 and resistor 436 are series connected between the positive supply and ground so that a variable positive voltage is available at the slider or tap of potentiometer 435. The triggered on time of multivibrator comprising tubes 431 and 432 can be controlled over a small range by varying the slider on potentiometer 435.

Tubes 440, 441 also comprise a single shot multivibrator that is triggered by a negative pulse on the plate of tube 431 caused by the resetting of the first multivibrator. This negative pulse is applied through capacitors 437 and 438 to the grid of tube 440. The tubes 442 and 443 comprise a third single shot multivibrator and the tubes 444 and 445 comprise a fourth single shot multivibrator. Each multivibrator is triggered by the resetting of the preceding multivibrator. That is, the first multivibrator is triggered by a pulse from EE, it resets triggering the second multivibrator which resets triggering the third, the third resets triggering the fourth which then resets. The fourth multivibrator has the plate of its tube 445 coupled to the grid of pulse amplifier tube 447 by a capacitor 446. The tube 447 is normally cut off because of the bias on its grid from a divider comprising resistors 448 and 450. The resetting of the multivibrator comprising tubes 444 and 445 causes a positive going signal on the plate of tube 445 which is coupled to the grid of tube 447. This signal produces a short pulse of current through tube 447. The plate of tube 447 is directly connected to the plate of tube 397. The multivibrator comprising tubes 397 and 398 was triggered so that it would start the air blast as soon as the leading edge of a fragment began to pass the air blast nozzle. This multivibrator would normally reset itself after a time sufficient to allow the largest fragment to pass the nozzle. However, the pulse of plate current drawn through tube 447 will reset the multivibrator prematurely so that conduction is again switched to tube 397. This terminates the air blast.

The delay circuit or memory circuit comprising the four multivibrators having tubes 431—432, 440—441, 442—443 and 444—445 is timed so that the total delay permits a fragment to fall from a position where its trailing edge is just leaving the thin beam of the area light source to a position where the trailing edge is just passing the air blast nozzle.

The detailed circuitry of the FIGURE 24A layout has been described and the overall picture of the operation of the circuitry should now be clear. Reference to the block schematic diagram of FIGURE 6 and the description pertaining to it will provide a guide to the overall operation of the circuitry of the FIGURE 24A layout.

It will be recalled that a variation to the previous embodiment was mentioned. In this variation the light source 101 with its power supply is dispensed with. Thus, the circuitry of FIGURE 12 would not be required. The light detector 18 of FIGURE 6 (photocell 116 of FIGURE 13) is instead arranged to receive a thin beam of light from lights 161 of FIGURE 14 that are located in monitor 21. A mechanical chopper (not shown) is positioned in front of detector 18 to interrupt the light passing towards the detector. Such choppers are well known as is their use. Therefore the output from photocell 116 (FIGURE 13) will be substantially the same for both the embodiment just described and for the variation thereof.

The manner in which this variation operates is also substantially the same. Because the area and quality signals can be derived from the same point in the sorting zone when the variation is used, there is no need for the gate extension circuit 79 of FIGURE 6 which comprises tubes 314 and 315 of FIGURE 17. Thus, in the variation the time constant of the single shot multivibrator comprising tubes 314 and 315 could be reduced so that the switch over time with tube 315 conducting is very short compared to the times in the other circuits, or the two tubes 314 and 315 may be eliminated and the flip-flop comprising tubes 311 and 312 reset by a negative going pulse from the plate of tube 302 applied through a capacitor to the grid of tube 312. That is, the main gate flip flop comprising tubes 311 and 312 can be returned to the state with tube 311 conducting by a negative going pulse from the plate of squarer tube 302. The negative going pulse on tube 302's plate is, of course, representing the passage of the tail end of a fragment.

Attention is now directed to the layout of the schematic circuit diagrams of FIGURE 24B. These diagrams pertain to the embodiment of the invention described in general terms in connection with FIGURE 2. This embodiment does not use the area light source of FIGURE 12 or the area light detector of FIGURE 13. This embodiment uses only the light source of the monitor (i.e. lamps 31) and from the light reflected from the falling fragments the monitor provides an output. From this output the size, time and quality signals are extracted electronically. It will be noted that the FIGURES 14, 15, 17, 18 and 19 are used in this embodiment as they were in the previous one. FIGURES 20 and 21 replace the FIGURE 16 of the previous embodiment.

The circuit of FIGURES 14 and 15 were previously described. It will be noted that, on FIGURE 15, there is no input at terminal AA and no output at terminal BC. These terminals were used only in the previous embodiment.

In FIGURE 20 several of the circuits are the same as those described in connection with FIGURE 16. For example, the tubes 230, 233, 234, 243 and 246 are in the same circuitry as in the previous embodiment. The input signal at terminal BB comes from cathode follower tube 186 of FIGURE 15 and this is applied to the quality channel comprising the aforementioned tubes. The quality signal is the output from integrator tube 246 and, as before, is available at terminal CA. Where possible, the circuit components including tubes, which are the same and act in the same manner are given the same designation number.

In FIGURE 20, another circuit that is the same is the zero control circuit comprising tubes 250, 251, 256, 257, 266, 267, 268, 270 and 280. The signal from BB is also applied to this circuit and a control signal is provided at CB.

The circuit comprising the tubes 207, 208 and 211 in FIGURE 20, and the circuit comprising tubes 216 and 217 of FIGURE 21, are also the same and have previously been described. The description of these circuits will not be repeated and they will be mentioned only in connection with new circuitry being described in detail.

Considering the circuits of FIGURES 20 and 21 together, it will be seen that the signal at BB is applied to one end of resistor 500 via terminals FF and FA. It will also be seen that the circuit comprising the tubes 504, 505, 512, 514 and 517 which gives the area signal, is very similar to the circuit above it comprising the tubes 233, 234, 243, 246 and 230 which provides the quality signal. These two circuits operate in the same manner. The resistors 500 and 501 are connected in series with the other end of resistor 501 going to the slider or tap on potentiometer 502. The potentiometer 502 is connected between the negative supply and ground so that a variable negative voltage is available at the slider. This variable voltage is used to set the level of the amplitude discriminator as was the case with potentiometer 226. The voltage is such that a positive signal acts through the diode 512 and resistor 513 to the grid of tube 514 whenever the input signal goes positive beyond a certain level. Whereas the discriminator level in the quality channel is set at a level of say W16 (FIGURE 9A), the discriminator level in the area or size channel is set at a low level of say W19 (FIGURE 9A). Thus the potentiometer 502 is adjusted so that any part of a fragment will produce sufficient signal at BB to trigger the squaring circuit comprising tubes 504 and 505.

The squaring circuit comprising tubes 504 and 505 (squarer circuit 90' of FIGURE 8) will operate in the same manner as the squaring circuit comprising tubes 233 and 234. The waveform will be that of W20 in FIGURE 9C for the sample fragment of FIGURE 9 and will appear, for example, at the plate of tube 505. The integrator tube 514, when a positive signal is applied to its grid, will draw current at a rate depending on the values of capacitor 515 and resistor 513. The current flowing will produce a voltage drop across plate load resistor 516 which will have a waveform of W24 (FIGURE 9E) for the sample fragment of FIGURE 9. This output is available at terminal CC. Both the integrator tube 514 and 246 are gated at their suppressor grids by a voltage applied from terminal DA through resistor 294 of divider network comprising resistors 294 and 295.

The tube 517 is the gating tube (gate 88' of FIGURE 8) which is similar to tube 230. The grid of tubes 230 and 517 are fed from the same source FC, FD, and the plate of tube 216. It will be recalled that the plate of tube 216 goes positive when the magnetic pick up 64 of the scanning head produces a pulse. This pulse begins just before the reference portion of the signal appears, at the terminal BB and ends shortly after the reference portion disappears. While the plate of tube 216 is positive, the tube 517 conducts reducing the voltage at the grid of tube 504. This prevents the squaring circuit from being triggered by the reference pulse.

There is an additional circuit fed from the output of the squaring circuit comprising tubes 504 and 505. This is a timing circuit including tubes 508 and 522. Resistors 506 and 507 are connected in series between the plate of tube 505 and the negative supply, and the grid of tube 508 is connected to the junction of these resistors. As was previously mentioned, the plate of tube 505 goes positive whenever the scanner sees an object, i.e. whenever reflected light from a falling fragment is falling on the photomultiplier tube 60 (FIG. 15). The plate of 505 will therefore produce a positive signal for some portion of each scan when there is an object in front of the scanner. The values of resistors 506 and 507 are chosen so that when tube 505 is conducting, the tube 508 is cut off. The plate of tube 508 is connected through a voltage divider to the suppressor grid of tube 522. The values of resistors 520 and 521 in this voltage divider are chosen so that when tube 508 is cut off, the suppressor grid of tube 522 is at or near ground potential. When the suppressor grid is near ground potential, tube 522 is permitted to conduct. The tube 522 is connected in a run down circuit of the type known in the art as a Miller run down. Suppose that the scanner is not seeing any object in the sorting zone and there are no positive voltage pulses on the plate of tube 505, that is tube 505 is conducting. Then the tube 508 is cut off and the suppressor grid of tube 522 is near ground potential. The current flow through tube 522 reaches a maximum and the voltage on the plate of tube 522 falls or "runs down." As soon as the scanner sees a piece of material, the tube 505 produces a positive going voltage pulse, the tube 508 conducts because of this pulse and the suppressor grid of tube 522 becomes negative cutting off the plate current flow in tube 522. The voltage on the plate of tube 522 rises quickly. As soon as the scanner passes the object the positive voltage pulse on the plate of tube 505 terminates and the run down action of tube 522 starts once more. The circuit comprising the tube 522 is designed so that the run down rate is relatively slow. As long as there is a piece of reflecting material in front of the scanner the plate current in tube 522 is not permitted to build up, that is, each successive scan that sees a piece of material resets the circuit and prohibits a continuous build-up of plate current. The voltage at the plate of tube 522 is therefore kept above a certain minimum value. The action may be understood by referring to waveform W20 of FIGURE 9C which is the waveform of the voltage applied to the suppressor grid of tube 522 for the fragment 13 of FIGURE 9, and to waveform W21 of FIGURE 9D which is the corresponding voltage waveform on the plate of tube 522. Resistors 526 and 527 are connected in series between the plate of tube 522 and the negative supply. The resistors 526 and 527 are so proportioned that the voltage at the junction is negative when the tube 522 is fully conducting, and at some lower level of plate current the junction is positive. The junction is connected to terminal DF and thence to the grid of tube 301 through resistor 300 (FIGURE 17). It will be recalled that the tubes 301 and 302 comprise a squaring circuit (block 96 of FIGURE 8) and that a slightly positive voltage must be applied to the grid of tube 301 to produce a change in output from the squarer circuit.

The action of the squaring circuit comprising tubes 301 and 302 has been described. Briefly, in the absence of an object in the sorting zone, tube 522 is conducting fully producing a negative voltage through the divider comprising resistors 526 and 527 at the grid of tube 301. The squarer circuit is at rest and no action takes place. As soon as an object enters the scanning zone the suppressor grid voltage on tube 522 becomes negative cutting off plate current. The plate voltage of tube 522 quickly rises producing a positive signal at the grid of tube 501. The squaring circuit comprising tubes 301 and 302 is immediately triggered over initiating the gate. While the scanner continues to see an object the plate voltage on tube 522 remains above a predetermined minimum level, indicated on FIGURE 9D at W22. Hence the squaring circuit remains in its triggered state. When the object leaves the scanning zone, the tube suppressor grid of tube 522 goes to near ground potential and remains there. The plate current in tube 522 builds up and the plate voltage drops until the level W22 is reached. This voltage level W22 corresponds to a level at the grid of tube 301 which is just below the value that will cause conduction in tube 301. The squaring circuit resets. The squaring circuit action has been previously described. It provides the main gating signal.

It should be noted that the gate extension circuit comprising tubes 314 and 315 of FIGURE 17 was required in the previous embodiment to artificially hold the main gate open for a period of time sufficient to allow the trailing end of a fragment to fall from the area light detector to the scanning area. This gate extension is not required in this embodiment as the area and quality information is obtained at the same point. The circuit comprising tubes 314 and 315 may therefore be eliminated. If it is eliminated the main gate flip-flop comprising tubes 311 and 312 must be reset from another source. This can be accomplished by connecting a capacitor between the plate of tube 302 and the grid of tube 312. In other words capacitor 313 would go to the grid of tube 312. Alternatively, if the gate extension circuit were not eliminated, its time constant could be reduced to a point where its triggered over time was short compared to the other actions in the circuitry.

The decision circuit, the memory circuit, the rejection circuit, and in fact all the remaining circuitry of this embodiment have been described in connection with the preceding embodiment.

Referring now to the layout of the schematic circuit diagrams of FIGURE 24C, it will be noted that FIGURES 14, 15, 17, 18, 19 and 20 of this layout were also in the preceding layout. FIGURE 21 has been replaced by FIGURE 22 and an additional light source of FIGURE 14 has been added. In this embodiment a light source 28 (FIGURES 3 and 10) is positioned across the sorting zone from the monitor so that a steady, polarized, thin beam of light is directed towards the monitor. As the light source 28 is steady in this embodiment it may be energized from the same direct current power supply as the lamps 31 of the monitor (FIGURE 4). It will be recalled that two of this group of lamps 31 were given designation numbers 161 and 162 in FIG- URE 14 so that a specific connection of two lamps could be discussed by way of example. The same power source of FIGURE 14 may be used to supply the light source 28, or a similar direct current supply may be used.

The scanning arrangement by which the direct light from source 28 and the light reflected from lamps 31 (FIGURE 4) by the falling fragments are separated has already been described. The waveform of the signal at terminal BB of FIGURE 15 would be of the form indicated as W25 of FIGURE 11A for the sample fragment 13 of FIGURE 11. A complete scanning cycle in this embodiment requires two scans, one where the photomultiplier tube 60 receives light from light source 28 and the other where it receives only the reflected light. The iron slugs 63c of FIGURE 5C are on the scanning disc 55c to provide a sync pulse for each complete scanning cycle. These iron slugs 63c are positioned so that they provide a trigger pulse just in advance of the arrival of a pulse at terminal BB (FIGURE 15) which is due to the scanning of the standard reflecting surface 65 (FIGURE 4). This can be seen in FIGURE 11.

The sync pulse from magnetic pick up head 64 operates through tubes 207, 208 and 211 of FIGURE 20 and produces a negative pulse at the plate of tube 211. This negative pulse is transferred through capacitor 213 to terminal FB and thence to the grid of tube 601 of FIGURE 22. The tubes 601 and 602 comprise a single shot multivibrator (MV5 of FIGURE 10) whose initial conditions are with tube 601 conducting and tube 602 cut off. The arrival of the negative pulse transfers conduction to tube 602. This occurs just before the signal at terminal BB of FIGURE 15 results from the scanning of the standard reference reflectors. Prior to triggering the grid voltage on tube 602 is negative, and the voltage rises to near ground potential when triggered. The voltage on the grid of tube 602 is coupled by means of resistor 221, terminals FE and BA, to the second grid of tube 191 of FIGURE 15 where it is used to gate tube 191 so that it may conduct during the time when the standard reflector is being scanned. This gating signal is indicated by waveform W26 in FIGURE 11K. The action of the tube 191 and its associated circuitry in controlling the high voltage to the photomultiplier tube 60 has already been described.

The multivibrator comprising tubes 601 and 602 of FIGURE 22 resets after a time depending primarily on the value of capacitor 603 and resistor 604. This time at which it resets is designed to follow the end of the scanning of the standard reflector. When the multivibrator resets and conduction is transferred to tube 601, a negative going voltage is produced at the plate of tube 601. This negative going signal acts through capacitor 605 to trigger a second single shot multivibrator comprising tubes 606 and 607. This is the multivibrator MV6 of FIGURE 10. The initial conditions in this second single shot multivibrator are with tube 606 conducting and tube 607 cut off. Once triggered it will remain with tube 607 conducting for a time determined primarily by capacitor 608 and resistor 610. The time of the triggered condition, that is the length of time that tube 607 conducts, is so adjusted that it extends from the end of the pulse from the standard reflector until the beginning of the area scan.

The tubes 614 and 615 comprise a third single shot multivibrator that is triggered when the second multivibrator resets. The triggering and operation of this multivibrator is the same as the previous one. The triggered time, that is the length of time tube 615 conducts, is determined primarily by the values of capacitor 613 and resistor 612. This time is sufficient for the scanner to traverse almost the entire length of the strip light source 28 that provides the thin beam of light for area determination. An output is taken from the plate of tube 615 to terminal FC, and this is used to control the gating tube 517 (gate 88' of FIGURE 10) and tube 257 (part of the zero control 87 of FIGURE 10). The operation of both the tube 517 with its associated circuitry and tube 257 with its associated circuitry have already been described.

Returning to FIGURE 22, the tubes 620 and 621 comprise a fourth single shot multivibrator (MV8 of FIGURE 10) that is triggered when the preceding multivibrator resets. The triggered time of this multivibrator, that is the length of time that tube 621 conducts, is determined primarily by the values of capacitor 618 and resistor 617. This length of time extends from just before the end of the area scan until the beginning of the quality scan.

The tubes 625 and 626 comprise a fifth single shot multivibrator (MV9 of FIGURE 10) that is triggered when the preceding multivibrator resets. As before the triggered time depends on the values of capacitor 624 and resistor 623. The triggered time extends from the beginning of the scan where reflected light is received from the surface of the falling fragments, i.e. the quality scan, to just before the end of this scan. An output is taken from the plate of tube 626, via terminal FD, and applied to one end of resistor 227. The other end of resistor 227 is connected to one end of resistor 228, the other end of which goes to the negative supply. Resistors 227 and 228 form a voltage divider whose values are so chosen that when tube 626 is not conducting, a positive voltage occurs at the junction of the resistors and produces plate current in tube 230. It will be recalled that tube 230 is used to gate the quality channel so that it is insensitive to incoming signals when tube 230 conducts. When the multivibrator comprising tubes 625 and 626 is triggered, the voltage on FD goes in a negative direction and the voltage on the grid of tube 230 goes negative and cuts off tube 230 opening the gate.

Thus, the chain of five multivibrators in FIGURE 22 operate in sequence and provide timing and gating signals which, (a) Allow the zero control circuit for the photomultiplier tube to be controlled by the pulse from the standard reflector.
(b) Produce a dead time between the pulse caused by the standard reflector and the beginning of the signal caused by the scanning of light source 28,
(c) Sensitize the area channel,
(d) Desensitize all channels for a period extending from the end of the area scan to the beginning of the quality scan,
(e) Sensitize the quality channel, and
(f) Return to a condition where none of the five multivibrators are triggered and the multicibrator chain waits for the receipt of the next sync pulse.

There is another circuit on FIGURE 22 which comprises tube 630. This is the inverter 99 of FIGURE 10. The output from the D.-C. amplifier of FIGURE 15 at BB is fed via terminal FF to the grid of tube 630. Resistor 632 connected from the cathode of tube 630 to the negative supply primarily controls the plate current. Plate resistor 631 is designed to have a voltage drop across it such that the voltage at the plate which is applied to the end of the divider network comprising resistances 633 and 634, produces an output at the junction of these resistors that is zero when the grid voltage of tube 630 is at its maximum positive value. The output from the junction of resistors 633 and 634 is at terminal FA and is fed to the end of resistor 500 (FIGURE 20). The resistor network comprising resistors 500, 501, 503 and potentiometer 502 form with the input of tube 504, an amplitude discriminator. This discriminator is similar to the one operating the grid circuit of tube 233 which has been described.

The remaining portions of the circuitry comprising they layout diagram of FIGURE 24D, the only figure nection with previously discussed embodiments. Referring now to the schematic circuit diagrams included in the layout diagram of FIGURE 24D, the only FIGURE appearing in this that was not a part of the FIGURE 24C layout is FIGURE 23. It will be recalled that in this embodiment, that is, in the embodiment of FIGURES 3 and 10 where the light source 28 is pulsed, the circuitry is identical to the one in the preceding embodiment except of course that a pulsating light source is used. This pulsating light source is used for the size/timing signal and must be synchronized with the scanning device. An example of suitable circuitry and apparatus for such a light source is given in FIGURE 23.

In FIGURE 23, a light tube 700 is mounted as in light source 28 (FIGURES 3 and 10) to provide a thin beam of light to be viewed by the monitor. It is mounted in such a fashion that the scanner sweeps across the beam. The tube 700 comprises a glass envelope filled with gas at a low pressure and capable of emitting light radiation when excited by a radio frequency field. Two electrodes are fastened to the outside of the envelope and a radio frequency voltage is applied to the electrodes from a turned circuit comprising inductor 702 and capacitor 701. The inductance-capacitance combination is adjusted to be resonant at the frequency of the radio energy supplied over the coaxial cable 705. The coaxial cable is connected to the tuned circuit in such a manner that the cable impedance is matched to the tube impedance. Such matching is well known in the art. Inductance 703 and capacitor 704 comprise a tank circuit that is driven from tube 708 through capacitor 706. Again the coaxial cable is connected to the tank circuit in a manner to effect an impedance match. Inductor 707 in series with the plate of tube 708 permits the application of plate voltage to tube 708 without loading the tuned circuit comprising inductance 703 and capacitance 704. The tube 708 may be operated as a class C amplifier. A negative bias voltage is applied to the control grid of tube 708 from a divider comprising resistors 713 and 712 through the inductance 710. The inductance 710 and capacitance 711 comprise a resonant grid circuit for tube 708. A radio frequency signal is applied to the circuit 710, 711 through capacitor 714 from the plate of tube 716. The screen supply for tube 716 is obtained through a cathode follower tube 720. Capacitor 717 by passes the screen electrode for radio frequencies, and resistor 718 further decouples the screen circuit from the cathode of tube 720. A crystal oscillator circuit supplies a radio frequency signal to the grid of tube 716 through capacitor 723. The crystal oscillator is quite conventional and comprises tube 724 and crystal 726.

The cathode follower tube 720 acts as a switch to start and stop the supply to the screen grid of tube 716. When the grid of tube 720 is positive, screen voltage is applied to the screen of tube 716, and the radio frequency voltage from oscillator tube 724 is amplified by tube 716. This affords a drive for the power amplifier tube 708 and energizes tube 700. On the other hand, when the grid of tube 720 is negative, the tube 716 does not receive screen voltage and does not function. The tube 700 is not energized.

In order to synchronize and pulse the light source 700, an output from the magnetic pick up head 64 is applied to the grid of tube 727. The tubes 727, 728 and 730 amplify the pulse from pick up head 64 and a negative output pulse appears at the plate of tube 730 each time the pick up head gives an output. In other words, the tubes 727, 728 and 730 function in a similar manner to the tubes 207, 208 and 211 (FIGURE 16 and FIGURE 20). It should be noted only one pick-up head is required to afford an input to both tubes 727 and 207. The output from the plate of tube 730 is coupled by capacitor 733 to the grid of tube 731. Tubes 731 and 735 comprise a single shot multivibrator whose initial state is with tube 731 conducting. A negative trigger pulse over capacitor 734 triggers the multivibrator and transfers conduction to tube 735. The time till the multivibrator resets is primarily determined by capacitor 734 and resistor 732. This time is sufficient to permit the scanning cycle to proceed from the sync pulse from head 64 until the scanner is beginning to look at the strip light source 28. At this time the multivibrator resets and triggers a single shot multivibrator comprising tubes 740 and 741. This multivibrator is normally in a state with tube 740 conducting and it is triggered over to its other state by a negative pulse received via capacitor 736 from the plate of tube 731. The capacitor 738 and resistor, as before, primarily determine reset time. The length of time that this multivibrator is triggered is sufficient for the scanner to traverse the length of the strip of light from source 28, i.e. to traverse the thin beam from the tube 700. Before multivibrator comprising tubes 740 and 741 is triggered, the plate voltage of tube 740 is relatively low. It rises rapidly upon receipt of a triggering pulse and remains at a high value until the multivibrator resets. The resistors 721 and 722 are series connected between the plate of tube 740 and the negative supply as a voltage divider. The junction of the resistors 721 and 722 is connected to the grid of tube 720. The resistors 721 and 722 are so proportioned that when tube 740 is conducting, the voltage on the grid of tube 720 is negative and hence the voltage on the screen grid of tube 716 is negative. However, when tube 740 is not conducting the plate voltage of tube 740 goes in a positive direction, and the grid of tube 720 becomes positive. This results in the light source 28 that is in the tube 700 being energized to provide light. When the multivibrator comprising tubes 740 and 741 resets, the light is stopped. The light is thereby pulsed in synchronism with the pulses from pick up head 64 and with the scanning means.

The output from the D.-C. amplifier at terminal BB is the same for this embodiment as the preceding one. Consequently the remaining circuitry is the same. Further explanation is believed to be unnecessary.

It is believed that the specific circuits described in connection with the various embodiments of this invention are typical of suitable circuits. There are equivalent circuits that could be used without departing from the invention.

In the schematic diagrams used in the description of the invention, certain obvious parts and components were omitted to simplify the diagrams. Such omissions will be readily recognized by those skilled in the art and will not affect a proper understanding of the invention. For one example, the heater or filament connections for the tubes were not shown. For another example, the positive and negative power supplies were not shown but were indicated by + and − signs. Such connections and power supplies are well known.

It is believed that the embodiments of the invention described herein, along with the examples of apparatus and circuitry that can be used in putting the invention into operation are typical. It will be obvious to those skilled in the art that various modifications and variations can be made without departing from the true invention which is defined in the appended claims.

We claim:

1. In a system for sorting units of material moving through a sorting zone in single row alignment, lamp means for directing polarized light into said sorting zone, scanning means positioned adjacent said sorting zone, photometric detector means associated with said scanning means and adapted to receive diffuse light reflected from the scanned surface of each said unit, said photometric detector means providing a first signal indicative of the reflectance characteristics of the scanned surface of each said unit, means for deriving a second signal indicative of the size of each said unit, rejection means having a first condition where units are directed to a first path and a second condition where units are directed to a second path, said rejection means normally being in said first condition, timing means to actuate said rejection means and place it in said second condition as each unit reaches it, comparing means having said first and second signals applied thereto, and means responsive to a predetermined relationship between said first and second signals to inhibit said timing means and prevent actuation of said rejection means.

2. In a system for sorting units of material moving through a sorting zone in a single row alignment, lamp means for directing polarized light into said sorting zone, photometric detector means adapted to receive diffuse light reflected from each said unit as it passes through said zone, scanning means associated with said photometric detector means to cause said photometric detector means to scan across said sorting zone in a series of successive scans, said photometric detector means providing a first signal indicative of the reflectance characteristics of the scanned surface of each said unit, means for deriving a second signal indicative of the size of each said unit, a fluid nozzle having a control for fluid flow therethrough, said nozzle being positioned so that said units pass in front of it after they pass said photometric detector means, means for initiating a third signal as each unit passes a predetermined point prior to passing said nozzle, means for deriving from said third signal a fourth signal representing a period of time during which each said unit is in front of said nozzle, said fourth signal acting on said control for fluid flow to place it in condition to provide a fluid stream adapted to impinge on each said unit and alter its course, comparing means having said first and second signals applied thereto, and means responsive to a predetermined relationship between said first and second signals to inhibit said control for fluid flow and prevent flow through said nozzle.

3. In a system for sorting units of irregularly shaped material passing through a sorting zone in single row alignment, lamp means for directing into said sorting zone a steady light polarized in a first direction, photometric detector means adapted to receive diffuse light reflected from each said unit as it passes through said zone, a polarized filter positioned in the path of light reflected from said units to said photometric detector means, said polarized filter being polarized in a second direction substantially at right angles to said first direction to reduce the amount of specular reflected light reaching said photometric detector means, scanning means associated with said photometric detector means to cause said photometric detector to scan across said sorting zone in a series of scans, said photometric detector means providing a first signal indicative of the reflectance characteristics of the scanned surface of each said unit, means for deriving a second signal indicative of the size of each said unit, a fluid nozzle having a control for fluid flow therethrough, said nozzle being positioned so that said units pass in front of it after they pass said photometric detector means, means for initiating a third signal as each unit passes a predetermined point prior to passing said nozzle, means for deriving from said third signal a fourth signal representing a period of time during which each said unit is in front of said nozzle, said fourth signal acting on said control for fluid flow to place it in condition to provide a fluid stream adapted to impinge on each said unit and alter its course, comparing means having said first and second signals applied thereto, and means responsive to a predetermined relationship between said first and second signals to inhibit said control for fluid flow and prevent flow through said nozzle.

4. A system according to claim 3 where the scanning means is a perforated disc rotating adjacent a slotted mask.

5. In a system for sorting units of irregularly shaped material passing through a vertically extending sorting zone in single row alignment, lamp means for directing into said sorting zone a steady light polarized in a first direction, photometric detector means adapted to receive diffuse light reflected from each said unit as it passes through said zone, a polarized filter positioned in the path of light reflected from said units to said photometric detector means, said polarized filter being polarized in a second direction substantially at right angles to said first direction to reduce the amount of specular reflected light reaching said photometric detector means, a reference reflector of material which reflects a high proportion of diffuse light positioned to receive light from said lamps and reflect it towards said photometric detector means, a scanning disc rotating adjacent a slotted mask in the path of light reflected towards said photometric detector means, whereby said photometric detector means is exposed to light reflected from successive scanned portions of each said unit interspersed with light reflected from said reference reflector, said photometric detector means providing a first signal having portions indicative of the reflectance characteristics of the scanned surface of each said unit interspersed with portions indicative of the reflectance of said reference reflector, control means responsive to that portion of said first signal caused by said reference reflector to control the output from said photometric detector means so that the portion of said first signal caused by said reference reflector remains at a substantially constant level, means for deriving a second signal indicative of the cross-sectional area of each said unit, a fluid nozzle having a control for fluid flow therethrough, said nozzle being positioned a predetermined distance from said photometric means whereby said units pass said photometric means before passing said nozzle, means for initiating a third signal as each unit passes a predetermined point prior to passing said nozzle, means for deriving from said third signal a fourth signal representing a period of time during which each said unit is in front of said nozzle, said fourth signal acting on said control for fluid flow to place it in condition to provide a fluid stream adapted to impinge on each said unit and alter its course, comparing means having said first and second signals applied thereto, and means responsive to a predetermined relationship between said first and second signals to inhibit said control for fluid flow and prevent flow through said nozzle.

6. In a sorting system for sorting units of irregularly shaped material moving through a sorting zone in single row alignment, the combination comprising a first light source for directing into said sorting zone light polarized in a first direction, a first photometric detector means adapted to receive diffuse light reflected from each unit as it passes through said zone, a polarized filter positioned in the path of light travelling towards said first photometric detector means, said polarized filter being polarized at an angle to said first direction to reduce the amount of specular reflected light reaching said first photometric detector means, scanning means associated with said first photometric detector means to cause said first photometric detector to make a series of scans across said sorting zone, said first photometric detector means providing a first signal indicative of the reflectance characteristics of the scanned surface of each said unit, a second light source having a casing provided with a transverse slot projecting a thin beam of light across the path of said units through said sorting zone, a second photometric detector means positioned on the opposite side of said sorting zone from said second light source and adapted to receive light emitted from said second source through said narrow slot, said second photometric detector means providing a second signal proportional to the light occulted by each said unit and a third electrical signal representing the time taken by each said unit as each unit passes between said narrow slot and said second photometric detector means, a fluid nozzle having a control for fluid flow therethrough, said nozzle being positioned so that said units pass in front of it after they pass said first and second photometric detector means, circuit means for deriving from said third signal a fourth signal representing a period of time during which each said unit is in front of said nozzle, said fourth signal acting on said control for fluid flow to place it in condition whereby a fluid stream is directed on each said unit to alter its course, comparing means having said first and second signals applied thereto, and means responsive to a predetermined relationship between said first and second signals to inhibit said control for fluid flow and prevent flow through said nozzle.

7. In a sorting system for sorting units of irregularly shaped material, the combination comprising, a vertically extending sorting zone, handling means for introducing said units in single row alignment into the upper part of said sorting zone for free fall therethrough, a first light source for directing into said zone light polarized in a first direction, a first photometric detector means adapted to receive diffuse light reflected from each unit as it passes through said zone, a polarized filter positioned in the path of light travelling towards said first photometric detector means, said polarized filter being polarized in a second direction substantially at right angles to said first direction to reduce the amount of specular reflected light reaching said first photometric detector means, a scanning disc rotating adjacent a slotted mask in the path of light travelling towards said first photometric detector means whereby said first photometric detector means is exposed to light reflected from successive scanned portions of each said unit, said first photometric detector means providing a first signal indicative of the reflectance characteristics of the scanned surface of each said unit, a second light source positioned above the level of said first photometric detector and having a transverse slot projecting a thin beam of light across the path of said units through said sorting zone, a second photometric detector means positioned on the opposite side of said sorting zone from said second light source and adapted to receive light emitted from said second source through said narrow slot, said second photometric detector means providing a second and third signal, said second signal being proportional to the light occulted by each said unit as it passes between said narrow slot and said second photometric detector means and said third signal representing the time taken by each said unit to pass the thin beam of light between said narrow slot and said second photometric detector means, a fluid nozzle having a control for fluid flow therethrough, said nozzle being positioned below said first photometric detector means whereby said units pass directly in front of it, circuit means for deriving from said third signal a fourth signal representing a period of time during which each said unit is in front of said nozzle, said fourth signal acting on said control for fluid flow to place it in condition whereby a fluid stream is directed on each said unit to alter its course, comparing means having said first and second signals applied thereto, and means responsive to a predetermined relationship between said first and second signals to inhibit said control for fluid flow and prevent flow through said nozzle.

8. In a sorting system for sorting ore fragments the combination comprising, a vertically extending sorting zone, handling means for introducing said fragments in single row alignment into the upper part of said sorting zone for free fall therethrough, a first light source for directing into said zone a steady light polarized in a first direction, a first photometric detector means adapted to receive diffuse light reflected from each fragment as it passes through said zone, a polarized filter positioned in the path of light travelling towards said first photometric detector means, said polarized filter being polarized in a second direction substantially at right angles to said first direction to reduce the amount of specular reflected light reaching said first photometric detector means, a reference reflector of material which reflects a high proportion of diffuse light positioned to receive light from said first light source and reflect it towards said first photometric detector means, a rotatable scanning disc adjacent a slotted mask in the path of light reflected towards said first photometric detector means whereby said first photometric detector is exposed to light reflected from successive scanned portions of each said fragment interspersed with light reflected from said reference reflector, said first photometric detector means providing a first signal having portions indicative of the reflectance characteristics of the scanned surface of each fragment interspersed with portions indicative of the reflectance of said reference reflector, control means responsive to that portion of said first signal caused by the scanning of said reference reflector to control the output of said first photometric detector means so that the portion of the first signal caused by the scanning of said reference reflector remains at a substantially constant amplitude, a second light source positioned above the level of said first photometric detector and having a transverse slot projecting a thin beam of light across the path of said fragments through said sorting zone, a second photometric detector means positioned on the opposite side of said sorting zone from said second light source and adapted to receive light emitted from said second source through said narrow slot, said second photometric detector means providing a second and a third signal, said second signal being proportional to the light occulted by each fragment as it passes between said narrow slot and said second photometric detector means and said third signal representing the time taken by each fragment to pass the thin beam of light between said narrow slot and said second photometric detector means, a fluid nozzle having a control for fluid flow therethrough, said nozzle being positioned a predetermined distance below said first photometric detector means whereby said fragments pass directly in front of it, circuit means for deriving from said third signal a fourth signal representing a period of time during which each said fragment is in front of said nozzle, said fourth signal acting on said control for fluid flow to place it in condition whereby a fluid stream is directed on each said fragment to alter its course, comparing means having said first and second signals applied thereto, and means responsive to a predetermined relationship between said first and second signals to inhibit said control for fluid flow and prevent flow through said nozzle.

9. A system according to claim 8 wherein a colour filter is included in the path of light travelling towards said first photometric detector means to reduce the amount of light in a predetermined wave-length band reaching said first photometric detector means.

10. In a sorting system for sorting units of irregularly shaped material moving through a sorting zone in single row alignment, the combination comprising a light source for directing into said sorting zone light polarized in a first direction, a photometric detector means adapted to receive diffuse light reflected from each unit as it passes through said zone, a polarized filter positioned in the path of light travelling towards said photometric detector means, said polarized filter being polarized in a second direction at an angle to said first direction to reduce the amount of specular reflected light reaching said photometric detector, scanning means associated with said photometric detector means to cause said photometric detector to make a series of scans across said sorting zone, said photometric detector means providing a composite electrical signal having portions representing background reflectance and portions representing the varying reflectance values of the scanned surface of each said unit, first circuit means deriving from said composite signal for each said unit a first signal proportional to the length of time during which that portion of said composite signal representing the varying reflectance value of the scanned surface of each said unit exceeds a first predetermined level, second circuit means deriving from said composite signal for each said unit a second signal proportional to the length of time during which that portion of said composite signal representing the varying reflectance value of the scanned surface of each said unit exceeds a second predetermined level, said second predetermined level being less than said first predetermined level and just greater than the level representing background reflectance whereby said second signal gives an indication of unit size, third circuit means deriving from said composite signal a third signal proportional to the length of time each said unit takes to pass said photometric means, a fluid nozzle having a control for fluid flow therethrough, said nozzle being positioned so that said units pass in front of it after they pass said photometric detector means, fourth circuit means deriving from said third signal a fourth signal representing a period of time during which each said unit is in front of said nozzle, said fourth signal acting on said control for fluid flow to place it in condition whereby a fluid stream is directed on each said unit to alter its course, comparing means having said first and second signals applied thereto, and means responsive to a predetermined relationship between said first and second signals to inhibit said control for fluid flow and prevent flow through said nozzle.

11. In a sorting system for sorting units of irregularly shaped material, the combination comprising a vertically extending sorting zone, handling means for introducing said units in single row alignment into the upper part of said sorting zone for free fall therethrough, a light source for directing into said zone light polarized in a first direction, a photometric detector means adapted to receive diffuse light reflected from each unit as it passes through said zone, a polarized filter positioned in the path of light travelling towards said photometric detector means, said polarized filter being polarized in a second direction substantially at right angles to said first direction to reduce the amount of specular reflected light reaching said photometric detector means, a rotatable scanning disc adjacent a slotted mask in the path of light travelling towards said photometric detector means whereby said photometric detector means is exposed to light reflected from successive scanned portions of each said unit, said photometric detector means providing a composite electrical signal having portions representing background reflectance and portions representing the varying reflectance values of the scanned surface of each unit, first circuit means deriving from said composite signal for each unit a first signal proportional to the length of time during which that portion of said composite signal representing the varying reflectance value of the scanned surface of each said unit exceeds a first predetermined level, second circuit means deriving from said composite signal for each said unit a second signal proportional to the length of time during which that portion of said composite signal representing the varying reflectance value of the scanned surface of each said unit exceeds a second predetermined level, said second predetermined level being less than said first predetermined level and just greater than the level representing background reflectance whereby said second signal gives an indication of unit size, third circuit means deriving from said composite signal a third signal proportional to the length of time each said unit takes to pass said photometric means, a fluid nozzle having a control for fluid flow therethrough, said nozzle being positioned below said photometric detector means whereby said units pass directly in front of it, fourth circuit means deriving from said third signal a fourth signal representing a period of time during which each said unit is in front of said nozzle, said fourth signal acting on said control for fluid flow to place it in condition whereby a fluid stream is directed on each said unit to alter its course, comparing means having said first and second signals applied thereto, and means responsive to a predetermined relationship between said first and second signals to inhibit said control for fluid flow and prevent flow through said nozzle.

12. In a sorting system for sorting ore fragments, the combination comprising a vertically extending sorting zone, handling means for introducing said fragments in single row alignment into the upper part of said sorting zone for free fall therethrough, a light source for directing into said zone a steady light polarized in a first direction, a photometric detector means adapted to receive diffuse light reflected from each fragment as it passes through said zone, a polarized filter positioned in the path of light travelling towards said first photometric detector means, said polarized filter being polarized in a second direction substantially at right angles to said first direction to reduce the amount of specular reflected light reaching said photometric detector means, a reference reflector of material which reflects a high proportion of diffuse light positioned in the path of light from said light and adapted to reflect light towards said photometric detector means, a rotatable scanning disc adjacent a slotted mask in the path of light travelling towards said photometric detector means whereby said photometric detector means is exposed to light reflected from successive scanned portions of each said fragment interspersed with light reflected from said reference reflector, said photometric detector means providing a composite signal having portions representing background reflectance, portions representing the reflectance of said reference reflector and portions representing the varying reflectance values of the scanned surface of each said fragment, said portions representing the reflectance of said reference reflector being in the form of periodic pulses, first circuit means deriving from said periodic pulses a control signal, control means responsive to said control signal to control the output of said photometric detector means so that the periodic pulses remain at a substantially constant amplitude, second circuit means deriving from said composite signal for each fragment a first signal proportional to the length of time during which that portion of the composite signal representing the varying reflectance value of the scanned surface of each said fragment exceeds a first predetermined level, third circuit means deriving from said composite signal for each fragment a second signal proportional to the length of time during which that portion of the composite signal representing the varying reflectance value of the scanned surface of each said fragment exceeds a second predetermined level, said second predetermined level being less than said first predetermined level and just greater than the level representing background reflectance whereby said second signal gives an indication of fragment size, fourth circuit means deriving from said composite signal a third signal proportional to the length of time each fragment takes to pass said photometric detector means, a fluid nozzle having a control for fluid flow therethrough, said nozzle being positioned below said photometric detector means whereby said fragments pass in front of said nozzle after they have passed said photometric detector means, fifth circuit means deriving from said third signal a fourth signal representing the period of time during which each fragment is in front of said nozzle, said fourth signal acting on said control for fluid flow to place it in condition whereby a fluid stream is directed on each said fragment to alter its course, comparing means having said first and second signals applied thereto, and means responsive to a predetermined relationship between said first and second signals to inhibit said control for fluid flow and prevent flow through said nozzle.

13. A system according to claim 12 wherein a colour filter is included in the path of light travelling towards said photometric detector means to reduce the amount of light in a predetermined wavelength band reaching said photometric detector means.

14. In a sorting system for sorting units of irregularly shaped material moving through a sorting zone in single row alignment, the combination comprising a first light source for directing into said zone light polarized in a first direction, a second light source having a transverse slot projecting a thin beam of light across the path of said units, polarizing means to polarize the light forming said thin beam in said first direction, photometric detector means positioned on the opposite side of said sorting zone from said second light source and adapted to receive directly transmitted light from said second light source and diffuse light reflected by said units from said first light source, scanning means associated with said photometric detector means having first and second interspersed sets of scans, said first set of scans being directed at one portion of said zone to scan across said thin beam and said second set of scans being directed at another portion of said zone to scan the surface of the passing units, a polarized filter in the light path of said second set of scans, said filter being polarized in a second direction substantially at right angles to said first direction, said photometric detector means providing a composite signal having portions resulting from said first set of scans and portions resulting from said second set of scans, first circuit means deriving from that portion of the composite signal resulting from said second set of scans a first signal indicative of the varying reflectance characteristics of each said unit, second circuit means deriving from that portion of the composite signal resulting from said first set of scans a second signal proportional to the amount of light occulted by each passing unit, third circuit means deriving from that portion of the composite signal resulting from said first set of scans a third electrical signal proportional to the length of time taken by each said unit to pass said thin beam, a fluid nozzle having a control for fluid flow therethrough, said nozzle being positioned so that said units pass in front of it after they pass said photometric detector means, fourth circuit means deriving from said third signal a fourth signal representing a period of time during which each said unit is in front of said nozzle, said fourth signal acting on said control for fluid flow to place it in condition whereby a fluid stream is directed on each said unit to alter its course, comparing means having said first and second signals applied thereto, and means responsive to a predetermined relationship between said first and second signals to inhibit said control for fluid flow and prevent flow through said nozzle.

15. In a sorting system for sorting units of irregularly shaped material, the combination comprising a vertically extending sorting zone, handling means for introducing said units in single row alignment into the upper part of said zone for free fall therethrough, a first light source for directing into said zone a steady light polarized in a first direction, a second light source having a transverse slot projecting a thin beam of light across the path of said units, polarizing means to polarize the light forming said thin beam in said first direction, photometric detector means positioned on the opposite side of said sorting zone from said second light source and adapted to receive directly transmitted light from said second light source and diffuse light reflected by said units from said first light source, a rotatable scanning disc adjacent a slotted mask in the path of light travelling towards said photometric detector means, said disc having first and second sets of interspersed apertures therein and said mask having first and second vertically separated horizontal slots therein, the first set of apertures in said disc and the first slot in said mask cooperating to provide a first set of scans across said thin beam, the second set of apertures in said disc and the second slot in said mask cooperating to provide a second set of scans across a portion of the sorting zone vertically separated from that portion of the zone being traversed by said thin beam, a polarizing filter in the path of light through said second slot in said mask, said filter being polarized in a second direction substantially at right angles to said first direction, said photometric detector means providing a composite signal having portions resulting from said first set of scans and portions resulting from said second set of scans, first circuit means deriving from that portion of the composite signal resulting from said second set of scans a first signal indicative of the varying reflectance characteristics of each said unit, second circuit means deriving from that portion of the composite signal resulting from said first set of scans a second signal proportional to the amount of light occulted by each passing unit, third circuit means deriving from that portion of the composite signal resulting from said first set of scans a third electrical signal proportional to the length of time taken by each said unit to pass said thin beam, a fluid nozzle having a control for fluid flow therethrough, said nozzle being positioned below said photometric detector means whereby said units pass directly in front of said nozzle, fourth circuit means deriving from said third signal a fourth signal representing a period of time during which each said unit is in front of said nozzle, said fourth signal acting on said control for fluid flow to place it in condition whereby a fluid stream is directed on each said unit to alter its course, comparing means having said first and second signals applied thereto, and means responsive to a predetermined relationship between said first and second signals to inhibit said control for fluid flow and prevent flow through said nozzle.

16. In a sorting system for sorting ore fragments, the combination comprising a vertically extending sorting zone, handling means for introducing ore fragments in single row alignment into the upper part of said sorting zone for free fall therethrough, a first light source for directing into said zone a steady light polarized in a first direction, a second light source having a narrow transverse slot for projecting a thin steady beam of light across said zone in a horizontal plane, a first polarizing filter to polarize the light from said second light source in said first direction, a photometric detector means positioned on the opposite side of said zone from said second light source and adapted to receive directly transmitted light from said second light source and diffuse light reflected by said fragments from said first light source, a reference reflector of material which reflects a high proportion of diffuse light positioned in the path of light from said first light source and adapted to reflect light towards said photometric detector means, a rotatable scanning disc adjacent a slotted mask in the path of light travelling towards said photometric detector means, said disc having a first and second set of interspersed apertures therein and said mask having first and second vertically separated horizontal slotted apertures and a third aperture therein, said first set of apertures in said disc and the first aperture in said mask cooperating to provide a first set of scans across said thin beam, the second set of apertures in said disc and the second aperture in said mask cooperating to provide a second set of scans across a portion of the sorting zone vertically separated from that portion of the zone being traversed by said thin beam, the second set of apertures in said disc and the third aperture in said mask cooperating to provide a third set of scans of said reference reflector, a second polarizing filter, said second filter being in the path of light through said second slot in said mask and having a plane of polarization in a second direction substantially at right angles to said first direction, said photometric detector means providing a composite signal having portions resulting from said first, second and third sets of scans, first circuit means deriving from that portion of said composite signal resulting from said third set of scans a control signal, control means responsive to said control signal to control the output of said photometric detector means so that the portion of said composite signal resulting from said third set of scans remains at a substantially constant amplitude, second circuit means deriving from that portion of said composite signal resulting from said second set of scans a first signal indicative of the varying reflectance characteristics of each said fragment, third circuit means deriving from that portion of said composite signal resulting from said first set of scans a second signal proportional to the amount of light occulted by each said fragment passing said narrow slot of said second light source, fourth circuit means deriving from that portion of said composite signal resulting from said first set of scans a third signal proportional to the length of time taken by each fragment to pass said thin beam, a fluid nozzle having a control for fluid flow therethrough, said nozzle being positioned below said photometric detector means whereby said fragments pass in front of said nozzle after they have passed said photometric detector means, fifth circuit means deriving from said third signal a fourth signal representing the period of time during which each fragment is in front of said nozzle, said fourth signal acting on said control for fluid flow to place it in condition whereby a fluid stream is directed on each said fragment to alter its course, comparing means having said first and second signals applied thereto, and means responsive to a predetermined relationship between said first and second signals to inhibit said control for fluid flow and prevent flow through said nozzle.

17. A system according to claim 16 wherein a colour filter is included in the path of light travelling towards said photometric detector means through said second slot to reduce the amount of reflected light in a predetermined wavelength band reaching said photometric detector means.

18. In a sorting system for sorting units of irregularly shaped material moving through a sorting zone in single row alignment, the combination comprising a first light source for directing into said zone light polarized in a first direction, a second light source including means to pulse said second light source and a narrow transverse slot for projecting a thin pulsed beam of light across said zone in the path of said units, control means for controlling the pulse frequency of said second light source, a photometric detector means positioned on the opposite side of said zone from said second light source and adapted to receive directly transmitted light from said second light source and diffuse light reflected by said units from said first light source, scanning means associated with said photometric detector means having first and second interspersed separate sets of scans, said first set of scans being directed at said second light source to provide scanning of said thin beam, synchronizing means responsive to the frequency of scanning of said first set of scans to control the pulse frequency of said second light source whereby said second source provides light for the duration of each of said first set of scans, said second set of scans being directed across said zone to scan the passing units, a polarized filter in the light path of said second set of scans, said filter being polarized in a second direction at an angle to said first direction to reduce the amount of specular light reflected from said units reaching said photometric detector, said photometric detector means providing a composite signal including portions resulting from said first set of scans and portions resulting from said second set of scans, first circuit means deriving from the portions of said composite signal resulting from said second set of scans a first signal indicative of the varying reflectance characteristics of each said unit, second circuit means deriving from the portions of said composite signal resulting from said first set of scans a second signal proportional to the amount of light occulted by each unit during each of the scans of said first set of scans over a time interval at least equal to the passage of one of said units, third circuit means deriving from the portions of said composite signal resulting from said first set of scans a third electrical signal proportional to the length of time that each said unit takes to pass said thin beam, a fluid nozzle having a control for fluid flow therethrough, said nozzle being a predetermined distance from said photometric detector means whereby said units pass in front of said nozzle after passing said detector means, fourth circuit means for deriving from said third signal a fourth electrical signal representing a period of time during which each said unit is in front of said nozzle, said fourth signal acting on said control for fluid flow to place it in condition whereby a fluid stream is directed on each said unit to alter its course, comparing means having said first and second signals applied thereto, and means responsive to a predetermined relationship between said first and second signals to inhibit said control for fluid flow and prevent flow through said nozzle.

19. In a sorting system for sorting units of irregularly shaped material, the combination comprising a vertically extending sorting zone, handling means for introducing said units into the upper part of said sorting zone in single row alignment for free fall therethrough, a first light source for directing into said zone light polarized in a first direction, a second light source including means to pulse said second light source and a narrow transverse slot for projecting a thin pulsed beam of light across said zone in the path of said units, control means for controlling the pulse frequency of said second light source, a photometric detector means positioned on the opposite side of said zone from said second light source and adapted to receive directly transmitted light from said second light source and diffuse light reflected by said units from said first light source, a rotatable scanning disc adjacent a slotted mask in the path of light travelling towards said photometric detector means, said disc having two sets of spaced apertures therein, the first set of apertures cooperating with said slot in said mask to provide a first set of scans across said sorting zone along said thin beam, synchronizing means responsive to the frequency of said first set of scans to control the pulse frequency of said second light source whereby said source provides light for the duration of each scan in said first set of scans, the second set of apertures cooperating with said slot in said mask to provide a second set of scans across said zone to scan the passing units, a polarizing filter in the path of light comprising said second set of scans, said polarizing filter having a plane of polarization in a second direction substantially at right angles to said first direction to reduce the amount of specular light reflected by said units reaching said photometric detector means, said photometric detector means providing a composite signal including portions resulting from said first set of scans and portions resulting from said second set of scans, first circuit means deriving from the portions of said composite signal resulting from said second set of scans a first signal indicative of the varying reflectance characteristics of each said unit, second circuit means deriving from the portions of said composite signal resulting from said first set of scans a second signal proportional to the amount of light occulted by each unit during each of the scans of said first set of scans over a time interval at least equal to the passage of one of said units, third circuit means deriving from the portions of said composite signal resulting from said first set of scans a third electrical signal proportional to the length of time that each said unit takes to pass said thin beam, a fluid nozzle having a control for fluid flow therethrough, said nozzle being a predetermined distance from said photometric detector means whereby said units pass in front of said nozzle after passing said detector means, fourth circuit means for deriving from said third signal a fourth electrical signal representing a period of time during which each said unit is in front of said nozzle, said fourth signal acting on said control for fluid flow to place it in condition whereby a fluid stream is directed on each said unit to alter its course, comparing means having said first and second signals applied thereto, and means responsive to a predetermined relationship between said first and second signals to inhibit said control for fluid flow and prevent flow through said nozzle.

20. In a sorting system for sorting ore fragments, the combination comprising a vertically extending sorting zone, handling means for introducing said ore fragments into the upper part of said sorting zone, in single row alignment for free fall therethrough, a first light source for directing into said zone a steady light polarized in a first direction, a second light source including means to pulse said second light source and a narrow transverse slot for projecting a thin pulsed beam of light across said zone in a horizontal plane, a first control means for controlling the pulse frequency of said second light source, a photometric detector means positioned at the opposite side of said zone from said second light source and adapted to receive directly transmitted light from said second light source and diffuse light reflected by said fragments from said first light source, a reference reflector of material which reflects a high proportion of diffuse light, said reflector being in the path of light from said first light source and adapted to reflect light towards said photometric detector, a rotatable scanning disc positioned to interrupt light being received by said photometric detector and having first and second sets of alternately spaced apertures therein, a mask having a first horizontal slot-shaped aperture and a second aperture therein positioned adjacent said scanning disc, said first series of apertures in said disc and said first aperture in said mask cooperating to provide a first series of scans across said zone along said thin beam, synchronizing means responsive to the frequency of scanning of said first set of scans to apply a control signal to said first control means to control the pulse frequency of said second light source whereby said second light source provides light for the duration of each of said first set of scans, said second set of apertures in said disc and said first aperture in said mask cooperating to provide a second set of scans across said zone to scan the passing fragments, a polarizing filter in the light path of said second set of scans, said polarizing having a plane of polarization in a second direction substantially at right angles to said first direction to reduce the amount of specular light reflected from said fragments reaching said photometric detector, said second series of apertures on said disc and said second aperture on said mask providing a third set of scans directed at said reference reflector, said photometric detector means providing a composite electrical signal comprising portions resulting from said first, second and third sets of scans, first circuit means deriving from said composite signal portion resulting from said third series of scans a first signal, second control means responsive to said first signal to adjust the output level of the composite signal from said photometric detector means so that the portion of said composite signal resulting from said third set of scans remains at substantially a constant level, second circuit means deriving from said composite signal portion resulting from said second series of scans a second signal proportional to the varying reflectance characteristics of each said scanned fragment, third circuit means deriving from said composite signal portion resulting from said first series of scans a third electrical signal proportional to the amount of light occulated by each unit during each of the scans of said first set of scans over a time interval at least equal to the passage of one occulting fragment, fourth circuit means deriving from said composite signal portion resulting from said first series of scans a third signal proportional to the length of time that each fragment takes to pass said thin beam, a fluid nozzle having a control for fluid flow therethrough, said nozzle being positioned a predetermined distance below said photometric detector whereby said fragments pass in front of said nozzle after passing said photometric detector means, fifth circuit means deriving from said third signal a fourth signal representing the period of time each said fragment is in front of said nozzle, said fourth signal acting on said control for fluid flow to place it in condition whereby a fluid stream is directed on each said fragment to alter its course, comparing means having said first and second signals applied thereto, and means responsive to a predetermined relationship between said first and second signals to inhibit said control for fluid flow and prevent flow through said nozzle.

21. A system according to claim 20 wherein a colour filter is included in the path of light travelling towards said photometric detector means through said second slot to reduce the amount of reflected light in a predetermined wavelength band reaching said photometric detector means.

22. Apparatus for sorting solid bodies of irregular outline according to the reflectance characteristics of at least a portion of the surface of said body, said reflectance characteristics being substantially related to the amount of a constituent dispersed in the body, comprising a conveyor for dropping the body in substantially free fall, a first light source, a transversely extending narrow aperture illuminated by said source, the light from said first source passing through said transverse aperture defining a horizontal plane intersected by the path of fall of said bodies, a second light source positioned on the opposite side of said path of fall from said first light source, said second light source supplying light to the path of fall of said bodies, light detector means adapted alternately to receive light directly from said first source and indirectly from said second source by reflection from said falling bodies, means for generating a first signal proportional to the time integral of occulated area of said slot over a time interval at least equal to the passage time of a body through the beam defining said horizontal plane, means for generating a second signal proportional to the integral of the amount of diffuse reflected light received by said detector, comparing means to compare said first and second signals, means to derive a third signal having a magnitude related to the difference of said first and second signals, deflecting means operable to deflect said body from its free fall, and control means responsive to a predetermined magnitude of said difference to operate said deflecting means.

23. Apparatus as in claim 17 wherein said deflecting means comprises a blast nozzle for directing a fluid jet transversely of the free fall path of the body after it has passed the light detector, and said control means includes delay arranged to terminate said jet a predetermined time after the jet is initiated.

24. In a system for sorting ore fragments, the combination comprising, a vertically extending sorting zone, a conveyor for introducing said ore fragments into the upper part of said zone in single row alignment for successive free fall through said zone, a light source supplying light to said sorting zone, light detector means, a rotatable scanning disc, said disc being adapted to expose said light detector to light reflected from successive portions of said falling fragments, means responsive to the output from said light detector means for generating a first signal indicative of the reflectance characteristics of the scanned surface of each said fragment and for generating a second signal indicative of the cross-section of each said fragment, comparing means to compare said first and second signals, means to derive a third signal having a magnitude related to the difference of said first and second signals, deflecting means operable to deflect said fragment from its free fall path, and control means responsive to a predetermined magnitude of said difference to operate said deflecting means.

25. In a system for sorting ore fragments, the combination comprising a vertically extending sorting zone, a conveyor for introducing said ore fragments into the upper part of said zone in single row alignment for fall through said zone, a light source projecting means for projecting light from said source into said sorting zone, a first polarizing filter positioned in the path of light between said source and said sorting zone, said filter polarizing light in a first direction, a light detector, a rotatable scanning disc positioned to rotate between the path of the falling fragments and said light detector, said disc being adapted to expose said light detector to light reflected from successive portions of said falling fragments, a second polarizing filter positioned in the path of light from the scanned falling fragments to said light detector, said second filter being polarized in a second direction substantially at right angles to said first direction to reduce the amount of specular light reflected from said fragments, means responsive to the output from said light detector for generating a signal indicative of the reflectance characteristics of the scanned surface of each said fragment, means operable to deflect said fragment from its free fall path, and control means responsive to the magnitude of said signal to operate said deflecting means.

26. In a system for sorting ore fragments, the combination comprising a vertically extending sorting zone, a conveyor for introducing said ore fragments into the upper part of said zone in single row alignment for free fall through said zone, at least one light source for supplying light to said sorting zone, light detector means, a reference reflector, a rotatable scanning disc adapted to expose said light detector means to light reflected from successive portions of said falling fragments interspersed with light reflected from said reference reflector, means responsive to the output of said light detector caused by reflected light from said reference reflector for generating a first signal proportional to the amount of light reflected by the reference reflector, first control means to adjust the output level of said light detector, said first signal being applied to said first control means whereby the output of said light detector means is kept substantially constant, means responsive to the output of said light detector means caused by reflected light from said scanned fragments for generating a second signal indicative of the reflectance characteristics of the scanned surface of each said fragment and for generating a third signal indicative of the cross-section of each said fragment, comparing means to compare said second and third signals, means to derive a fourth signal having a magnitude related to the difference of said second and third signals, deflecting means operable to deflect said fragment from its free fall path, and second control means responsive to a predetermined magnitude of said difference to operate said deflecting means.

27. Apparatus as defined in claim 22 wherein said first light source is positioned on one side of the path of falling bodies and said second light source and said light detector means are on the other side of said path.

28. Apparatus as defined in claim 22 wherein colour filter means is interposed in the path of reflected light between said falling bodies and said light detector means to reduce the amount of light in a predetermined band of wavelengths to which said detector is exposed.

29. Apparatus as defined in claim 28 where said colour filter means comprises two portions adapted to reduce the sensitivity of said light detector to wavelengths outside a desired band of wavelengths.

30. Apparatus for sorting solid bodies of irregular outline according to the reflectance characteristics of at least a portion of the surface of said body, said reflectance characteristics being substantially related to the amount of a constituent dispersed in the body, comprising a conveyor for dropping the body in free fall, at least one light source, means defining a narrow flat beam of light extending transversely across the path of said body in free fall, at least one light detector means, said light detector means deriving a first signal proportional to the light occulted by said body falling through said flat beam and a second signal proportional to the integral of the amount of diffuse light reflected by said body, comparing means to compare said first and second signals and provide as an output a third signal having a magnitude related to the difference of said first and second signals, deflecting means operable to deflect said body from its path of fall, and control means responsive to a predetermined magnitude of said third signal to operate said deflecting means.

31. Apparatus for sorting irregular fragments according to the reflectance characteristics of at least a portion of the surface of said fragment, said reflectance characteristics being substantially related to the amount of a constituent dispersed in said fragment, comprising a conveyor for dropping a succession of fragments in single row alignment into the upper end of a sorting zone for free fall therethrough, at least one light source, means defining a narrow flat beam of light extending transversely across said sorting zone, at least one photometric detector means deriving a first signal proportional to the light occulted by each said fragment falling through said flat beam of light and a second signal proportional to the integral of the amount of diffuse light reflected by each said fragment, comparing means to compare said first and second signals and provide as an output a third signal having a magnitude related to the difference of said first and second signals, air blast means positioned at the lower end of said sorting zone to direct a blast of air at each said fragment and deflect it from its path of free fall, and control means responsive to a predetermined magnitude of said third signal to initiate said air blast.

32. In a sorting system for sorting units of irregularly shaped material moving through a sorting zone in single row alignment, the combination comprising a light source for directing into said sorting zone light polarized in a first direction, a first photometric detector means adapted to receive diffuse light reflected from each unit as it passes through said zone, a polarized filter positioned in the path of light travelling towards said first photometric detector means, said polarized filter having a plane of polarization at an angle to said first direction to reduce the amount of specular reflected light reaching said first photometric detector means, scanning means associated with said first photometric detector means to cause said first photometric detector to make a series of scans across said sorting zone, said first photometric detector means providing a first signal indicative of the reflectance characteristics of the scanned surface of each said unit, a second photometric detector means positioned on the opposite side of said sorting zone from said light source, means in the path of light travelling from said light source to said second photometric detector means to define a thin flat beam transverse to the direction of the path of said units through said zone, said second photometric detector means providing a second signal proportional to the light occulted by each said unit passing through said thin beam and a third signal representing the time taken by each said unit to pass said thin beam, a fluid nozzle having a control for fluid flow therethrough, said nozzle being positioned so that said units pass in front of it after they pass said first and second photometric detector means, circuit means for deriving from said third signal a fourth signal representing a period of time during which each said unit is in front of said nozzle, said fourth signal acting on said control for fluid flow to place it in condition whereby a fluid stream is directed on each said unit to alter its course, comparing means having said first and second signals applied thereto, and means responsive to a predetermined relationship between said first and second signals to inhibit said control for fluid flow and prevent flow through said nozz'e.

33. In a sorting system for sorting units of irregularly shaped material, the combination comprising a vertically extending sorting zone, handling means for introducing said units in single row alignment into the upper part of said sorting zone for free fall therethrough, a light source for directing into said sorting zone a steady light polarized in a first direction, a first photometric detector means adapted to receive diffuse light reflected from each unit as it passes through said zone, a polarized filter positioned in the path of light travelling towards said first photometric detector means, said polarized filter having a plane of polarization substantially at right angles to said first direction to reduce the amount of specular reflected light reaching said first photometric detector means, a scanning disc rotating adjacent a slotted mask in the path of light travelling towards said first photometric detector means whereby said first photometric detector means is exposed to light reflected from successive portions of each said unit, said first photometric detector means providing a first signal indicative of the reflectance characteristics of the scanned surface of each said unit, a second photometric detector means positioned on the opposite side of said sorting zone from said light source, slotted masking means in the path of light travelling from said light source to said second photometric detector means to define a thin horizontal beam extending across said sorting zone, a mechanical chopper positioned in the path of said thin beam of light to periodically interrupt light travelling from said source to said second detector, said second photometric detector means providing a second signal proportional to the light occulted by each said unit passing through said thin beam and a third signal representing the time taken by each said unit to pass said thin beam, a fluid nozzle having a control for fluid flow therethrough, said nozzle being positioned so that said units pass in front of it after they pass said first and second photometric detector means, circuit means for deriving from said third signal a fourth signal representing a period of time during which each said unit is in front of said nozzle, said fourth signal acting on said control for fluid flow to place it in condition whereby a fluid stream is directed on each said unit to alter its course, comparing means having said first and second signals applied thereto, and means responsive to a predetermined relationship between said first and second signals to inhibit said control for fluid flow and prevent flow through said nozzle.

34. In a sorting system for sorting ore fragments the combination comprising, a vertically extending sorting zone, handling means for introducing said fragments in single row alignment into the upper part of said sorting zone for free fall therethrough, a steady light source, a first polarizing filter to polarize light from said light source passing into said sorting zone in a first plane of polarization, a first photometric detector means adapted to receive diffuse light reflected from each fragment as it passes through said zone, a second polarizing filter positioned in the path of light travelling towards said first photometric detector means, said second filter being polarized in a plane substantially at right angles to said first plane to reduce the amount of specular reflected light received by said first photometric detector means, a reference reflector of material which reflects a high proportion of diffuse light positioned to receive light from said light source and reflect it towards said first photometric detector means, a rotatable scanning disc adjacent a slotted mask in the path of light reflected towards said first photometric detector means whereby said first photometric detector is exposed to light reflected from successive scanned portions of each said fragment interspersed with light reflected from said reference reflector, said first photometric detector means providing a first signal having portions indicative of the reflectance characteristics of the scanned surface of each fragment interspersed with portions indicative of the reflectance of said reference reflector, control means responsive to that portion of said first signal caused by the scanning of said reference reflector to control the output of said first photometric detector means so that the portion of said first signal caused by the scanning of said reference reflector remains at a substantially constant amplitude, a second photometric detector means positioned on the opposite side of said sorting zone from said light source, slotted masking means in the path of light travelling from said light source towards said second photometric detector means to define a thin flat beam transverse to the path of said fragments through said zone, a mechanical chopper positioned between said second photometric detector means and said light source to periodically interrupt light travelling from said source towards said second photometric detector means, said second photometric detector means providing a second signal proportional to the light occulted by each said fragment passing through said thin beam of light and a third signal representing the time taken by each said fragment to pass said thin beam, a fluid nozzle having a control for fluid flow therethrough, said nozzle being positioned so that said fragments pass in front of it after they pass said first and second photometric detector means, circuit means for deriving from said third signal a fourth signal representing a period of time during which each said fragment is in front of said nozzle, said fourth signal acting on said control for fluid flow to place it in condition whereby a fluid stream is directed on each said fragment to alter its course, comparing means having that portion of said first signal indicative of the reflectance characteristics of the scanned fragment surface and said second signals applied thereto, and means responsive to a predetermined relationship between said applied first and second signals to inhibit said control for fluid flow and prevent flow through said nozzle.

35. In a system for sorting units of material moving through a sorting zone in single row alignment, lamp means for directing polarized light into said sorting zone, photometric detector means positioned adjacent said sorting zone and adapted to receive diffuse light reflected from the surface of each said unit, said photometric detector means providing a first signal indicative of the reflectance characteristics of each said unit, means providing a second signal of a predetermined value for comparison, rejection means having a first condition where units are directed to a first path and a second condition where units are directed to a second path, said rejection means normally being in said first condition, comparison means having said first and second signals applied thereto, and means responsive to a predetermined relationship between said first and second signals to actuate said rejection means to said second condition.

36. In a system for sorting units of a material moving through a sorting zone in single row alignment, lamp means for directing into said sorting zone light polarized in a first direction, photometric detector means positioned adjacent said sorting zone and adapted to receive diffuse light reflected from each unit as it passes through said zone, a polarized filter positioned in the path of light reflected from said units to said photometric detector means, said polarized filter being polarized in a second direction substantially at right angles to said first direction to reduce the amount of specular reflected light reaching said photometric detector means, said photometric detector means providing a first signal indicative of the reflectance characteristics of the surface of each said unit, means for providing a second signal of a predetermined value for comparison, rejection means having a first condition where units are directed to a first path and a second condition where units are directed to a second path, said rejection means normally being in said first condition, timing means to actuate said rejection means and place it in said second condition as each unit reaches it, comparison means having said first and second signals applied thereto, and means responsive to a predetermined relationship between said first and second signals to inhibit said timing means and prevent actuation of said rejection means.

References Cited in the file of this patent

UNITED STATES PATENTS

| | | |
|---|---|---|
| 2,302,554 | Kingsbury | Nov. 17, 1942 |
| 2,630,043 | Kolisch | Mar. 3, 1953 |
| 2,678,581 | Reisner | May 19, 1954 |
| 2,803,754 | Cox | Aug. 20, 1957 |
| 2,933,613 | Powers | Apr. 19, 1960 |